United States Patent
Kim et al.

(10) Patent No.: US 11,039,331 B2
(45) Date of Patent: Jun. 15, 2021

(54) APPARATUS AND METHOD FOR MEASUREMENT IN WIRELESS COMMUNICATION SYSTEM

(71) Applicant: Samsung Electronics Co., Ltd., Gyeonggi-do (KR)

(72) Inventors: Donggun Kim, Gyeonggi-do (KR); Soenghun Kim, Gyeonggi-do (KR)

(73) Assignee: Samsung Electronics Co., Ltd.

( * ) Notice: Subject to any disclaimer, the term of this patent is extended or adjusted under 35 U.S.C. 154(b) by 0 days.

(21) Appl. No.: 16/368,336

(22) Filed: Mar. 28, 2019

(65) Prior Publication Data
US 2019/0306739 A1 Oct. 3, 2019

(30) Foreign Application Priority Data

Mar. 28, 2018 (KR) .................. 10-2018-0035954
Apr. 27, 2018 (KR) .................. 10-2018-0049250

(51) Int. Cl.
| | |
|---|---|
| H04J 3/14 | (2006.01) |
| H04W 24/10 | (2009.01) |
| H04W 72/04 | (2009.01) |
| H04W 52/02 | (2009.01) |
| H04L 5/00 | (2006.01) |
| H04W 76/27 | (2018.01) |

(52) U.S. Cl.
CPC .......... *H04W 24/10* (2013.01); *H04L 5/0057* (2013.01); *H04W 52/0229* (2013.01); *H04W 72/0453* (2013.01); *H04W 76/27* (2018.02)

(58) Field of Classification Search
None
See application file for complete search history.

(56) References Cited

U.S. PATENT DOCUMENTS

2015/0215929 A1    7/2015  Damnjanoyic et al.
2016/0295607 A1*  10/2016  Vajapeyam ....... H04W 72/1284
2018/0077643 A1    3/2018  Dinan
(Continued)

FOREIGN PATENT DOCUMENTS

KR    10-2018-0137385    12/2018

OTHER PUBLICATIONS

Nokia, Nokia Shanghai Bell, "Remaining Details of New SCell State", R2-1802755, 3GPP TSG-RAN WG2 #101, Feb. 26-Mar. 3, 2018, 4 pages.

(Continued)

*Primary Examiner* — Kwang B Yao
*Assistant Examiner* — Juvena W Loo
(74) *Attorney, Agent, or Firm* — The Farrell Law Firm, P.C.

(57) ABSTRACT

A method of operating a user equipment (UE) in a wireless communication system, a method of operating an evolved Node B (eNB) in a wireless communication system, an apparatus of a UE in a wireless communication system, and an apparatus for operating an eNB in a wireless communication system are provided. The method of operating the UE includes receiving frequency measurement configuration information from an evolved Node B (eNB); performing frequency measurement in a radio resource control (RRC) idle mode or an RRC inactivate mode, based on the frequency measurement configuration information; and transmitting a result of the frequency measurement to the eNB.

38 Claims, 28 Drawing Sheets

(56) References Cited

U.S. PATENT DOCUMENTS

| | | | |
|---|---|---|---|
| 2018/0368018 A1 | 12/2018 | Kim et al. | |
| 2019/0021052 A1* | 1/2019 | Kadiri | H04W 52/0212 |
| 2019/0124558 A1* | 4/2019 | Ang | H04L 5/001 |
| 2019/0190682 A1* | 6/2019 | Kadiri | H04L 5/001 |
| 2019/0200413 A1* | 6/2019 | Hong | H04W 76/27 |
| 2019/0208429 A1* | 7/2019 | Hong | H04W 16/32 |
| 2020/0221323 A1* | 7/2020 | Xu | H04W 72/046 |
| 2020/0244410 A1* | 7/2020 | Kim | H04W 52/0206 |
| 2020/0259601 A1* | 8/2020 | Zhou | H04L 5/0085 |
| 2020/0260304 A1* | 8/2020 | Zhou | H04W 52/0235 |
| 2020/0260311 A1* | 8/2020 | Jung | H04W 76/30 |
| 2020/0260391 A1* | 8/2020 | Zhou | H04L 1/1819 |
| 2020/0267663 A1* | 8/2020 | Xu | H04W 52/242 |
| 2020/0313833 A1* | 10/2020 | Yi | H04W 52/0212 |
| 2020/0314664 A1* | 10/2020 | Zhou | H04L 25/0226 |
| 2020/0314745 A1* | 10/2020 | Yi | H04W 28/04 |
| 2020/0314747 A1* | 10/2020 | Zhou | H04W 52/0229 |
| 2020/0314816 A1* | 10/2020 | Yi | H04W 72/042 |
| 2020/0314860 A1* | 10/2020 | Zhou | H04W 72/14 |
| 2020/0314885 A1* | 10/2020 | Cirik | H04L 5/0048 |

OTHER PUBLICATIONS

NTT Docomo, Inc., "SCell Activation/Deactivation in NR CA", R2-1801396, 3GPP TSG-RAN WG2 NR Ad hoc 1801, Jan. 22-26, 2018, 3 pages.

Qualcomm Inc., "SCell New State Transitions and Signalling Procedures", R2-1802074, 3GPP TSG-RAN2 Meeting #101, Feb. 26-Mar. 2, 2018, 3 pages.

Vivo, "MAC CE for the New SCell State", R2-1802002, 3GPP TSG-RAN WG2 Meeting #101, Feb. 26-Mar. 2, 2018, 3 pages.

International Search Report dated Jul. 10, 2019 issued in counterpart application No. PCT/KR2019/003672, 9 pages.

European Search Report dated Apr. 23, 2021 issued in counterpart application No. 19777572.9-1205, 11 pages.

* cited by examiner

FIG.16B

APPARATUS AND METHOD FOR MEASUREMENT IN WIRELESS COMMUNICATION SYSTEM

CROSS-REFERENCE TO RELATED APPLICATION(S)

This application is based on and claims priority under 35 U.S.C. § 119 to Korean Patent Application Nos. 10-2018-0035954 and 10-2018-0049250, filed on Mar. 28, 2018 and Apr. 27, 2018, respectively, in the Korean Intellectual Property Office, the disclosures of which are incorporated herein by reference in their entireties.

BACKGROUND

1. Field

The disclosure generally relates to a wireless communication system and more particular to an apparatus and a method for measurement in a wireless communication system.

2. Description of Related Art

In order to meet wireless data traffic demands, which have increased since the commercialization of the 4th-Generation (4G) communication system, efforts to develop an improved 5th-Generation (5G) communication system or a pre-5G communication system have been made. For this reason, the 5G communication system or the pre-5G communication system is called a beyond-4G-network communication system or a post-LTE system.

In order to achieve a high data transmission rate, an implementation of the 5G communication system in a mmWave band (for example, 60 GHz band) is being considered. In the 5G communication system, technologies such as beamforming, massive multiple-input multiple-output (MIMO), full dimensional MIMO (FD-MIMO), array antenna, analog beam-forming, and large-scale antenna technologies are being discussed as means to mitigate a propagation path loss in the ultrahigh-frequency band and increase a propagation transmission distance.

Further, technologies such as evolved small cell, advanced small cell, cloud radio access network (RAN), ultra-dense network, device-to-device communication (D2D), wireless backhaul, moving network, cooperative communication, coordinated multi-points (COMP), and received interference cancellation have been developed in order to improve the system network in the 5G communication system.

In addition, the 5G system has developed advanced coding modulation (ACM) schemes such as hybrid frequency shift keying (FSK) and quadrature amplitude modulation (QAM) (FQAM) and sliding window superposition coding (SWSC), and has further developed advanced access technologies such as filter bank multi carrier (FBMC), non-orthogonal multiple access (NOMA), and sparse code multiple access (SCMA).

The 5G communication system operates to increase a signal gain through a beamforming scheme in order to overcome a path loss problem due to characteristics of a super-high frequency band (for example, mmWave). In addition, a user equipment (UE) is required to preliminarily perform frequency scanning to access an evolved Node B (eNB). As gain control is performed for each beam in a beamforming communication system, a time spent for frequency scanning to access the eNB may increase.

SUMMARY

An aspect of the disclosure provides an apparatus and a method for frequency measurement in a wireless communication.

Another aspect of the disclosure provides an apparatus and a method for rapidly performing frequency measurement in a wireless communication system.

Another aspect of the disclosure provides an apparatus and a method for rapidly reporting a frequency measurement result in a wireless communication system.

Another aspect of the disclosure provides an apparatus and a method for rapidly configuring carrier aggregation (CA) or dual connectivity (DC) in a wireless communication system.

Another aspect of the disclosure provides a definition of statuses of a secondary cell (SCell) in a wireless communication system.

Another aspect of the disclosure provides an apparatus and a method for switching statuses of SCells in a wireless communication system.

Another aspect of the disclosure provides an apparatus and a method for performing a frequency measurement operation based on statuses of SCells in a wireless communication system.

Another aspect of the disclosure provides an apparatus and a method to efficiently configure CA or DC by performing frequency measurement at an earlier time point.

Another aspect of the disclosure provides to efficiently perform measurement by defining states for SCells and performing measurement operations according to the states.

In accordance with an aspect of the disclosure, a method of operating a UE in a wireless communication system is provided. The method includes receiving frequency measurement configuration information from an eNB; performing frequency measurement in a radio resource control (RRC) idle mode or an RRC inactivate mode, based on the frequency measurement configuration information; and transmitting a result of the frequency measurement to the eNB.

In accordance with another aspect of the disclosure, a method of operating an eNB in a wireless communication system is provided. The method includes transmitting frequency measurement configuration information; receiving a result of a frequency measurement performed in an RRC idle mode or an RRC inactive mode, based on the frequency measurement configuration information, from a UE; and determining whether to perform CA or DC for the UE, based on the result of the frequency measurement.

In accordance with another aspect of the disclosure, an apparatus of a UE in a wireless communication system is provided. The apparatus includes at least one transceiver; and at least one processor connected to the at least one transceiver, wherein the at least one processor is configured to receive frequency measurement configuration information from an eNB, perform frequency measurement in an RRC idle mode or an RRC inactive mode, based on the frequency measurement configuration information, and transmit a result of the frequency measurement to the eNB.

In accordance with another aspect of the disclosure, an apparatus for operating an eNB in a wireless communication system is provided. The apparatus includes at least one transceiver; and at least one processor connected to the at least one transceiver, wherein the at least one processor is configured to transmit frequency measurement configuration information, receive a result of frequency measurement performed in an RRC idle mode or an RRC inactive mode, based on the frequency measurement configuration information, from a UE.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 16B is an illustration of an octet structure according to MAC control information supporting state transition for an SCell in a wireless communication system according to an embodiment;

DETAILED DESCRIPTION

Figure 1:
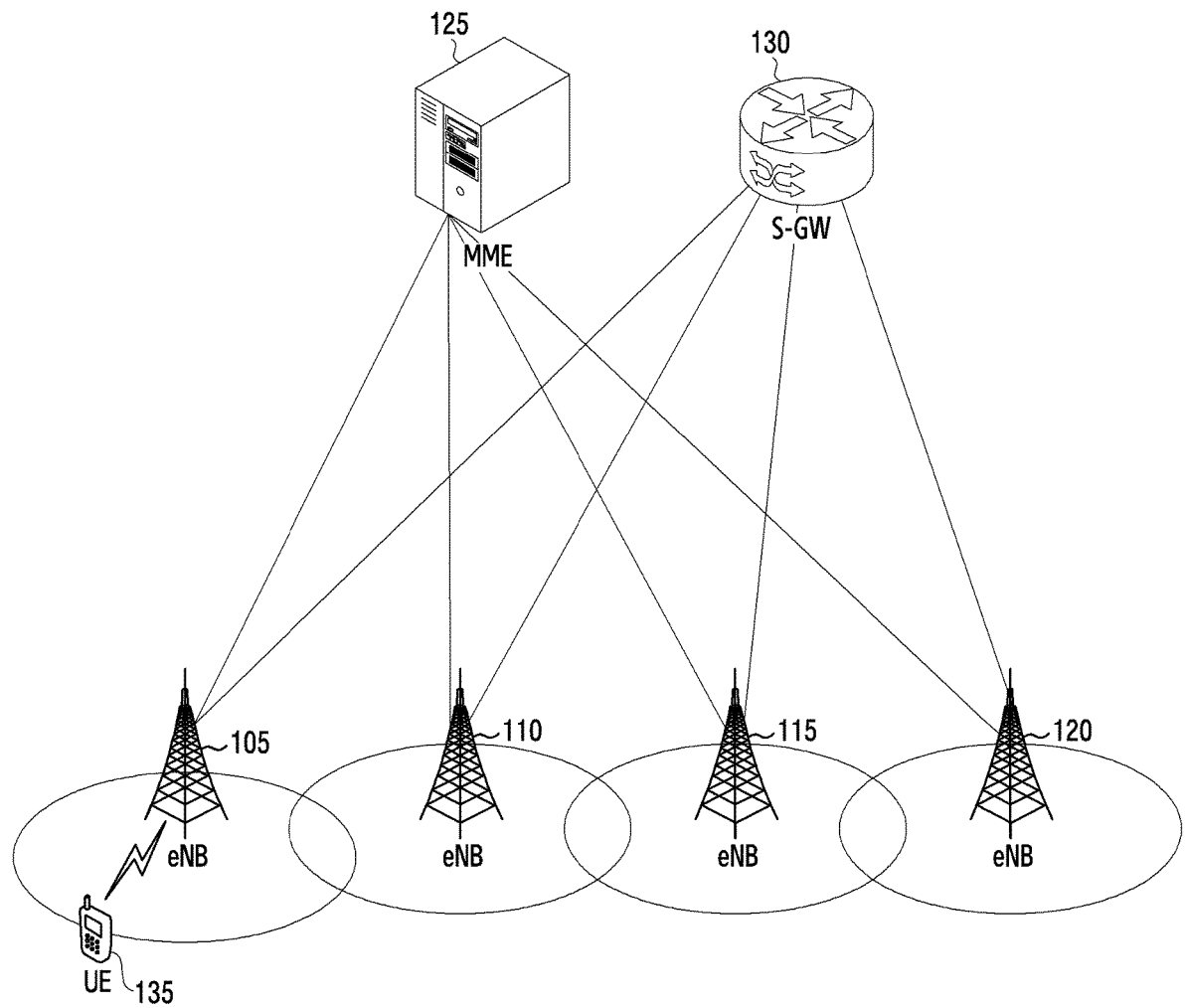
FIG. 1 is an illustration of a wireless communication system according to an embodiment.

The terms used in the disclosure are only used to describe certain embodiments, but are not intended to limit the disclosure. A singular expression may include a plural expression unless they are definitely different in a context. Unless defined otherwise, all terms used herein have the same meanings as those commonly understood by a person skilled in the art to which the disclosure pertains. Such terms as those defined in a generally used dictionary may be interpreted to have the meanings equal to the contextual meanings in the relevant field of art, but are not intended to be interpreted to have ideal or excessively formal meanings unless clearly defined in the disclosure. In some cases, even the terms defined in the disclosure are not intended to be interpreted to exclude embodiments of the disclosure.

Hereinafter, various embodiments of the disclosure are described based on an approach of hardware. However, various embodiments of the disclosure include a technology that uses both hardware and software and thus, the various embodiments of the disclosure may not exclude the perspective of software.

Hereinafter, the disclosure relates to a method and an apparatus in which a UE in an RRC idle mode or an RRC inactive mode performs frequency measurement and rapidly reports a frequency measurement result to an eNB, and the eNB rapidly configures CA technology in a wireless communication system. The RRC idle mode may be referred to as an RRC idle state (RRC inactive state), and the RRC inactive mode may be referred to as an RRC inactive state.

In order to support a service having a high data transmission rate and a low transmission delay in a wireless communication, an eNB is required to rapidly configure CA or DC technology in a UE. However, a frequency measurement result of a UE is needed to configure the technology in the UE. Accordingly, in the disclosure, a UE performs, in advance, frequency measurement in an RRC idle mode or an RRC inactive mode as well as an RRC-connected mode and rapidly reports a frequency measurement result to an eNB, and, thus, the eNB is required to rapidly configure frequency CA technology.

The disclosure discloses a method by which, when a UE transitions from an RRC-connected mode to an RRC idle mode or an RRC inactive mode, an eNB configures frequency measurement configuration information (intra-inter frequency measurement configuration) through an RRC message or broadcasts the frequency measurement configuration information through system information of each cell in order to allow the UE to perform frequency measurement in advance in the RRC idle mode or the RRC inactive mode in a wireless communication system. When the UE determines a valid frequency measurement result among measured frequency measurement results and indicates that there is a valid frequency measurement result to the eNB, the eNB may make a request for the frequency measurement result to the UE as necessary and, thus, the UE may report the frequency measurement result. Accordingly, the eNB may configure the UE to perform frequency measurement in the RRC idle mode or the RRC inactive mode before the UE configures a connection to a network. The eNB may receive the frequency measurement result. The eNB may rapidly configure CA if necessary. As described above, the eNB may rapidly provide a greater amount of data to the UE through small signaling overhead and a low transmission delay.

Hereinafter, the operating principle of the disclosure is described in detail with reference to the accompanying drawings. In describing the disclosure below, a detailed description of related known configurations or functions incorporated herein will be omitted when it is determined that the detailed description thereof may unnecessarily obscure the subject matter of the disclosure. The terms which are described below are terms defined in consideration of the functions in the disclosure, and may be different according to users, intentions of the users, or customs. Therefore, the definitions of the terms should be made based on the contents throughout the disclosure.

In describing the disclosure below, a detailed description of related known configurations or functions incorporated herein are omitted when the detailed description thereof may unnecessarily obscure the subject matter of the disclosure. Hereinafter, embodiments of the disclosure are described with reference to the accompanying drawings.

In the following description, terms for identifying an access node, referring to network entities, referring to messages, referring to interfaces between network entities, and referring to various pieces of identification information are used for convenience of description. Therefore, the disclosure is not intended to be limited by the terms provided below, and other terms that indicate subjects having equivalent meanings may be used.

The disclosure uses terms and names defined in a 3rd Generation Partnership Project Long Term Evolution (3GPP LTE) standard. However, the disclosure is not intended to be limited to the terms and names but may be equally applied to a system according to another standard. In the disclosure, an eNB is interchangeable with a generation Node B (gNB). That is, a base station described as an eNB may indicate a gNB.

FIG. 1 is an illustration of a wireless communication system according to an embodiment. The wireless communication system may be a system (for example, an evolved packet system (EPS)) to which long term evolution (LTE) radio access technology (RAT) is applied. Hereinafter, the system to which LTE RAT is applied may be called an "LTE system".

Referring to FIG. 1, a RAN of the LTE system includes an eNBs 105, 110, 115, and 120, a mobility management entity (MME) 125, and a serving gateway (S-GW) 130. A UE 135 may access an external network through the eNBs 105, 110, 115, or 120 and the S-GW 130.

The eNBs 105, 110, 115, and 120 correspond to conventional node Bs of a universal mobile telecommunication system (UMTS). The eNBs 105, 110, 115, or 120 may be connected to the UE 135 through a wireless channel and may play more complex roles than a conventional node B. In the LTE system, since all user traffic including a real-time service such as voice over Internet protocol (VoIP) through an Internet protocol is served through a shared channel, a device for collecting and scheduling status information such as buffer statuses, available transmission power statuses, and channel statuses of UEs is required, and the eNBs 105, 110, 115, and 120 serve as this device. One eNB may generally control a plurality of cells. For example, in order to implement a transmission rate of 100 megabits per second (Mbps), the LTE system uses an orthogonal frequency division multiplexing (OFDM) as a radio access technology in a bandwidth of 20 MHz. Further, a modulation scheme and an adaptive modulation and coding (AMC) scheme of determining a channel coding rate are applied to the LTE system in accordance with the channel status of the UE. The S-GW 130 is a device for providing a data bearer. The S-GW 130 may generate or remove a data bearer according to a control of the MME 125. The MME 125 is a device for performing a function of managing mobility of the UE and various control functions, and may be connected to a plurality of eNBs.

Figure 2:
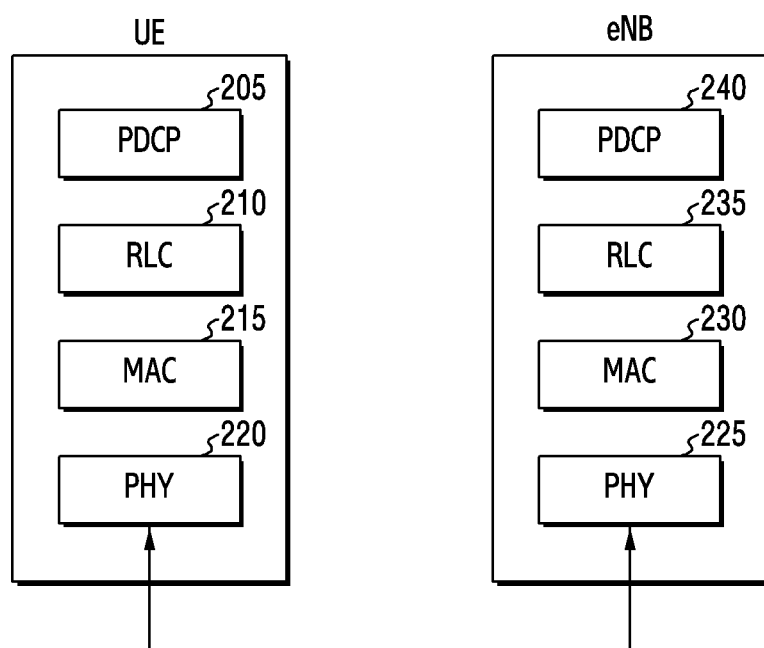
FIG. 2 is a block diagram of a wireless protocol in a wireless communication system according to an embodiment.

FIG. 2 is a block diagram of a wireless protocol in a wireless communication system according to an embodiment. The protocol structure may be a protocol structure in the LTE system.

Referring to FIG. 2, in the LTE system, a wireless protocol of a UE 135 may include a packet data convergence protocol (PDCP) 205, radio link control (RLC) 210, MAC 215, and physical layer (PHY) 220. In the LTE system, a wireless protocol of an eNB 105 may include a PDCP 240, RLC 235, MAC 230, and PHY 225.

The PDCP 205 and the PDCP 240 may compress or decompress an IP header. The PDCP 205 and PDCP 240 may compress or decompress the IP header through a robust header compression (ROHC) scheme. Main functions of the PDCP are described below and the PDCP 205 or the PDCP 240 may perform at least one of the following functions.

Header compression and decompression function (header compression and decompression: ROHC only)

User data transmission function (transfer of user data)

Sequential delivery function (in-sequence delivery of upper layer packet data units (PDUs) at PDCP re-establishment procedure for RLC acknowledge mode (AM))

Reordering function (for split bearers in DC (only support for RLC AM): PDCP PDU routing for transmission and PDCP PDU reordering for reception)

Duplicate detection function (duplicate detection of lower layer service data units (SDUs) at PDCP re-establishment procedure for RLC AM)

Retransmission function (retransmission of PDCP SDUs at handover and, for split bearers in DC, of PDCP PDUs at PDCP data-recovery procedure, for RLC AM)

Ciphering and deciphering function (ciphering and deciphering)

Timer-based SDU deletion function (timer-based SDU discard in uplink)

The RLC 210 or the RLC 235 may reconfigure the PDCP PDU to be a proper size and perform an automatic repeat request (ARQ) function. Main functions of the RLC 210 and the RLC 235 are described below and the RLC 210 or the RLC 235 may perform at least one of the following functions.

Data transmission function (transfer of upper layer PDUs)

ARQ function (error correction through ARQ (only for AM data transfer))

Concatenation, segmentation, and reassembly function (concatenation, segmentation and reassembly of RLC SDUs (only for unacknowledgement mode (UM) and AM data transfer))

Re-segmentation function (re-segmentation of RLC data PDUs (only for AM data transfer))

Reordering function (reordering of RLC data PDUs (only for UM and AM data transfer)

Duplication detection function (duplicate detection (only for UM and AM data transfer))

Error detection function (protocol error detection (only for AM data transfer))

RLC SDU deletion function (RLC SDU discard (only for UM and AM data transfer))

RLC re-establishment function (RLC re-establishment)

The MAC 215 or the MAC 230 may be connected to a plurality of RLC layer devices included in the UE. The MAC 2115 or the MAC 230 may multiplex RLC PDUs to the MAC PDU. The MAC 2115 or the MAC 230 may demultiplex RLC PDUs from the MAC PDU. Main functions of the MAC 215 or the MAC 230 are described below and may perform at least one of the following functions.

Mapping function (mapping between logical channels and transport channels)

Multiplexing and demultiplexing function (multiplexing/demultiplexing of MAC SDUs belonging to one or different logical channels into/from transport blocks (TBs) delivered to/from the physical layer on transport channels)

Scheduling information report function (scheduling information reporting)

Hybrid ARQ (HARQ) function (error correction through HARQ)

Logical channel priority control function (priority handling between logical channels of one UE)

UE priority control function (priority handling between UEs by means of dynamic scheduling)

Multimedia broadcast multicast service (MBMS) service identification function (MBMS service identification)

Transport format selection function (transport format selection)

Padding function (padding)

The PHY 220 or the PHY 225 may perform channel-coding and modulation on higher layer data to generate a symbol (for example, an OFDM symbol) and transmit the generated symbol through a wireless channel. The PHY 220 or the PHY 225 may perform demodulation and channel-decoding on the symbol received through the wireless channel and transmit the symbol to a higher layer.

Figure 3:
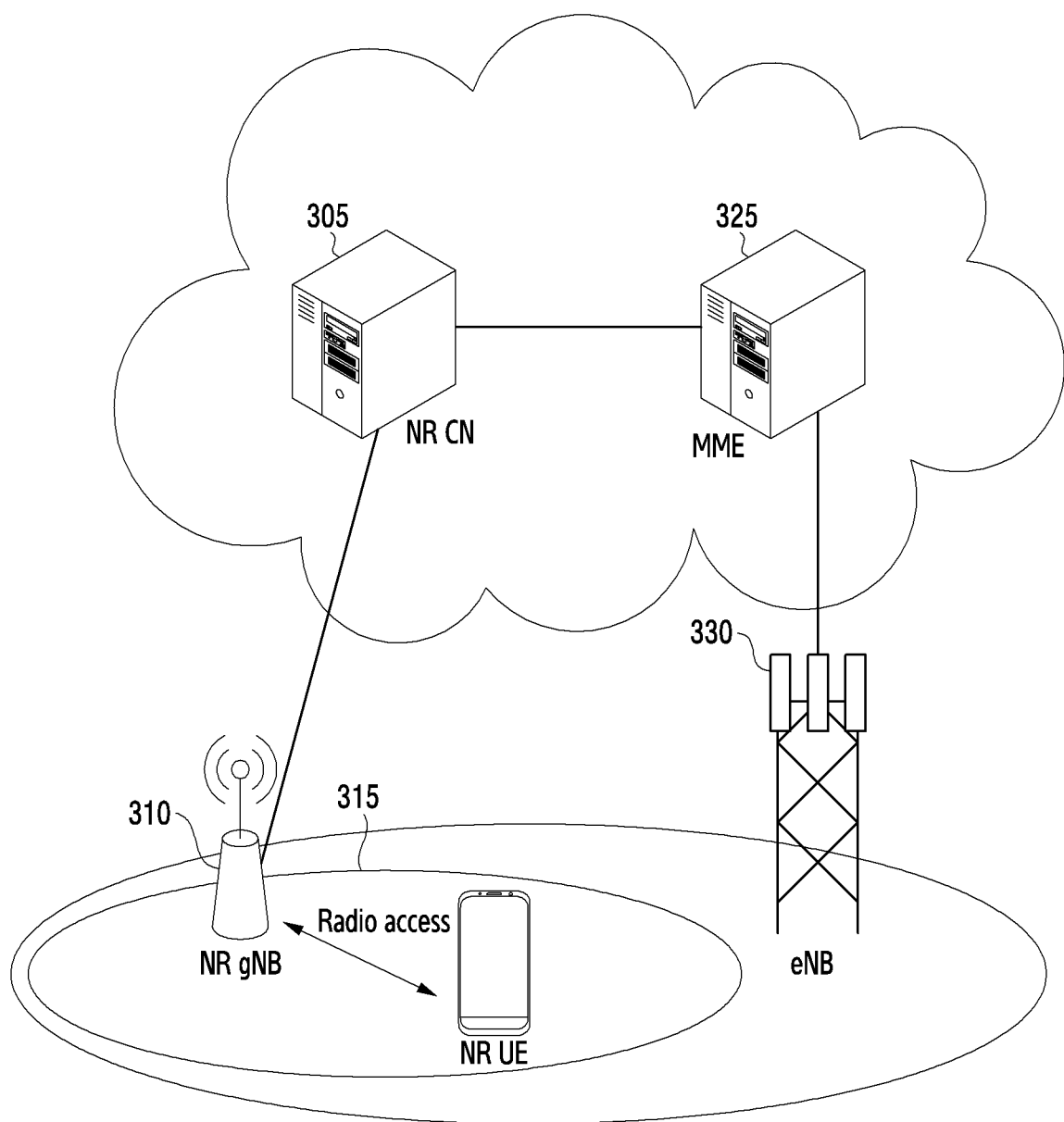
FIG. 3 is an illustration of a wireless communication system according to an embodiment.

FIG. 3 is an illustration of a wireless communication system according to an embodiment. The wireless communication system may support a RAT different from LTE of FIG. 1. The wireless communication system may include a system to which a new radio (NR) RAT is applied. Hereinafter, in the disclosure, a system to which the NR RAT is applied may be called an "NR system", a "5G communication system", or a "next-generation mobile communication system". According to an embodiment of the disclosure, the NR RAT may be an RAT which achieves a higher data transmission rate, higher reliability, and/or lower-latency data communication compared the LTE RAT.

Referring to FIG. 3, a RAN of the NR system includes the eNBs 105, 110, 115, and 120, the MME 125, and the S-GW 130. The UE 135 may access an external network through the eNBs 105, 110, 115, or 120 and the S-GW 130.

A radio access network of the NR system may include an NR next-generation Node B (NR gNB) 310 (hereinafter, referred to as a gNB) and an NR core network (NR CN) 305. The NR gNB may be called a next-generation eNB, an NR eNB, or a gNB. The UE 315 of the NR system (hereinafter, referred to as an NR UE or a terminal) may access an external network through the NR gNB 310 and the NR CN 305.

The NR gNB 310 corresponds to an eNB of the conventional LTE system. The NR gNB may be connected to the NR UE 315 through a radio channel and may provide better service than the conventional node B. Since all user traffic is served through a shared channel in the next-generation mobile communication system, the NR gNB 310 may collect and schedule status information such as buffer statuses, available transmission power statuses, and channel statuses of UEs. The NR gNB 310 generally controls a plurality of cells. The NR system may support the conventional maximum bandwidth or wider in order to implement a super-high data transmission compared to the current LTE system and a beamforming technology may be additionally grafted thereon through the RAT as an OFDM scheme. Further, a modulation scheme and an AMC scheme of determining a channel coding rate are applied in accordance with a channel status of the UE. The NR CN 305 may perform a function of supporting mobility, establishing a bearer, and configuring quality of service (QoS). The NR CN 305 is a device for performing a function of managing mobility of the UE and various control functions and may be connected to a plurality of eNBs. The NR system may interwork with the conventional LTE system. For example, the NR CN 305 is connected to the MME 325 through a network interface. The MME 325 may be connected to an eNB 330 which is the conventional eNB.

Figure 4:
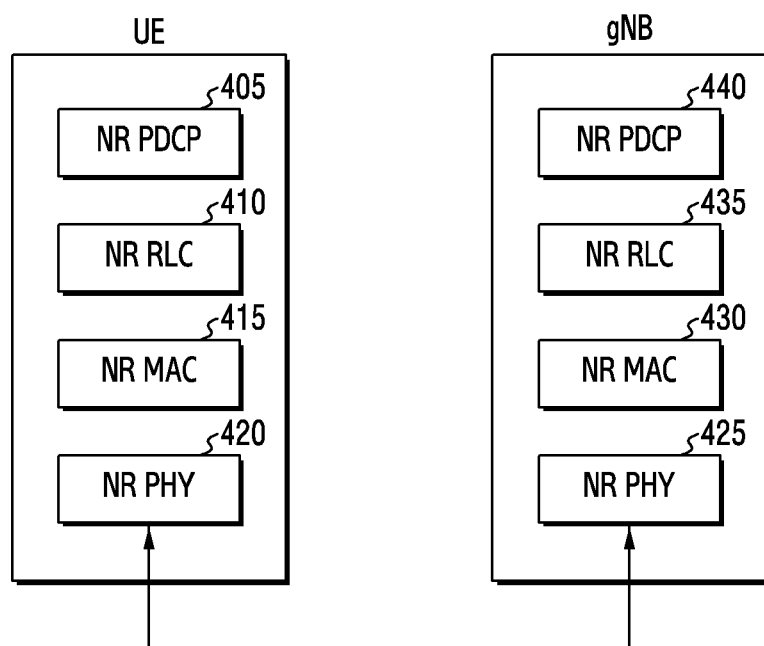
FIG. 4 is an illustration of a wireless protocol of a wireless communication system according to an embodiment.

FIG. 4 is an illustration of a wireless protocol of a wireless communication system according to an embodiment. The structure of the wireless protocol may be a structure of a wireless protocol of the NR system.

Referring to FIG. 4, a wireless protocol of the UE of the NR system may include an NR PDCP 405, an NR RLC 410, an NR MAC 415, and an NR PHY 420. A wireless protocol of the NR gNB of the NR system may include an NR PDCP 445, an NR RLC 435, an NR MAC 430, and an NR PHY 425.

The NR PDCP 405 and the NR PDCP 440 may perform at least one of the following functions.

Header compression and decompression function (header compression and decompression: ROHC only)

User data transmission function (transfer of user data)

Sequential delivery function (in-sequence delivery of upper layer PDUs)

Non-sequential delivery function (out-of-sequence delivery of upper layer PDUs)

Reordering function (PDCP PDU reordering for reception)

Duplicate detection function (duplicate detection of lower layer SDUs)

Retransmission function (retransmission of PDCP SDUs)

Ciphering and deciphering function (ciphering and deciphering)

Timer-based SDU deletion function (timer-based SDU discard in uplink)

In the above examples, the recording function of the NR PDCP is a function of sequentially reordering PDCP PDUs received by a lower layer based on a PDCP sequence number (SN). The reordering function may include at least one of a function of sequentially transmitting reordered data to a higher layer, a function of transmitting the data regardless of sequences thereof, a function of recording PDCP PDUs which are lost due to the reordering, a function of reporting statuses of the lost PDCP PDUs to a transmitting side, and a function of making a request for retransmitting the lost PDCP PDUs.

The NR RLC 410 and the NR RLC 435 may perform at least one of the following functions.

Data transmission function (transfer of upper layer PDUs)

Sequential delivery function (in-sequence delivery of upper layer PDUs)

Non-sequential delivery function (out-of-sequence delivery of upper layer PDUs)

ARQ function (error correction through ARQ)

Concatenation, segmentation, and reassembly function (concatenation, segmentation and reassembly of RLC SDUs)

Re-segmentation function (re-segmentation of RLC data PDUs)

Reordering function (reordering of RLC data PDUs)

Duplicate detection function (duplicate detection)

Error detection function (protocol error detection)

RLC SDU deletion function (RLC SDU discard)

RLC re-establishment function (RLC re-establishment)

In the above examples, the sequential delivery function (in-sequence delivery) of the NR RLC is a function of sequentially transmitting RLC SDUs received from a lower layer to the higher layer. The sequential delivery function may include, when one original RLC SDU is divided into a plurality of RLC SDUs and received, a function of reassembling and transmitting the RLC SDUs, a function of reordering the received RLC PDUs based on an RLC SN or a PDCP SN, a function of recording RLC PDUs lost due to the reordering, a function of reporting statuses of the lost RLC PDUs to a transmitting side, a function of making a request for retransmitting the lost RLC PDUs, a function of, when there is a lost RLC SDU, sequentially transmitting only RLC SDUs to a higher layer before the lost RCL SDU, a function of, when a predetermined timer expires although there is a lost RLC SDU, sequentially transmitting all RLC SDUs received before the timer starts to a higher layer, and a function of, when a predetermined timer expires although there is a lost RLC SDU, sequentially transmitting all RLC SDUs received to a higher layer. Further, the NR RLC may sequentially (that is, according to an SN, regardless of an SN, or in an order of arrival) process RLC PDUs and deliver the RLC PDUs to the PDCP regardless of sequences thereof (out-of sequence delivery), or when segments are received, may receive segments stored in a buffer or to be received in the future to reconfigure one complete RLC PDU and then transmit the RLC PDU to the PDCP to process the reconfigured RLC PDU. The NR RLC layer may not include a concatenation function. The function may be performed by the NR MAC layer or may be replaced with a multiplexing function of the NR MAC layer.

In the above examples, the non-sequential delivery function (out-of-sequence delivery) of the NR RLC is a function of transmitting RLC SDUs received from a lower layer to a higher layer regardless of sequences thereof. The non-sequential delivery function may include, when one original RLC SDU is divided into a plurality of RLC SDUs and received, a function of reassembling and transmitting the RLC SDUs and a function of storing RLC SNs or PDCP SNs of the received RCL PDUs, reordering the RLC PDUs, and recording lost RLC PDUs.

The NR MAC 415 or the NR MAC 430 may be connected to a plurality of NR RLC layer devices included in one UE. The NR MAC 415 or the NR MAC 430 may perform at least one of the following functions.

Mapping function (mapping between logical channels and transport channels)

Multiplexing and demultiplexing function (multiplexing/demultiplexing of MAC SDUs)

Scheduling information report function (scheduling information reporting)

HARQ function (error correction through HARQ)

Logical channel priority control function (priority handling between logical channels of one UE)

UE priority control function (priority handling between UEs by means of dynamic scheduling)

MBMS service identification function (MBMS service identification)

Transport format selection function (transport format selection)

Padding function (padding)

The NR PHY 420 or the NR PHY 425 may generate a symbol (for example, an OFDM symbol) by performing channel-coding and modulation on higher layer data, and transmit the generated symbol through a wireless channel. The NR PHY 420 or the NR PHY 425 may perform demodulation and channel-decoding on the symbol received through the wireless channel and transmit the symbol to a higher layer.

Hereinafter, the operation of the eNB or the UE in the wireless communication system according to the disclosure is described. A base station (BS) may be referred to as an access point (AP), an eNB, a 5G node, a next-generation NodeB (G NodeB or gNB), a wireless point", or other terms having equivalent meaning. According to an embodiment, the eNB may be connected to one or more transmission/reception points (TRPs). The eNB may transmit a downlink signal to the UE or receive an uplink signal through one or more TRPs. Hereinafter, a network node for transmitting a wireless signal to the UE is described as an example of the eNB in the disclosure. However, the disclosure is not intended to be limited thereto. Transmission of the wireless signal may include a configuration in which the eNB is connected to the TRP and the TRP transmits the wireless signal.

A terminal may be referred to as a UE, an NR UE, a mobile station, a subscriber station, a customer premises equipment (CPE), a remote terminal, a wireless terminal, an electronic device, a user device, or other terms having the equivalent meaning.

In the LTE system or the NR system (next-generation mobile communication system), the UE may perform frequency measurement while performing a cell reselection procedure in order to find a serving cell or a cell on which the UE camps in an RRC idle mode or an RRC inactive mode. However, the UE may separately measure a plurality of frequencies or may not report the frequency measurement result to the network. The UE may perform frequency measurement based on frequency measurement configuration information configured by the network after configuring the connection to the network and transitioning to the RRC-connected mode, and if a preset condition is satisfied, report the measurement result to the eNB.

That is, the eNB may configure the UE according to frequency measurement configuration information. The eNB may configure, in the UE, frequencies (for example, a frequency list) or frequency bands to be measured, put a priority for each frequency and configure the order of measurement, configure a filtering method of frequency intensity (for example, L1 filtering, L2 filtering, and L3 filtering methods, or a coefficient and a calculation method used for measurement), and configure an event or a condition for measurement in frequency measurement, a reference for measurement compared to the current serving cell (or a frequency on which the UE currently camps), an event or a condition under which the measured frequency result is reported, a reference or a condition under which a frequency is reported compared to the current serving cell (or a frequency on which the UE currently camps), and a period on which the frequency measurement result is reported. The UE measures corresponding frequencies according to the frequency configuration made by the eNB and reports frequency measurement results to the eNB according to a corresponding event or condition. The eNB may determine whether to apply CA or DC to the UE based on the frequency measurement results received from the UE.

The UE according to an embodiment of the disclosure may perform frequency measurement in the RRC idle mode or the RRC inactive mode. The eNB may set frequency measurement configuration in the UE through signaling (for example, an RRC message or system information). Further, the eNB may allow the UE to rapidly report the measured frequency measurement result, and when the eNB determines that the application of CA or DC is required, rapidly configure and activate CA or DC based on the frequency measurement result and allow the UE to use the CA or DC.

The disclosure discloses allowing the UE to start frequency measurement before transition to the RRC-connected mode and to rapidly report the measurement result before or after entering the RRC-connected mode. The proposed technologies may be very useful when the network rapidly configures CA or DC in the UE in an environment in which small cells are deployed in a macro cell.

Figure 5:
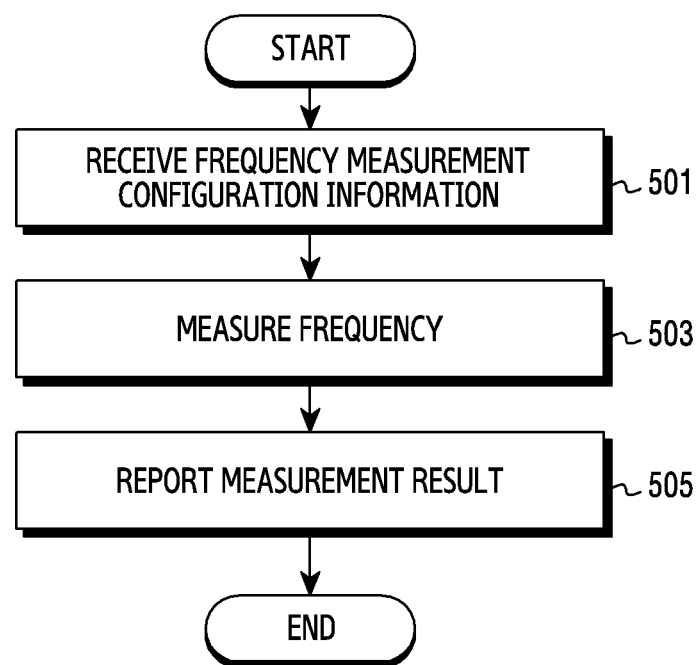
FIG. 5 is a flowchart of a method for measuring frequencies and reporting the measurement by a UE in a wireless communication system according to an embodiment.

FIG. 5 is a flowchart of a method for measuring frequencies and reporting the measurement by a UE in a wireless communication system according to an embodiment. For example, operations in which the UE in an RRC idle mode or an RRC inactive mode performs early frequency measurement and rapidly reports the frequency measurement result (fast measurement report) in the NR system of the disclosure is described below with reference to FIG. 5. The UE corresponds to the UE 135 of FIG. 1 or the UE 315 of FIG. 3.

Referring to FIG. 5, in step 501, the UE may receive frequency measurement configuration information. The frequency measurement configuration information may include parameters required when the UE performs frequency measurement. For example, the frequency measurement configuration information may include channel information to be measured, a measurement period, and a condition for reporting the measurement result. According to an embodiment, the frequency measurement configuration information may be information for configuring parameters required when the UE in the RRC idle mode or the RRC inactive mode performs frequency measurement.

The frequency measurement configuration information may be transmitted by the eNB through various schemes. For example, the frequency measurement configuration information may be transmitted while being included in an RRC message. For example, the RRC message may be an RRC message for making the UE transition from the RRC-connected mode to the RRC idle mode or the RRC inactive mode. For example, the RRC message may be a message transmitted from the eNB to the UE when the UE establishes the RRC connection with the eNB. For example, the frequency measurement configuration information may be transmitted while being included in system information. For example, the frequency measurement configuration information may be transmitted from the eNB to the UE in cell reselection in the RRC idle mode. Transmission of the frequency measurement configuration information is described below with reference to FIGS. 7 and 8.

In step 503, the UE may perform frequency measurement. The UE may perform frequency measurement in the RRC idle mode or the RRC inactive mode as well as the RRC-connected mode. The UE may more rapidly acquire the frequency measurement result by performing the frequency measurement earlier in the RRC idle mode or the RRC inactive mode. According to an embodiment, the frequency measurement may be performed before random access. The frequency measurement may be performed before reconfiguration of the RRC connection.

The frequency measurement in the RRC idle mode or the RRC inactive mode may be different from frequency measurement in the RRC-connected mode. For example, a signal to be measured in the RRC idle mode or the RRC inactive mode and a channel quality parameter (for example, received signal strength indicator (RSSI)) of the corresponding signal may be different from a signal to be measured in the RRC-connected mode and a channel quality parameter (for example, reference signal received power (RSRP)) of the corresponding signal.

According to an embodiment, a time point at which the frequency measurement is initiated may be variously determined. For example, the UE may initiate the frequency measurement at a time point at which frequency measurement configuration information of step 501 is received. For example, the UE may initiate frequency measurement after a predetermined interval from the time point at which the frequency measurement configuration information of step 501 is received. A time point at which the frequency measurement ends may be variously determined. For example, when the result of the frequency measurement is reported, the frequency measurement may end. For example, when a measurement interval arrives, the frequency measurement may end. Embodiments related to the time point and the end of the frequency measurement are described below in greater detail with reference to FIGS. 7 and 8.

In step 505, the UE may report the measurement result. The UE may transmit the frequency measurement result of step 503 to the eNB. Signaling of the report of the measurement result of the UE may be defined in various ways. In an embodiment, the UE may inform the eNB of the existence of the measurement result. The eNB makes a request for the measurement result to the UE if necessary. Upon receiving the request from the eNB, the UE may report the measurement result to the eNB. The eNB may make a request for the measurement result to the UE. The UE may report the measurement result to the eNB in response to the request from the eNB. The UE may report the measurement result to the eNB even through there is no request from the eNB. For example, the UE may periodically report the measurement result. For example, the UE may report the measurement result when a particular condition is satisfied.

According to, the UE may report at least a portion of the measurement result to the eNB rather than reporting all of the measurement result to the eNB. For example, the UE may transmit the frequency measurement result for SCells which satisfy a predetermined condition to the eNB. Examples of the condition are described below in greater detail with reference to FIGS. 7 and 8.

According to an embodiment, the UE may report the measurement result to the eNB in various manners. The UE may report the measurement result through a random access procedure, or RRC message or RRC reconfiguration message for the RRC connection. Examples of the transmission scheme of the measurement result is described below in greater detail with reference to FIGS. 7 and 8.

Additionally, in an embodiment, the UE may receive configuration information from the eNB. The configuration information may include parameters for configuration for supporting a particular communication technology, for example, configuration for CA or DC in the UE. The eNB may determine whether to perform CA or DC with the UE based on the measurement result received from the UE. When the eNB desires to configure CA or DC, the eNB may transmit the configuration information to the UE. For example, the eNB may transmit configuration information for configuring or adding the SCell for CA. The eNB may determine the SCell based on the reported measurement result. For example, the eNB may transmit configuration information for configuring a secondary cell group (SCG) for DC.

The UE may terminate the frequency measurement according to an embodiment. When the frequency measurement performed in the RRC inactive mode or the RRC idle mode is completed, the UE may stop the frequency measurement. Further, the UE may stop the frequency measurement while reporting the measurement result like in step 505. In addition, the UE may stop the frequency measurement if a predetermined condition is satisfied.

Figure 6:
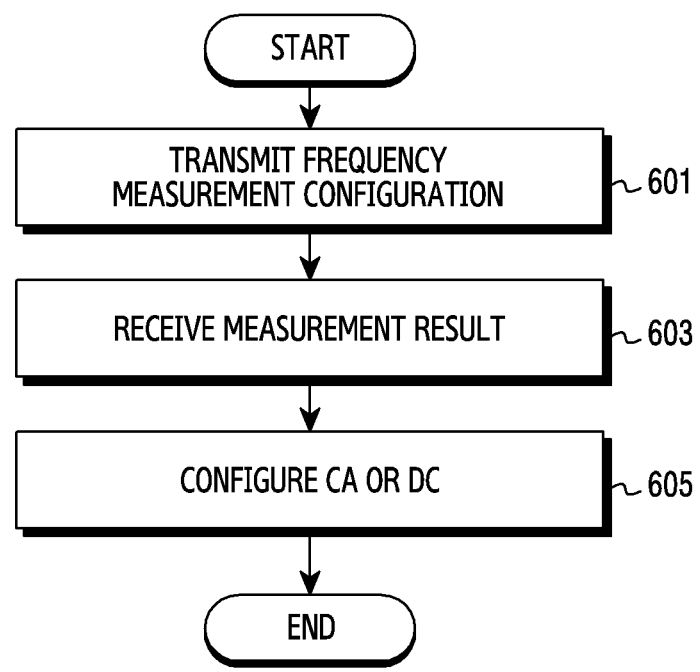
FIG. 6 is a flowchart of a method for frequency measurement and a measurement report by an eNB in a wireless communication system according to an embodiment.

FIG. 6 is a flowchart of a method for frequency measurement and a measurement report by the eNB in a wireless communication system according to an embodiment. The eNB corresponds to the eNB 110 of FIG. 1, the gNB 310, or the eNB 315 of FIG. 3.

Referring to FIG. 6, the eNB may transmit frequency measurement configuration information in step 601. The frequency measurement configuration information may include parameters required for frequency measurement in the RRC idle mode or the RRC inactive mode of the UE. The eNB may transmit frequency measurement configuration information through the RRC message or by broadcasting system information, or may reuse the previously used frequency measurement configuration information. The eNB may transmit frequency measurement configuration information for the RRC idle mode or the RRC inactive mode to the UE in the RRC-connected mode. The eNB may transmit frequency measurement configuration information to the UE in the RRC idle mode or the RRC inactive mode before receiving a random access preamble. The UE may transmit frequency measurement configuration information to the UE before establishing the connection again in the RRC inactive mode.

In step 603, the eNB may receive the measurement result from the UE. The UE may perform measurement based on the frequency measurement configuration information of step 601. The UE transmits the measurement result to the eNB according to various signaling methods. The UE may transmit the measurement result to the eNB according to a predetermined event or in every measurement. The UE may transmit the measurement result according to a request from the eNB. The eNB may make a request for the measurement result when a predetermined condition is satisfied (or a particular event is generated). The UE may transmit a signal informing that there is a valid measurement result to the eNB, and the eNB receiving the signal may make a request for the valid measurement result. Accordingly, the eNB may receive the measurement result.

The measurement result may include measurement results for SCells. The UE may perform measurement for the SCells according to the frequency measurement configuration information. The measurement results for the SCells include measurement results acquired based on a status of each of the SCells (for example, an activated, deactivated, or dormant status).

In step 605, the eNB may configure CA or DC based on the measurement result. The eNB may determine whether to apply CA or DC to the UE based on the frequency measurement result received from the UE. The UE may determine whether there is a SCell or primary SCell (PSCell) to which CA or DC can be applied based on measurement result reported in step 603. The eNB may configure CA or DC when CA or DC can be applied to the UE. Although FIG. 6 illustrates that CA or DC is always performed, CA or DC may not be performed after it is determined whether to perform CA or DC based on measurement result according to an embodiment of the disclosure.

Figure 7:
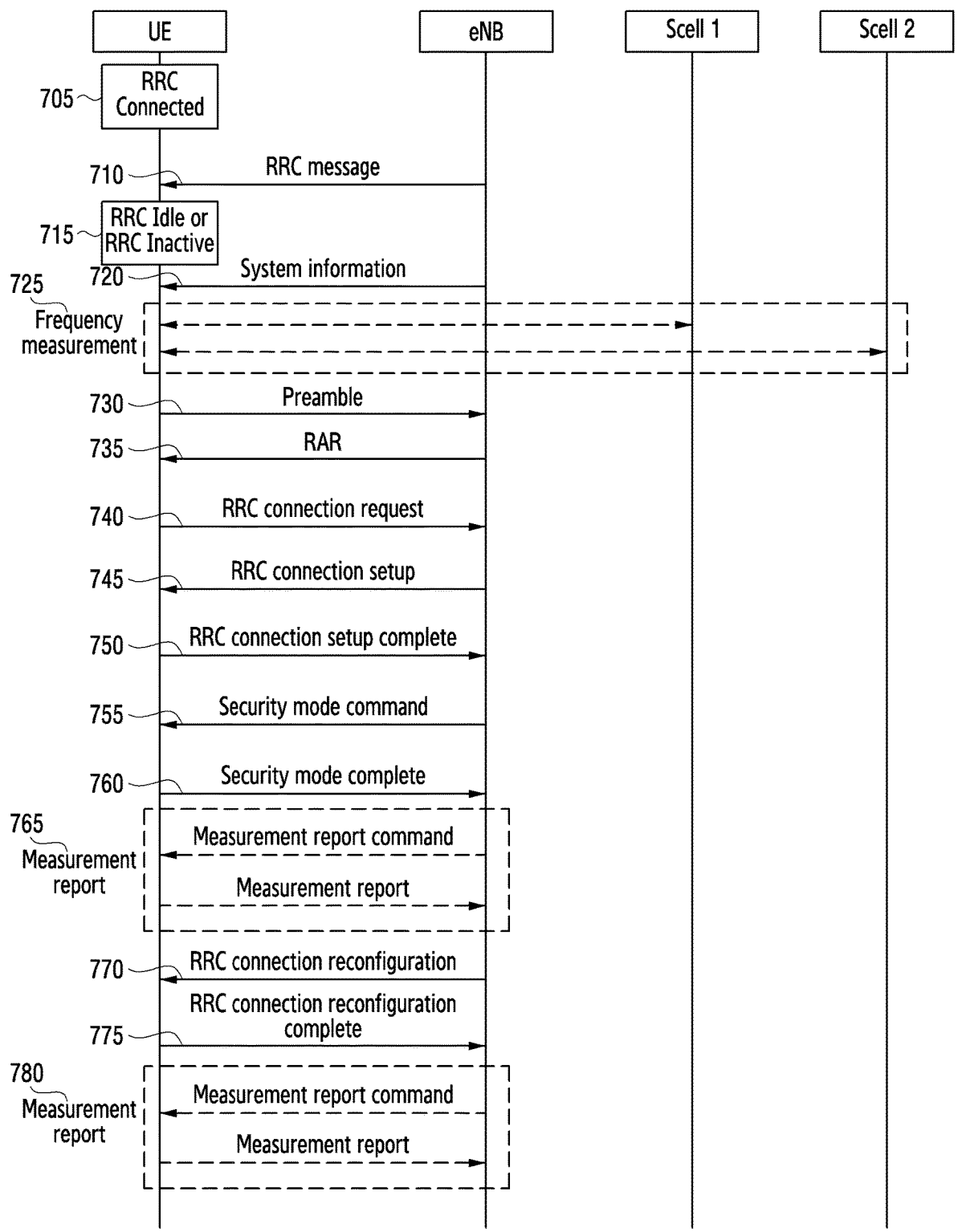
FIG. 7 is a flow diagram of signaling between an eNB and a UE for frequency measurement and a measurement report in a wireless communication system according to an embodiment.

FIG. 7 is a flow diagram of signaling between an eNB and a UE for frequency measurement and a measurement report in a wireless communication system according to an embodiment. The frequency measurement and the measurement report illustrated in FIG. 7 are performed by the UE in the RRC idle mode or the RRC inactive mode. The UE corresponds to the UE 135 of FIG. 1 or the UE 315 of FIG. 3. The eNB corresponds to the eNB 110 of FIG. 1, or the gNB 310 or the eNB 315 of FIG. 3.

Referring to FIG. 7, operations performed by the UE or the eNB according to an embodiment of the disclosure are described below. The UE is in the RRC-connected mode in step 705.

In step 710, the eNB may transmit a signal for controlling the UE, which transmits and receives data in the RRC-connected mode, to transition to the RRC idle mode or the RRC inactive mode. For example, when there is no data transmission and reception for a predetermined time for a predetermined reason, the eNB may transmit an RRC message (for example, RRC connection release, RRC connection suspend, or a new RRC message) to the UE and control the UE to transition to the RRC idle mode or the RRC inactive mode. That is, when the UE in the RRC-connected mode transitions to the RRC idle mode or the RRC inactive mode, the network may transmit the RRC message to instruct the UE to switch the mode. The RRC message may include information on a frequency to be measured in the RRC idle mode or the RRC inactive mode, a priority of the frequency, and a timer value. It may be more efficient that the network configures the frequency measurement configuration information in the UE through the RRC message rather than broadcasting the frequency measurement configuration information to a cell through system information. This is because the network is able to accurately know UE capability in the RRC-connected mode and thus the eNB may configure more suitable frequency measurement configuration information in the UE.

The RRC message may include various pieces of information. According to an embodiment, the RRC message may include information on a frequency corresponding to a measurement object or information on a frequency for each cell (information on cells or frequencies belonging to one eNB since CA technology supports a plurality of cells or frequencies belonging to one eNB), frequency band information, a frequency identifier (cell identifier), a measurement value (RSRP, reference signal received quality (RSRQ), or reference signal to interference and noise ratio (RS-SINR)) to be measured, a measurement object identifier, a measurement identifier (ID), or a report configuration ID.

The RRC message may include information on an area in which frequency measurement should be performed in the RRC idle mode or the RRC inactive mode (for example, a tracking area (TA), a list of cells, a RAN notification area, or a default area information used when there is no area information). Further, an area or a frequency which the UE should measure may be indicated by a physical cell ID or an eNB ID.

The RRC message may indicate a physical cell ID or an eNB ID and thus allow the UE to distinguish different cells or eNBs for the same frequency band in frequency measurement. That is, the UE may perform frequency measurement only for the frequency or the cell corresponding to the configured physical cell ID or eNB ID.

The RRC message may include an indicator indicating whether or not to perform frequency measurement in the RRC idle mode or the RRC inactive mode or whether to perform frequency measurement through frequency configuration information configured as the RRC message or frequency configuration information received as system information.

The RRC message may include information indicating which parameter among channel qualities for the frequency is measured and how the parameter is measured in frequency measurement in the RRC idle mode or the RRC inactive mode. The channel qualities may be at least one of beam RSRP (BRSRP), RSRP, RSRQ, RSSI, SINR, RS-SINR, carrier to interference and noise ratio (CINR), signal to noise ratio (SNR), error vector magnitude (EVM), bit error rate (BER), and block error rate (BLER). In the above example, other terms having the equivalent meaning or other metrics indicating channel quality may be used. In the disclosure, high channel quality indicates that a channel quality value related to a size of a signal is large or that a channel quality value related to an error rate is small. When the channel quality is high, a better wireless communication environment may be guaranteed. For example, the RRC message may include configuration information indicating measurement of one or a plurality of RSRP, RSRQ, and RS-SINR.

The RRC message may include information on a maximum number of frequencies (carriers) which can be measured in frequency measurement in the RRC idle mode or the RRC inactive mode.

The RRC message may configure a time during which the frequency measurement is performed to save battery power of the UE. For example, it is possible to save battery power of the UE by setting a timer value to perform frequency measurement only when the timer is driven and to stop the frequency measurement when the timer expires. That is, the RRC message may include a time during which the frequency measurement is performed in frequency measurement in the RRC idle mode or the RRC inactive mode.

The RRC message may include parameters such as a first time, a second time, a number of times, a threshold value, and a period. By configuring the parameters through the RRC message, the RRC message may indicate at least one of the following frequency measurement methods. When the UE performs the frequency measurement based on the parameter values and provides the measurement report, the UE may report a time stamp indicating how long ago or how recently the measurement was performed.

When a state in which the channel quality of the frequency (for example, RSRP, RSRQ, or RS-SINR) is greater than a predetermined threshold value is maintained for a predetermined time (the threshold value and the time may be configured in the UE through the RRC message or may be broadcasted through system information) and a period is given, the UE may perform measurement in every corresponding period.

When a state in which the channel quality of the frequency (for example, RSRP, RSRQ, or RS-SINR) is greater than a predetermined threshold value is measured a predetermined number of times or more (the threshold value and the number of times may be configured in the UE through the RRC message or may be broadcasted through system information) and a period is given, the UE may perform measurement in every corresponding period.

When a state in which the channel quality of the frequency (for example, RSRP, RSRQ, or RS-SINR) is greater than a predetermined threshold value within a predetermined time is measured a predetermined number of times or more (the threshold value and the number of times may be configured in the UE through the RRC message or may be broadcasted through system information) and a period is given, the UE may perform measurement in every corresponding period.

When a state in which the channel quality of the frequency (for example, RSRP, RSRQ, or RS-SINR) is greater than a predetermined threshold value within a predetermined first time (for example, while a timer is driven) is maintained for a predetermined second time (the threshold value, the first time, and the second time may be configured in the UE through the RRC message or may be broadcasted through system information) and a period is given, the UE may perform measurement in every corresponding period.

When a state in which the channel quality of the frequency (for example, RSRP, RSRQ, or RS-SINR) is greater than a predetermined threshold value within a predetermined first time (for example, while a timer is driven) is measured a predetermined number of times or more (the threshold value, the first time, and the number of times may be configured in the UE through the RRC message or may be broadcasted through system information) and a period is given, the UE may perform measurement in every corresponding period.

According to an embodiment, at least one piece of the information on the frequency measurement included in the RRC message may be broadcasted through system information of step 720. In other words, the system information may include pieces of information on the frequency measurement. For example, the system information may include information on a frequency corresponding to a measurement object or information on a frequency for each cell. For example, the system information may include information on which channel quality will be used for frequency measurement.

A new indicator may be defined in the RRC message. According to the new indicator, the eNB may indicate to the UE whether or not to perform frequency measurement in the RRC idle mode or the RRC inactive mode or whether to receive frequency measurement information according to system information and then perform frequency measurement or perform frequency measurement based on frequency measurement configuration information configured as the RRC message.

When instructing the UE to transition to the RRC inactive mode through the RRC message, the eNB may allocate in advance a security key (for example, a next hop changing counter (NCC)) to be used for resuming and provide the security key to the UE. The UE may encrypt information on the measured frequency result in the RRC inactive mode with the security key and report the information to the eNB in the future. By allocating the security key in advance, security may be enhanced in re-access of the UE and signaling overhead due to security configuration may be reduced. Through the security key configured in advance, when transmitting message 3 (RRC message, for example, RRC connection resume request), the UE may encrypt and transmit the RRC message and decrypt received decrypted message 4 (RRC message, for example, RRC connection resume).

A common configuration parameter or a configuration parameter for each SCell may be introduced to efficiently perform (for example, one time) configuration for a plurality of SCells through the RRC message. The eNB or the UE may use the common configuration parameter or the configuration parameter for each of the SCells. When the common configuration parameter and the configuration parameter for each SCell are configured, the configuration for each SCell may have precedence over the common configuration parameter. For example, a group identifier is defined and then a mapping relation with each SCell identifier may be defined. That is, one group identifier may be mapped to each of all SCell identifiers and one group identifier may indicate common configuration information of all SCells. Further, a plurality of group identifiers may be defined and SCell identifiers mapped to respective group identifiers may be defined, so that configuration information of cells may be configured in group units. The RRC message may include mapping information with a bandwidth part ID indicating a bandwidth part to be used for the SCell based on the SCell identifier, time/frequency resource information, or bandwidth part configuration information corresponding to each SCell.

According to various embodiments, by defining the indicator in the RRC message when making the UE transition to the RRC idle mode or the RRC inactive mode through the RRC message, the eNB may indicate to the UE whether to store and maintain or discard configuration information of SCells or the SCell state (activated state, dormant state, or deactivated state) information in the RRC idle mode or the RRC inactive mode. When mobility of the UE is not large, the UE may directly reuse the configuration information.

In step 715, the UE transitions to the RRC idle mode or the RRC inactive mode according to the indication of the RRC message. In the RRC idle mode or the RRC inactive mode, the UE may perform cell reselection during movement.

In step 720, the UE may receive system information of the cell. The UE searches for a suitable cell based on cell reselection. When a cell on which the UE camps is found, the UE receives and reads system information of the cell.

The UE may camp on the cell in the RRC idle mode or the RRC inactive mode and read information on a frequency to be measured in the RRC idle mode or the RRC inactive mode, a priority of the frequency, and timer information from the system information of the corresponding cell (for example, system information block (SIB) 5 in the LTE system and SIB 1, SIB 2, SIB 3, SIB 4, or SIB 5 in the NR system). At least one piece of the information included in the RRC message described in step 710 may be broadcasted as system information of step 720.

According to an embodiment, priorities of the RRC message of step 710 and the system information of step 720 may be determined. When frequency measurement information to be used in the RRC idle mode or the RRC inactive mode configured in the RRC message meets a first condition, the RRC message may be applied in preference to the system information.

The first condition may be determined by one condition or a combination of a plurality of conditions below.

The case in which a timer value configured in the RRC message does not expire.

The case in which the UE does not escape a list of valid cells or an area to perform frequency measurement configured in the RRC message.

The case in which the UE does not escape a cell which provides a service to the UE in the RRC-connected mode.

However, when a second condition is satisfied, the UE may determine that frequency measurement information to be used in the RRC idle mode or the RRC inactive mode configured in the RRC message is not valid anymore and preferentially use the system information for frequency measurement.

The second condition may be determined according to one or a combination of a plurality of conditions below.

The case in which a timer value configured in the RRC message expires.

The case in which the UE escapes a list of valid cells or an area to perform frequency measurement configured in the RRC message.

The case in which the UE escapes a cell which provides a service to the UE in the RRC-connected mode.

The UE receiving frequency measurement information to be measured in the RRC idle mode or the RRC inactive mode through system information to perform frequency measurement may move and perform cell reselection. When the UE accesses a new cell according to cell reselection, the UE may receive system information of the new cell. When the system information of the new cell is broadcasted while including frequency measurement information to be used in the RRC idle mode or the RRC inactive mode, the UE may receive the new system information and continuously perform frequency measurement in the RRC idle mode or the RRC inactive mode. When the system information of the new cell does not include frequency measurement information used in the RRC idle mode or the RRC inactive mode, the UE may stop frequency measurement in order to save battery power of the UE.

The UE may receive frequency measurement configuration information through an area update procedure. The UE moves while performing cell reselection. The UE may be connected to the network to perform a track area update (TAU) procedure when the moving UE is in the RRC idle mode or perform an RAN notification area update (RAN NAU) when the UE is in the RRC inactive mode. The network may newly configure, in the UE, frequency measurement information to be used in the RRC idle mode or the RRC inactive mode through the RRC message. As described above, when the UE accesses the network in the TAU or RAN NAU update procedure, if the frequency measurement information is configured in the UE, more suitable frequency measurement information can be configured for each UE and also signaling overhead can be reduced.

In step 725, the UE may perform frequency measurement. The UE in the RRC idle mode or the RRC inactive mode may perform frequency measurement according to frequency measurement information configured as the RRC message or frequency measurement information configured as system information. The frequency measurement performed by the UE in the RRC idle mode or the RRC inactive mode may include, for example, an operation for measuring channel quality (for example, RSRP, RSRQ, or RS-SINR) for a frequency instructed to be measured or an operation for measuring a time during which channel quality of the signal satisfies a predetermined range (for example, exceeds a threshold value). The frequency measurement may be referred to as fast frequency measurement.

In step 730, the UE may transmit a random access preamble (RAP). The eNB may receive a RAP. In step 735, the eNB may transmit a random access response (RAR) in response to the RAP. The UE may receive the RAR.

According to an embodiment, the UE may initiate frequency measurement at various time points. That is, the UE may start frequency measurement at one of the time points described below.

The UE may start frequency measurement at a time point at which the UE receive the RRC message and reads frequency measurement configuration information.

The UE may receive the RRC message, read frequency measurement configuration information, and start frequency measurement after n time units (for example, subframes, time slots, or transmission time intervals (TTIs)) indicated (or pre-appointed) by the frequency measurement configuration information.

The UE may start frequency measurement at a time point at which the UE receives the system information of step 720 and reads frequency measurement configuration information. In an embodiment, the UE may receive the system information of step 720, read frequency measurement configuration information, and start frequency measurement after n time units (for example, subframes, time slots, or TTIs) indicated (or pre-appointed) by the frequency measurement configuration information.

The UE may start frequency measurement at a time point at which a preamble is transmitted for the connection to the network. This is because battery power consumption increases if the frequency measurement continues even when the connection to the network is not necessary.

The UE may transmit a preamble for the connection to the network and start frequency measurement at a time point at which a RAR is received. This is because battery power consumption increases if the frequency measurement continues even when the connection to the network is not necessary.

The UE may transmit a preamble for the connection to the network, receive a RAR, and starts frequency measurement at a time point at which an RRC message (message 3, for example, an RRC connection request or an RRC connection resume request) is transmitted. This is because battery power consumption increases if the frequency measurement continues even when the connection to the network is not necessary.

The UE may transmit a preamble for the connection to the network, receive a RAR, and start frequency measurement at a time point at which an RRC message (message 3, for example, an RRC connection request or an RRC connection resume request) is transmitted and message 4 (RRC message, for example, RRC connection setup or RRC connection resume) is received. This is because battery power consumption increases if the frequency measurement continues even when the connection to the network is not necessary.

According to an embodiment, the UE may stop frequency measurement according to various conditions. For example, when the UE reports frequency measurement, the UE may stop the frequency measurement. For example, when transitioning to the RRC-connected mode, the UE may stop the frequency measurement. For example, when the UE receives an RRC message (for example, message 2 (that is, a random access response), message 4 (that is, a contention resolution message)), or a frequency measurement request message from the eNB or the UE reports the existence of a valid frequency measurement result to the eNB, the UE may stop the frequency measurement.

The frequency measurement performed by the UE in the RRC idle mode or the RRC inactive mode may be different from the frequency measurement performed in the RRC-connected mode. That is, when quality of intensity of the current serving cell is less than a predetermined reference (for example, RSRP, RSRQ, a reception level of the serving cell, or a cell selection quality value (for example, cell selection quality value (Squal))) in the frequency measurement performed in the RRC-connected mode, the UE initiates measurement of another frequency. That is, the purpose of the frequency measurement performed in the RRC-connected mode is to move to a better cell and receive a better service if a signal of the current serving cell is not good. However, the purpose of the frequency measurement performed by the UE in the RRC idle mode or the RRC inactive mode is to easily configure carrier aggregation technology by measuring and reporting another cell regardless of channel quality of the current serving cell. While the UE in the RRC-connected mode can perform frequency measurement based on a channel state information reference signal (CSI-RS) based on a time reference value of the serving cell, the UE in the RRC idle mode or the RRC inactive mode cannot measure channel quality (for example, RSRP, RSRQ, or RS-SINR) based on a channel reference signal (CRS) because there is no serving cell. That is, the RRC-connected mode and the RRC idle mode or the RRC inactive mode may have different reference signals which are frequency measurement objects. With respect to the frequency measurement performed by the UE in the RRC idle mode or the RRC inactive mode, if the measurement result in the frequency of the serving cell is greater than SnonIntraSearch and SnonIntraSearchQ (for example, cell selection receive (RX) value (Srxlev)>$S_{nonIntraSearchP}$ or Squal>$S_{nonIntraSearchQ}$), the UE may perform frequency measurement for a frequency of an area, which is not the serving cell (hereinafter, referred to as a non-serving frequency).

Subsequently, the UE which does not currently establish the connection, that is, the UE in the RRC idle mode or the RRC inactive mode may perform an RRC connection establishment process with the eNB when data to be transmitted is generated. The UE may establish backward transmission synchronization with the eNB through a random access process in steps 730 and 735.

In step 740, the UE may transmit an RRCConnectionRequest message to the eNB. The message includes a reason (establishmentCause) to establish the connection with an identifier of the UE. In step 745, the eNB may transmit an RRCConnectionSetup message to allow the UE to establish the RRC connection. The message may include RRC connection configuration information. The RRC connection is also referred to as a signaling radio bearer (SRB), and is used for transmitting and receiving an RRC message which is a control message between the UE and the eNB. In step 750, the UE establishing the RRC connection may transmit an RRCConnectionSetup message to the eNB.

An RRCConnetionSetupComplete message is included in a control message (for example, a service request) making a request by the UE for establishing a bearer for a predetermined service to the MME. The eNB may transmit the control message included in the RRCConnetionSetupComplete message to the MME. The MME determines whether to provide the service requested by the UE. If it is determined to provide the service requested by the UE based on the determination result, the MME transmits a setup request message (for example, an initial context setup request) to the eNB. The setup request message may include quality of service (QoS) information to be applied to establishment of the data radio bearer (DRB) and security-related information to be applied to the DRB (for example, a security key and a security algorithm). The eNB may transmit a security configuration message (for example, SecurityModeCommand) to configure security with the UE in step 755 and transmit a security configuration completion message (for example, SecurityModeComplete) to inform the eNB of security configuration in step 760, which completes the security configuration procedure.

The UE may report a valid frequency measurement result to the eNB. That is, if there is a valid frequency measurement result which satisfies a predetermined condition for the SCell, the UE in the RRC idle mode or the RRC inactive mode may report the valid measurement result value to the eNB when establishing the connection to the network. For example, the UE may report the existence of the valid frequency measurement result value to the eNB through message 3 (for example, an RRC message, an RRC connection request, an RRC connection resume request, or a new RRC message) or message 5 (for example, an RRC message, an RRC connection setup complete, an RRC connection resume complete, or a new RRC message). According to a definition of a new indicator or an information element (IE) in the RRC message, the existence of the valid frequency measurement result value may be indicated. Further, according to allocation of a logical channel identifier (LCID) used by the MAC layer, a MAC control element may indicate the existence of the valid frequency measurement result value.

The eNB may make a request for reporting the measurement result to the UE. When the eNB knows that there is the valid frequency measurement result measured by the UE in the RRC idle mode or the RRC inactive mode, the eNB may make a request for reporting the measurement result to the UE as necessary. The measurement result report may be requested through various methods. According to an embodiment, the eNB may make a request for reporting the measurement result by transmitting an indicator through message 2 (RAR) or message 4. The eNB may make a request for reporting the measurement result by transmitting an RRC message for a separate measurement report request (a new RRC message or a conventionally defined RRC message, for example, a measurement report command) after security configuration is completed. New MAC control information for the measurement report request may be defined and a new logical channel identifier is defined. The eNB may make a request for the measurement report by transmitting the MAC control information to the UE.

When the UE receives the measurement report request from the eNB, the UE may transmit the measurement result. The UE may encrypt the measurement result through the configured security configuration information and transmit the encrypted measurement result. If the report of the frequency measurement result is not encrypted, the frequency measurement information may be hacked or leaked and the location of the UE may be tracked based on the frequency measurement report and thus personal information may be exposed. Accordingly, it is required to perform the frequency measurement report after encryption. The UE may transmit the frequency measurement result to the eNB through an RRC message (a new RRC message or a conventionally defined RRC message, for example, a measurement report). Alternatively, new MAC control information for the measurement report is defined and a new logical channel identifier is defined, and thus the UE may provide the measurement report by transmitting the MAC control information to the eNB.

According to an embodiment, a random access procedure may be used for the valid frequency measurement result and the request and report of the frequency measurement result. Preambles of message 1 may be grouped. Among the grouped preambles, particular preambles may indicate the existence of the measurement report result. The UE may inform the eNB that there is the valid frequency measurement result by transmitting preamble(s) corresponding to a particular group. The UE may identify whether there is a request for the measurement result by receiving the RAR (message 2) from the eNB. When the report of the measurement result is requested by the RAR (for example, the existence of an indicator), the UE may report the measurement result through message 3. The eNB may transmit an RRC configuration message for configuring the SCell based on the measurement result to the UE.

When there is the valid frequency measurement result report, the UE may report the frequency measurement result to the eNB. That is, when there is the valid frequency measurement result report, the UE may transmit the report of the frequency measurement result to the eNB even through there is no request from the eNB. The UE may transmit the frequency measurement result to the eNB through an RRC message (a new RRC message, a conventionally defined RRC message, message 3, or message 5, for example, a measurement report). As new MAC control information for the measurement report is defined and a new logical channel identifier is defined, the UE may provide the measurement report by transmitting MAC control information to the eNB.

The UE may transmit a necessary frequency measurement result among all frequency measurement results to the network (eNB). The UE performing the frequency measurement in the RRC idle mode or the RRC inactive mode may report the frequency measurement result for carriers (SCell), to which CA can be applied, to the network. The UE may report the measurement result only for the SCell satisfying a predetermined condition. In other words, the SCell to which CA can be applied is the SCell satisfying the predetermined condition.

The UE may report the frequency measurement result for the SCell satisfying the predetermined condition to the network based on measurement of the UE. If a period is given, the UE may perform measurement in every corresponding period. The predetermined condition may include at least one of the following conditions.

When a state in which the intensity of the signal of the frequency (for example, RSRP, RSRQ, or RS-SINR) is greater than a predetermined threshold value is maintained for a predetermined time, the condition is satisfied (the threshold value and the time may be configured in the UE through an RRC message or may be broadcasted through system information).

When a state in which the intensity of the signal of the frequency (for example, RSRP, RSRQ, or RS-SINR) is greater than a predetermined threshold value is measured a predetermined number of times or more, the condition is satisfied (the threshold value and the number of times may be configured in the UE through an RRC message or may be broadcasted through system information).

When a state in which the intensity of the signal of the frequency (for example, RSRP, RSRQ, or RS-SINR) is greater, than a predetermined threshold value within a predetermined time is measured a predetermined number of times or more, the condition is satisfied (the threshold value, the time, and the number of times may be configured in the UE through an RRC message or may be broadcasted through system information).

When a state in which the intensity of the signal of the frequency (for example, RSRP, RSRQ, or RS-SINR) is greater than a predetermined threshold value within a first time (for example, while a timer is driven) is maintained for a second time, the condition is satisfied (the threshold value, the first time, and the second time may be configured in the UE through an RRC message or may be broadcasted through system information).

When a state in which the intensity of the signal of the frequency (for example, RSRP, RSRQ, or RS-SINR) is greater than a predetermined threshold value within a first time (for example, while a timer is driven) is measured a predetermined number of times or more, the condition is satisfied (the threshold value, the first time, and the number of times may be configured in the UE through an RRC message or may be broadcasted through system information).

When the frequency measured by the UE in the RRC idle mode or the RRC inactive mode is a cell or a frequency indicated by system information of the serving cell which the UE accesses, the condition is satisfied, CA technology can be supported for a plurality of cells served by one eNB, so that the CA technology cannot be applied no matter how good a signal of a cell served by another eNB is. Accordingly, the frequency measurement result measured by the UE can be used for application of the carrier aggregation technology only when the frequency measurement result is a measurement result for the cell which the UE accesses or the frequency supported by the eNB). For example, when the frequency is a frequency or a cell belonging to a cell list indicated by system information (white cell list), the corresponding frequency or cell satisfies the condition.

When the eNB does not know UE capability of the UE currently having the established connection or when the eNB is required to identify UE capability, the eNB may transmit a message (for example, a UE capability enquiry) asking of UE capability. The UE may transmit a message (for example, UE capability) reporting its own capability. Through the message, the UE may report information on whether frequency measurement can be performed in the RRC idle mode or the RRC inactive mode or information on frequencies or a frequency area which can be measured or a maximum number of frequencies which can be measured to the eNB.

In step 770, the eNB may transmit an RRCConnectionReconfiguration message to the UE. When security configuration is completed according to steps 755 and 760, the eNB may transmit an RRCConnectionReconfiguration message to the UE. The message may include configuration information of the DRB for processing user data. The UE may receive configuration information of the DRB. Before transmitting a reconfiguration message (RRCConnectionReconfiguration), the eNB may transmit a measurement report request (measurement report command) and the UE may transmit a measurement report in step 765.

In step 775, the UE may transmit an RRCConnectionReconfigurationComplete message to the eNB. The UE may establish the DRB by applying the configuration information of the DRB received in step 770 and transmit the RRCConnectionReconfigurationComplete message to the eNB.

According to an embodiment, a common configuration parameter or a configuration parameter for each SCell may be introduced to efficiently perform (for example, one time) configuration for a plurality of SCells through the RRC message (RRC connection reconfiguration) of step 770. The eNB or the UE may use the common configuration parameter or the configuration parameter for each of the SCells. When the common configuration parameter and the configuration parameter for each SCell are configured, the configuration for each SCell may have precedence over the common configuration parameter. For example, a group identifier is defined and then a mapping relation with each SCell identifier may be defined. That is, one group identifier may be mapped to each of all SCell identifiers and one group identifier may indicate common configuration information of all SCells. Further, a plurality of group identifiers may be defined and SCell identifiers mapped to respective group identifiers may be defined, so that configuration information of cells may be configured in group units. The RRC message may include mapping information with a bandwidth part ID indicating a bandwidth part to be used for the SCell based on the SCell identifier, time/frequency resource information, or bandwidth part configuration information corresponding to each SCell. After transmitting the RRC reconfiguration message (RRCConnectionReconfiguration), the eNB may transmit a measurement report request (measurement report command) and the UE may transmit a measurement report in step 780.

When the SCells are configured in the RRC message, an initial state of the SCell may be configured as an activated state, a dormant state, or a deactivated state. If the SCells are configured to have an initial state corresponding to an activated state or a dormant state when configuration information of the SCells is transmitted, the UE may directly perform and report frequency measurement for the SCells, so that the eNB may rapidly apply the CA technology. Transition to the activated state, the dormant state, or the deactivated state of each SCell may be indicated to the UE in the RRC-connected mode through MAC control information. When the SCell is in the activated state or the dormant state, the UE in the RRC-connected mode may perform frequency measurement and report the frequency measurement result to the eNB. The frequency measurement report may be provided through an RRC message or MAC control information. When the state of each SCell is configured as the activated state or the dormant state through the RRC message, the UE may be configured according to configuration information including an integer indicating when physical downlink control channel (PDCCH) monitoring is started and when report of the frequency (channel or cell) measurement result is started. For example, the UE may start PDCCH monitoring or the measurement result report after time units (for example, subframes, time slots, or TTIs) corresponding to the indicated integer.

The eNB completing establishment of the DRB with the UE transmits an initial context setup complete message to the MME. The MME receiving the message exchanges an S1 bearer setup message and an S1 bearer setup response message with the S-GW in order to establish an S1 bearer. The S1 bearer is a connection for data transmission established between the S-GW and the eNB and corresponds to the DRB in one-to-one correspondence. When the processor is completed, the UE transmits and receives data through the eNB and the S-GW. Further, the eNB may transmit an RRCConnectionReconfiguration message in order to provide new configuration to the UE or add or change the configuration for a predetermined reason.

In this disclosure, a cell and a carrier may indicate the same meaning. An SCell denotes a secondary cell. When CA is used, more data may be transmitted and received through additional carriers or cells as well as a primary cell (Pcell) receiving and transmitting control signal between the eNB and the UE, and the additional carriers or cells may be referred to as SCells. According to an embodiment, a serving cell may include the SCell.

The frequency measurement procedure and the frequency configuration information in the RRC idle mode or the RRC inactive mode in the disclosure may extend to be applied to the UE in the RRC-connected mode. The frequency measurement procedure and the frequency configuration information in the RRC idle mode or the RRC inactive mode in the disclosure may be applied and performed independently from the frequency measurement procedure performed by the UE in the RRC idle mode or the RRC inactive mode when the UE performs the cell reselection procedure. According to an embodiment, since there is a maximum number of frequencies which can be measured according to UE capability, the eNB may set configuration information of the frequency measurement method in consideration of the UE capability.

Figure 8:
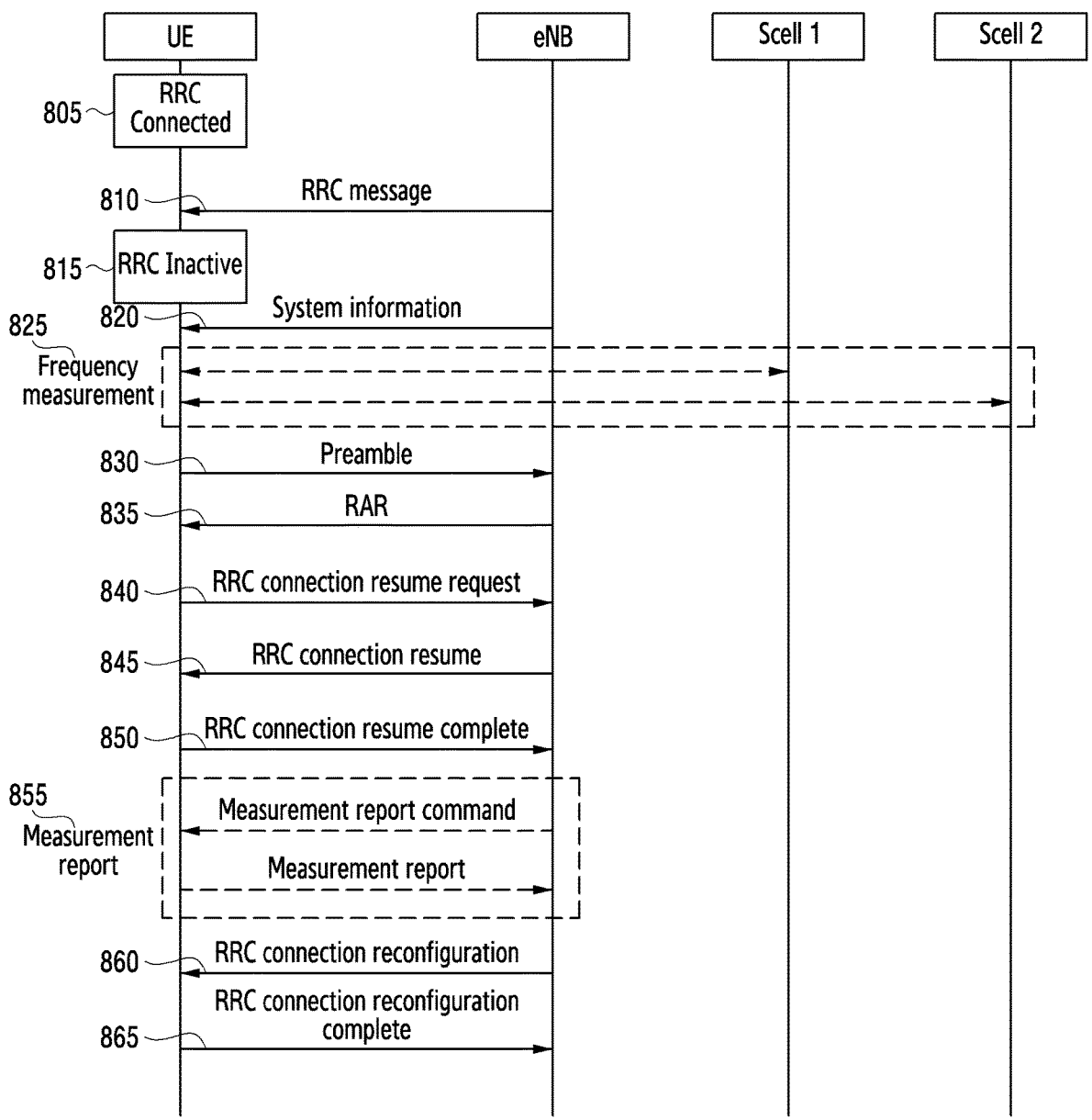
FIG. 8 is a flow diagram of signaling between an eNB and a UE for a frequency measurement and a measurement report in a wireless communication system according to an embodiment.

FIG. 8 is a flow diagram of signaling between an eNB and an UE for frequency measurement and a measurement report in a wireless communication system according to an embodiment. The frequency measurement and the measurement report are performed by the UE in the RRC inactive mode. The UE corresponds to the UE 135 of FIG. 1 or the UE 315 of FIG. 3. The eNB corresponds to the eNB 110 of FIG. 1, the gNB 310, or the eNB 315 of FIG. 3.

Referring to FIG. 8, an embodiment performed by the UE or the eNB is described below. The UE is in the RRC-connected mode in step 805.

In step 810, the eNB may transmit a signal for controlling the UE, which transmits and receives data in the RRC-connected mode, to transition to the RRC inactive mode. For example, when there is no data transmission and reception for a predetermined reason or for a predetermined time, the eNB may transmit an RRC message (for example, an RRC connection release, an RRC connection suspend, or a new RRC message) to the UE and control the UE to transition to the RRC inactive mode in step 815. That is, when the UE in the RRC-connected mode transitions to the RRC inactive mode, the network may transmit the RRC message to instruct the UE to switch the mode. The RRC message may include information on a frequency to be measured in the RRC inactive mode, a priority of the frequency, and a timer value. According to an embodiment, it may be more efficient that the network configures the frequency measurement configuration information in the UE through the RRC message rather than broadcasting the frequency measurement configuration information to a cell through system information. This is because the network is able to accurately know UE capability in the RRC-connected mode and thus the eNB may configure more suitable frequency measurement configuration information in the UE.

The RRC message may include various pieces of information. The RRC message may include information on a frequency corresponding to a measurement object or information on a frequency for each cell (information on cells or frequencies belonging to one eNB since CA technology supports a plurality of cells or frequencies belonging to one eNB), frequency band information, a frequency identifier (cell identifier), a measurement value (RSRP, RSRQ, or RS-SINR) to be measured, a measurement object identifier, a measurement ID, or a report configuration ID.

The RRC message may include information on an area in which frequency measurement is performed in the RRC inactive mode (for example, a TA, a list of cells, a RAN notification area (RNA), or default area information used when there is to area information). Further, an area or a frequency which the UE should measure may be indicated by a physical cell ID or an eNB ID.

The RRC message may indicate a physical cell identifier or an eNB identifier and thus allow the UE to distinguish different cells or eNBs for the same band in frequency measurement. That is, the UE may perform frequency measurement only for the frequency or the cell corresponding to the configured physical cell ID or eNB ID.

The RRC message may include an indicator indicating whether or not to perform frequency measurement in the RRC inactive mode or whether to perform frequency measurement through frequency configuration information configured as the RRC message or frequency configuration information received as system information.

The RRC message may include information indicating which parameter among channel qualities for the frequency is measured and how the parameter is measured in frequency measurement in the RRC inactive mode. For example, the RRC message may include configuration information indicating measurement of one or a plurality of RSRP, RSRQ, and RS-SINR.

The RRC message may include information on a maximum number of frequencies (carriers) which can be measured in frequency measurement in the RRC inactive mode.

The RRC message may configure a time during which the frequency measurement is performed to save battery power of the UE. For example, it is possible to save battery power of the UE by setting a timer value to perform frequency measurement only when the timer is driven and to stop the frequency measurement when the timer expires. That is, the RRC message may include a time during which frequency measurement is performed in the RRC inactive mode.

The RRC message may include parameters such as a first time, a second time, a number of times, a threshold value, or a period. By configuring the parameters, the RRC message may indicate at least one of the following frequency measurement methods. When the UE performs the frequency measurement based on the parameter values and provides the measurement report, the UE may report a time stamp indicating how long ago or how recently the measurement was performed.

A state in which the channel quality of the frequency (for example, RSRP, RSRQ, or RS-SINR) is greater than a predetermined threshold value is maintained for a predetermined time (the threshold value and the time may be configured in the UE through the RRC message or may be broadcasted through system information). When a period is given, the UE may perform measurement in every corresponding period.

When a state in which the channel quality of the frequency (for example, RSRP, RSRQ, or RS-SINR) is greater than a predetermined threshold value is measured a predetermined number of times or more (the threshold value and the number of times may be configured in the UE through the RRC message or may be broadcasted through system information) and a period is given, the UE may perform measurement in every corresponding period.

When a state in which the channel quality of the frequency (for example, RSRP, RSRQ, or RS-SINR) is greater than a predetermined threshold value within a predetermined time is measured a predetermined number of times or more (the threshold value and the number of times may be configured in the UE through the RRC message or may be broadcasted through system information) and a period is given, the UE may perform measurement in every corresponding period.

When a state in which the channel quality of the frequency (for example, RSRP, RSRQ, or RS-SINR) is greater than a predetermined threshold value within a predetermined first time is maintained for a predetermined second time (the threshold value and the time may be configured in the UE through the RRC message or may be broadcasted through system information) and a period is given, the UE may perform measurement in every corresponding period.

When a state in which the channel quality of the frequency (for example, RSRP, RSRQ, or RS-SINR) is greater than a predetermined threshold value within a predetermined first time (for example, while a timer is driven) is measured a predetermined number of times or more (the threshold value, the first time, and the number of times may be configured in the UE through the RRC message or may be broadcasted through system information) and a period is given, the UE may perform measurement in every corresponding period.

According to an embodiment, a new indicator may be defined in the RRC message. According to the new indicator, the eNB may indicate to the UE whether or not to perform frequency measurement in the RRC inactive mode or whether to receive frequency measurement information according to system information and then perform frequency measurement or perform frequency measurement based on frequency measurement configuration information configured as the RRC message.

When instructing the UE to transition to the RRC inactive mode through the RRC message, the eNB may allocate in advance a security key (for example, an NCC) to be used for resuming and provide the security key to the UE. The UE may encrypt information on the measured frequency result in the RRC inactive mode with the security key and report the information to the eNB in the future. By allocating the security key in advance, security may be enhanced in re-access of the UE and signaling overhead due to security configuration may be reduced. Through the security key configured in advance, when transmitting message 3 (RRC message, for example, RRC connection resume request), the UE may encrypt and transmit the RRC message and decrypt received decrypted message 4 (RRC message, for example, RRC connection resume).

A common configuration parameter or a configuration parameter for each SCell may be introduced to efficiently perform (for example, one time) configuration for a plurality of SCells through the RRC message. The eNB or the UE may use the common configuration parameters or the configuration parameter for each of the SCells. When the common configuration parameter and the configuration parameter for each SCell are configured, the configuration for each SCell may have precedence over the common configuration parameter. For example, a group identifier is defined and then a mapping relation with each SCell identifier may be defined. That is, one group identifier may be mapped to each of all SCell identifiers and one group identifier may indicate common configuration information of all SCells. Further, a plurality of group identifiers may be defined and SCell identifiers mapped to respective group identifiers may be defined, so that configuration information of cells may be configured in group units. The RRC message may include mapping information with a bandwidth part ID indicating a bandwidth part to be used for the SCell based on the SCell identifier, time/frequency resource information, or bandwidth part configuration information corresponding to each SCell.

By defining the indicator in the RRC message when making the UE transition to the RRC inactive mode through the RRC message, the eNB may indicate to the UE whether to store and maintain or discard configuration information of SCells or the SCell state (activated state, dormant state, or deactivated state) information in the RRC idle mode or the RRC inactive mode. When mobility of the UE is not great, the UE may directly reuse the configuration information.

In step 815, the UE transitions to the RRC inactive mode according to the indication of the RRC message. In the RRC inactive mode, the UE may perform cell reselection during movement.

In step 820, the UE may receive system information of the cell. The UE searches for a suitable cell based on cell reselection. When a cell on which the UE camps is found, the UE receives and reads system information of the cell.

The UE may camp on the cell in the RRC inactive mode and read information on a frequency to be measured in the RRC inactive mode, a priority of the frequency, and timer information from the system information of the corresponding cell (for example, SIB 5 in the LTE system and SIB 1, SIB 2, SIB 3, SIB 4, or SIB 5 in the NR system). At least one piece of the information included in the RRC message described in step 810 may be broadcasted through the system information of step 820.

According to an embodiment, priorities of the RRC message of step 810 and the system information of step 820 may be determined. When frequency measurement information to be used in the RRC inactive mode configured in the RRC message meets a first condition, the RRC message may be applied in preference to the system information of step 820.

The first condition may be determined by one or a combination of a plurality of conditions below.

The case in which a timer value configured in the RRC message does not expires.

The case in which the UE does not escape a list of valid cells or an area to perform frequency measurement configured in the RRC message.

The case in which the UE does not escape a cell which provides a service to the UE in the RRC-connected mode.

However, when a second condition is satisfied, the UE may determine that frequency measurement information to be used in the RRC inactive mode configured in the RRC message is not valid and preferentially use the system information for frequency measurement.

The second condition may be determined according to one or a combination of a plurality of conditions below.

The case in which a timer value configured in the RRC message expires.

The case in which the UE escapes a list of valid cells or an area to perform frequency measurement configured in the RRC message.

The case in which the UE escapes a cell which provides a service to the UE in the RRC-connected mode.

The UE receiving frequency measurement information to be used in the RRC inactive mode to perform frequency measurement may move and perform cell reselection. When the UE accesses a new cell according to cell reselection, the UE may receive system information of the new cell. When the system information of the cell is broadcasted while including frequency measurement information to be used in the RRC inactive mode, the UE may receive new system information and continuously perform frequency measurement in the RRC inactive mode. When the system information of the new cell does not include frequency measurement information used in the RRC inactive mode, the UE may stop frequency measurement in order to save battery power of the UE.

The UE may receive frequency measurement configuration information through an area update procedure. The UE moves while performing cell reselection. The UE may be connected to the network to perform a TAU procedure when the moving UE is in the RRC idle mode or perform an RAN NAU when the UE is in the RRC inactive mode. The network may newly configure, in the UE, frequency measurement information to be used in the RRC inactive mode through the RRC message. As described above, when the UE accesses the network in the TAU or RAN NAU update procedure, if the frequency measurement information is configured in the UE, more suitable frequency measurement information can be configured for each UE and also signaling overhead can be reduced.

In step 825, the UE may perform frequency measurement. The UE in the RRC inactive mode may perform frequency measurement according to frequency measurement information configured as the RRC message or frequency measurement information configured as system information.

The frequency measurement performed by the UE in the RRC inactive mode may include, for example, an operation for measuring channel quality (for example, RSRP, RSRQ, or RS-SINR) for a frequency instructed to be measured or an operation for measuring a time during which channel quality of the signal satisfies a predetermined range (for example, exceeds a threshold value).

In step 830, the UE may transmit a RAP. The eNB may receive a RAP. In step 835, the eNB may transmit a RAR in response to the RAP. The UE may receive the RAR.

According to an embodiment, the UE may initiate frequency measurement at various time points. That is, the UE may start frequency measurement at one of the time points described below.

The UE may start frequency measurement at a time point at which the UE receives the RRC message of step 810 and reads frequency measurement configuration information.

The UE may receive the RRC message of step 810, read frequency measurement configuration information, and start frequency measurement after n time units (for example, subframes, time slots, or TTIs) indicted by (or pre-appointed in) the frequency measurement configuration information.

The UE may start frequency measurement at the time point at which the UE receives the system information of step 820 and read the frequency measurement configuration information.

The UE may receive the system information, read the frequency measurement configuration information, and start frequency measurement after n time units (for example, subframes, time slots, or TTIs) indicated (or pre-appointed) by the frequency measurement configuration information.

The UE may start frequency measurement at a time point at which a preamble is transmitted for the connection to the network. This is because battery power consumption increases if the frequency measurement continues even when the connection to the network is not necessary.

The UE may transmit a preamble for the connection to the network and start frequency measurement at a time point at which a RAR is received. This is because battery power consumption increases if the frequency measurement continues even when the connection to the network is not necessary.

The UE may transmit a preamble for the connection to the network and starts frequency measurement at a time point at which an RRC message (message 3, for example, an RRC connection request or an RRC connection resume request) is transmitted. This is because battery power consumption increases if the frequency measurement continues even when the connection to the network is not necessary.

The UE may transmit a preamble for the connection to the network, receive a RAR, and start frequency measurement at a time point at which an RRC message (message 3, for example, an RRC connection request or an RRC connection resume request) is transmitted and message 4 (RRC message, for example, RRC connection setup or RRC connection resume) is received. This is because battery power consumption increases if the frequency measurement continues even when the connection to the network is not necessary.

The UE may stop frequency measurement according to various conditions. For example, when the UE reports frequency measurement, the UE may stop the frequency measurement. For example, when transitioning to the RRC-connected mode, the UE may stop the frequency measurement. For example, when the UE receives an RRC message (for example, message 2 (that is, a random access response), message 4 (that is, a contention resolution message), or a frequency measurement request message from the eNB or the UE reports the existence of a valid frequency measurement result to the eNB, the UE may stop the frequency measurement.

According to an embodiment, frequency measurement performed by the UE in the RRC inactive mode may be different from frequency measurement performed in the RRC-connected mode. That is, when quality or intensity of the current serving cell is less than a predetermined reference (for example, RSRP, RSRQ, a reception level (for example, Srxlev) of the serving cell, or a serving cell selection quality value (for example, Squal)) in the frequency measurement performed in the RRC-connected mode, the UE initiates measurement of another frequency. That is, the purpose of the frequency measurement performed in the RRC-connected mode is to move to a better cell and receive a better service if a signal of the current serving cell is not good. However, the purpose of the frequency measurement performed by the UE in the RRC inactive mode is to configure carrier aggregation technology by measuring and reporting another cell regardless of channel quality of the current serving cell. While the UE in the RRC-connected mode can perform frequency measurement based on a CSI-RS based on a time reference value of the serving cell, the UE in the RRC idle mode or the RRC inactive mode cannot measure channel quality (for example, RSRP, RSRQ, or RS-SINR) based on a CSI CRS because there is no serving cell. That is, the RRC-connected mode and the RRC inactive mode may have different reference signals which are frequency measurement objects. With respect to the frequency measurement performed by the UE in the RRC inactive mode, although the measurement result in the frequency of the serving cell is greater than SnonIntraSearch and SnonIntraSearchQ (for example, $Srxlev > S_{nonIntraSearchP}$ or $Squal > S_{nonIntraSearchQ}$) indicated by system information, the UE may perform frequency measurement for a frequency of an area, which is not the serving cell, that is, a non-serving frequency.

Subsequently, the UE which does not currently establish the connection, that is, the UE in the RRC inactive mode may perform an RRC connection resume process with the eNB when data to be transmitted is generated. The UE may establish backward transmission synchronization with the eNB through a random access process in steps 830 and 835.

In step 840, the UE may transmit an RRCConnectionResumeRequest message to the eNB. The message includes a reason (establishmentCause) to establish the connection with an identifier of the UE. In step 845, the eNB may transmit an RRCConnectionResume message to allow the UE to establish the RRC connection. The message may include RRC connection configuration information. As described above, the RRC connection is referred to as an SRB and is used for transmission and reception of the RRC message which is a control message between the UE and the eNB. In step 850, the UE establishing the RRC connection may transmit an RRCConnetionResumeComplete message to the eNB.

According to an embodiment, the UE may report a valid frequency measurement result to the eNB. That is, if there is a valid frequency measurement result which satisfies a predetermined condition for the SCell, the UE in the RRC inactive mode may report the valid measurement result value to the eNB when establishing the connection to the network. For example, the UE may report the existence of the valid frequency measurement result value to the eNB through message 3 (for example, an RRC message, an RRC connection request, an RRC connection resume request, or a new RRC message) or message 5 (for example, an RRC message, an RRC connection setup complete, an RRC connection resume complete, or a new RRC message). The existence of a valid frequency measurement result value may be indicated by definition of a new indicator or an IE in the RRC message to indicate the existence of the valid frequency measurement result value. The existence of a valid frequency measurement result value may be indicated by MAC control information through allocation of a logical channel identifier used by the MAC layer.

The eNB may make a request for reporting the measurement result to the UE. When the eNB knows that there is a valid frequency measurement result measured by the UE in the RRC inactive mode, the eNB may make a request for reporting the measurement result to the UE as necessary. The measurement result report may be requested through various methods. The eNB may make a request for reporting the measurement result by transmitting an indicator through message 2 (RAR) or message 4. The eNB may make a request for reporting the measurement result by transmitting an RRC message for a separate measurement report request (a new RRC message, a conventionally defined RRC message, or a measurement report command) to the UE after security configuration is completed. New MAC control information for the measurement report request may be defined and a new logical channel identifier is defined. The eNB may make a request for the measurement report by transmitting the MAC control information to the UE.

When the UE receives the measurement report request from the eNB, the UE may transmit the measurement result. The UE may encrypt the measurement result through security configuration information configured with the network and transmit the encrypted measurement result. If the report of the frequency measurement result is not encrypted, the frequency measurement information may be hacked or leaked and the location of the UE may be tracked based on the frequency measurement report and thus personal information may be exposed. Accordingly, it is required to perform the frequency measurement report after encryption. The UE may transmit the frequency measurement result to the eNB through an RRC message (a new RRC message or a conventionally defined RRC message, for example, a measurement report). Alternatively, new MAC control information for the measurement report is defined and a new logical channel identifier is defined, and thus the UE may provide the measurement report by transmitting the MAC control information to the eNB.

According to an embodiment, a random access procedure may be used for the valid frequency measurement result and the request and report of the frequency measurement result. Preambles of message 1 may be grouped. Among the grouped preambles, particular preambles may indicate the existence of the measurement report result. The UE may inform the eNB that there is the valid frequency measurement result by transmitting preamble(s) corresponding to a particular group. When the RAR, which is message 2, includes an indicator indicating the report of the measurement result, the UE may identify whether there is a request for the measurement result. When the report of the measurement result is requested by the RAR, the UE may report the measurement result through message 3. The eNB may transmit an RRC configuration message for configuring the SCell based on the measurement result to the UE.

When there is a valid frequency measurement result report, the UE may report the frequency measurement result to the eNB. That is, when there is the valid frequency measurement result report, the UE may transmit the report of the frequency measurement result to the eNB even through there is no request from the eNB. The UE may transmit the frequency measurement result to the eNB through an RRC message (a new RRC message, a conventionally defined RRC message, message 3, or message 5, for example, a measurement report). As new MAC control information for the measurement report is defined and a new logical channel identifier is defined, the UE may provide the measurement report by transmitting MAC control information to the eNB.

The UE may transmit a necessary frequency measurement result among all frequency measurement results to the network (eNB). The UE performing the frequency measurement in the RRC inactive mode may report the frequency measurement result for carriers (SCell), to which CA can be applied, to the network. The UE may report the measurement result only for the SCell satisfying a predetermined condition. In other words, the SCell to which CA can be applied is the SCell satisfying the predetermined condition.

The UE may report the frequency measurement report for the SCell satisfying the predetermined condition to the network based on measurement of the UE. If a period is given, the UE may perform measurement in every corresponding period. The predetermined condition may include at least one of the following conditions.

When a state in which the intensity of the signal of the frequency (for example, RSRP, RSRQ, or RS-SINR) is greater than a predetermined threshold value is maintained for a predetermined time, the condition is satisfied (the threshold value and the time may be configured in the UE through an RRC message or may be broadcasted through system information).

When a state in which the intensity of the signal of the frequency (for example, RSRP, RSRQ, or RS-SINR) is greater than a predetermined threshold value is measured a predetermined number of times or more, the condition is satisfied (the threshold value and the number of times may be configured in the UE through an RRC message or may be broadcasted through system information).

When a state in which the intensity of the signal of the frequency (for example, RSRP, RSRQ, or RS-SINR) is greater than a predetermined threshold value within a predetermined time is measured a predetermined number of times or more, the condition is satisfied (the threshold value, the time, and the number of times may be configured in the UE through an RRC message or may be broadcasted through system information).

When a state in which the intensity of the signal of the frequency (for example, RSRP, RSRQ, or RS-SINR) is greater than a predetermined threshold value within a first time (for example, while a timer is driven) is maintained for a second time, the condition is satisfied (the threshold value, the first time, and the second time may be configured in the UE through an RRC message or may be broadcasted through system information).

When a state in which the intensity of the signal of the frequency (for example, RSRP, RSRQ, or RS-SINR) is greater than a predetermined threshold value within a first time (for example, while a timer is driven) is measured a predetermined number of times or more, the condition is satisfied (the threshold value, the first time, and the number of times may be configured in the UE through an RRC message or may be broadcasted through system information).

When the frequency measured by the UE in the RRC inactive mode is a cell or a frequency indicated by system information of the serving cell which the UE accesses, the condition is satisfied CA technology can be supported for a plurality of cells served by one eNB, so that the CA technology cannot be applied no matter how good a signal of a cell served by another eNB is. Accordingly, the frequency measurement result measured by the UE can be used for application of the carrier aggregation technology only when the frequency measurement result is a measurement result for the cell which the UE accesses or the frequency supported by the eNB). For example, when the frequency is a frequency or a cell belonging to a cell list indicated by system information (white cell list), the corresponding frequency or cell satisfies the condition.

When the eNB does not know UE capability of the UE currently having the established connection or when the eNB is required to identify UE capability, the eNB may transmit a message (for example, a UE capability enquiry) asking of UE capability. The UE may transmit a message (for example, UE capability) reporting its own capability. Through the message, the UE may report information on whether frequency measurement can be performed in the RRC idle mode or the RRC inactive mode or information on frequencies or a frequency area which can be measured or a maximum number of frequencies which can be measured to the eNB.

According to an embodiment, a common configuration parameter or a configuration parameter for each SCell may be introduced to efficiently perform (for example, one time) configuration for a plurality of SCells through the RRC message (RRC connection reconfiguration) of step 845. The eNB or the UE may use common configuration parameters or introduce a configuration parameter for each of the SCells. The eNB or the UE may use the common configuration parameters or the configuration parameter for each of the SCells. When the common configuration parameter and the configuration parameter for each SCell are configured, the configuration for each SCell may have precedence over the common configuration parameter. For example, a group identifier is defined and then a mapping relation with each SCell identifier may be defined. That is, one group identifier may be mapped to each of all SCell identifiers and one group identifier may indicate common configuration information of all SCells. Further, a plurality of group identifiers may be defined and SCell identifiers mapped to respective group identifiers may be defined, so that configuration information of cells may be configured in group units. The RRC message may include mapping information with a bandwidth part ID indicating a bandwidth part to be used for the SCell based on the SCell identifier, time/frequency resource information, or bandwidth part configuration information corresponding to each SCell.

When the SCells are configured in the RRC message, an initial state of the SCell may be configured as an activated state, a dormant state, or a deactivated state. If the SCells are configured to have an initial state corresponding to an activated state or a dormant state when configuration information of the SCells is transmitted, the UE may directly perform and report frequency measurement for the SCells, so that the eNB may rapidly apply the CA technology. Transition to the activated state, the dormant state, or the deactivated state of each SCell may be indicated to the UE in the RRC-connected mode through MAC control information. When the SCell is in the activated state or the dormant state, the UE in the RRC-connected mode may perform frequency measurement and report the frequency measurement result to the eNB. The frequency measurement report may be provided through an RRC message or MAC control information. When the state of each SCell is configured as the activated state or the dormant state through the RRC message, the UE may be configured according to configuration information including an integer indicating when PDCCH monitoring is started and when the frequency (channel or cell) measurement result is reported. For example, the UE may start PDCCH monitoring or the measurement result report after time units (for example, subframes, time slots, or TTIs) corresponding to the indicated integer.

According to an embodiment, the eNB may transmit an RRC Connection Reconfiguration message again in order to provide new configuration to the UE or add or change the configuration for a predetermined reason. The RRC Connection Reconfiguration message may be transmitted while including information which can be included in the RRC connection resume or a portion of the information.

Hereinafter, operations of the UE according to an embodiment illustrated in FIG. 8 are indicated.

The RRC message of step 810 of FIG. 8 may include configuration information of a measurement-related parameter for measuring an inactive state. That is, the measurement-related parameter may be configured in a control message indicating transition to the inactive state.

Inactive State Parameter:

Identity radio network temporary identifier (I-RNTI): I-RNTI may be used as an identifier of the UE when the connection to the network is reconfigured and may be referred to as a resume ID. The I-RNTI may be used for identifying the existence or non-existence of paging when a paging message is received.

RNA: RNA may indicate an area of a network supporting an inactive mode when the UE transitions to the inactive mode. When the UE escapes a predetermined area by an RNA, the UE should report its own location to the network and perform a procedure for receiving a new area.

Inactive State First Measurement-Related Parameter:

A frequency to be measured and a measurement period.

An NR evolved absolute radio frequency channel number (EARFCN) list and a measurement period for each NR-EARFCN.

If a measurement period is n, measurement is performed in every n*discontinuous reception (DRX) cycle.

If a measurement period is not configured, n=1.

L3 filtering coefficient (measurement coefficient to be used in frequency measurement).

Valid timer (frequency measurement is performed only while a timer is driven according to a configured timer value).

Measurement result report condition.

Integer m, RSRP/RSRQ threshold value, time period d.

For example, if all of m measurement results are greater than an RSRP threshold value or an RARQ threshold value, a condition is satisfied.

For example, if all measurement results are greater than an RSRP threshold value or an RARQ threshold value during a time period of d, a condition is satisfied.

For example, if a state in which all of m measurement results are greater than an RSRP threshold value or an RARQ threshold value is maintained for a time period of d, a condition is satisfied.

Measurement area (which is the same as an RAN if the measurement area is not signaled).

In step 825, the UE may perform the following frequency measurement in the RRC inactive mode. The UE may perform frequency measurement during the inactive state.

When a first condition is satisfied, the UE performs a first measurement operation. Satisfaction of the first condition may be determined according to a validity timer. For example, the validity timer for the first condition is driven. The first condition is satisfied if the validity timer is being driven. Driving of the validity timer is initiated when the UE transitions to the RRC inactive mode, that is, the inactive state. When the UE transitions to the inactive state, the UE initiates the first measurement operation. The validity timer is stopped or reset when a particular condition is satisfied. For example, when the UE escapes the RNA or the measurement area or when a periodic RNA update fails, the validity timer is stopped or reset.

A detailed operation of the first measurement operation may be specified as follows. The UE may measure RSRP/RSRQ of a synchronization signal block (SSB) of a serving cell/frequency according to a DRX period. When measuring a non-serving frequency, the UE may measure an SSB of the frequency indicated by the NR-ARFCN. The UE may measure the serving frequency in every DRX and the non-serving frequency in every n*DRX period. The integer n may be indicated through an RRC message or system information. Even though the measurement result of the serving frequency is greater than SnonIntraSearchP and SnonIntraSearchQ indicated by system information (for example, Srxlev>$S_{nonIntraSearchP}$ or Squal>$S_{nonIntraSearchQ}$), the UE may measure the non-serving frequency.

If the first condition is not satisfied, the UE performs a second measurement operation. For example, the UE may perform the second measurement operation if the validity timer is not being driven. A detailed operation of the second measurement operation may be specified as follows. The UE may measure RSRQ/RSRQ of an SSB of a serving cell/frequency according to a DRX period. Measurement of a frequency having a higher priority than the serving frequency among non-serving frequencies of SIB 5 may be performed in every DRX period. Measurement of a frequency having a lower priority than (or equal to) the serving frequency among non-serving frequencies of SIB 5 may be performed in every DRX period if a predetermined condition is satisfied. For example, the predetermined condition may be satisfied when the measurement result of the serving frequency is lower than $S_{nonIntraSearchP}$ and $S_{nonIntraSearchQ}$ indicated by system information.

When an RRC connection resume procedure is initiated, the UE may perform the following procedure. The UE may perform a random access procedure. The UE may insert information indicating that there is an inactive state measurement result into message 3 (Msg 3). For example, the UE may inform the eNB that there is the inactive state measurement result by inserting a predetermined IE into an LCID of MAC control information or an RRC message (for example, RRCResumeRequest message). When receiving information indicating a report of the inactive state measurement result from the eNB through message 4 (Msg 4/RRCResume), the UE may generate and report the inactive state measurement result.

The inactive state measurement report message of step 855 may include the measurement result. In an embodiment, the measurement result may include a serving cell measurement result. For example, the serving cell measurement result may include L3-filtered RSRP/RSRQ. The measurement result may include an inter-frequency measurement result. The UE may report the measurement result for one cell having the highest RSRP or RSRQ among valid measurement results for each frequency. For example, the inter-frequency measurement result may include at least one of an NR-ARFCN, a physical cell identifier (PCI), L3 filtered RSRP/RWRQ, and a time passed from measurement.

The disclosure provides a method of defining a state of the UE for the SCell configured in the UE as an activated state, a deactivated state, or a dormant state, defining an operation of the UE in each state, and switching the state through MAC control information. Accordingly, the disclosure provides an apparatus and a method by which the UE may more rapidly perform frequency measurement and more rapidly report the frequency measurement result to the eNB, and thus the eNB may more rapidly configure carrier aggregation technology.

In order to support a service having a higher data transmission rate and a lower transmission delay in the next-generation mobile communication system (for example, the NR communication system), the eNB may be required to rapidly configure frequency aggregation (CA) technology or dual connectivity (DC) technology in the UE. However, a frequency measurement result of the UE is needed to configure the technology in the UE. It is required to define the state of the UE for the SCell configured in the UE and configure or control the UE to perform "fast frequency measurement" and report the measurement result.

The states of the UE which the eNB configures in the UE for each Secondary cell (SCell) are defined as an activated state, a deactivated state, and a dormant state, and operations of the UE in each state will be described.

A transition method between three states for each SCell using new MAC control information is described below. For example, in the dormant state, as the UE rapidly perform frequency measurement and rapidly reports the frequency measurement report to the eNB, the eNB may rapidly configure carrier aggregation technology. Further, by controlling the state of the UE for each SCell which the eNB configures in the UE using MAC control information, the SCell may be dynamically controlled. Accordingly, the eNB may rapidly serve a greater amount of data to the UE with smaller signaling overhead and lower transmission delay through CA or DC.

The disclosure provides methods of introducing a new dormant state for allowing the UE to perform frequency measurement and report the measurement result even though the UE is not activated for each SCell and switching the states. The methods may be very useful when the network rapidly configures CA or DC in the UE in an environment in which small cells are deployed in a macro cell.

Figure 9:
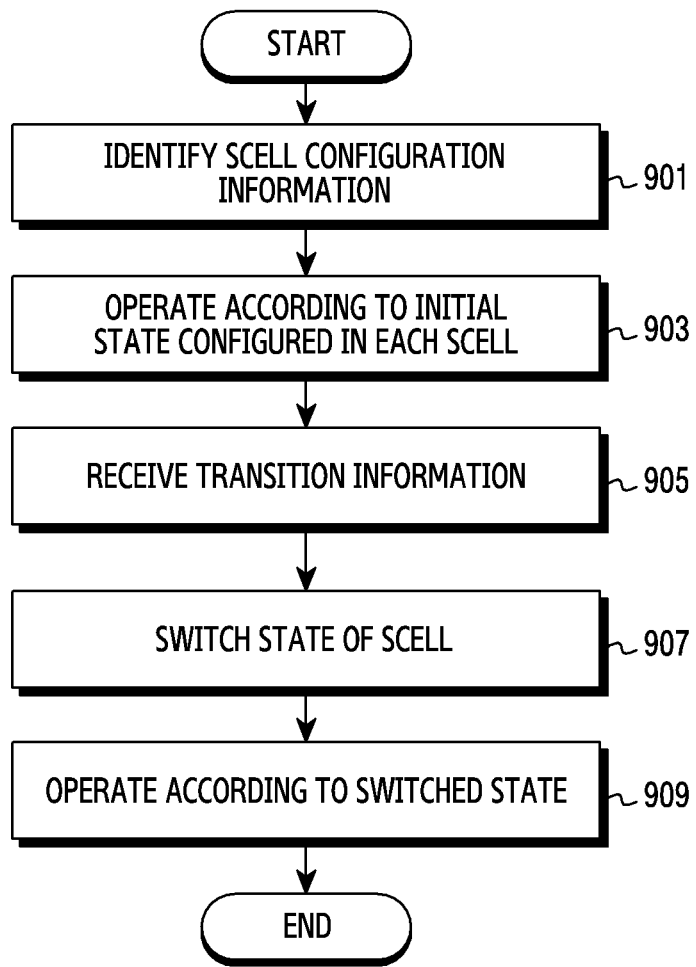
FIG. 9 is a flowchart of a method for configuring an SCell by a UE in a wireless communication system according to an embodiment.

FIG. 9 is a flowchart of a method for configuring an SCell by the UE in a wireless communication system according to an embodiment. The UE corresponds to the UE 135 of FIG. 1 or the UE 315 of FIG. 3. The UE receives frequency measurement configuration and state configuration for SCells, performs state transition according to an indication of MAC control information, and performs an operation according to the configured state in the next-generation mobile communication system, that is, the NR system.

Referring to FIG. 9, in step 901, the UE may identify SCell configuration information. The UE may receive frequency measurement configuration information from at least one of system information, an RRC message for switching the mode of the UE (for example, an RRC inactive mode or an RRC idle mode) or a message received in RRC connection configuration. Frequency measurement information may include SCell configuration information. The UE may identify SCell configuration information.

The SCell configuration information may indicate an initial state of each SCell.

In step 903, the UE may operate according to the initial state configured in each SCell. The SCell configuration information may indicate an initial state of each SCell. The UE may configure the initial state of each SCell. The UE may identify the initial state configured in each SCell and operate according to the identified state. The initial state may be one of an activated state, a deactivated state, and a dormant state. The UE may measure a serving cell based on the initial state configured in the corresponding SCell.

In step 905, the UE may receive transition information. The transition information may be information indicating transition of the state of the SCell of the UE to another state. The transition information may switch the SCell from a particular state to another particular state. A state from which the SCell transitions and a state to which the SCell transitions may be indicated by the type of transition information or a value of transition information. For example, the transition information may indicate transition from an activated state to a dormant state. For example, the transition information may indicate transition from an activated state to a deactivated state. For example, the transition information may indicate transition from a deactivated state to a dormant state. For example, the transition information may indicate transition from a deactivated state to an activated state. For example, the transition information may indicate transition from a dormant state to an activated state. For example the transition information may indicate transition from a dormant state to a deactivated state. The transition information may be a MAC CE. The MAC CE is described below in greater detail with reference to FIGS. 12A, 12B, 13A, 13B, 13C, 14A, 14B, 15A, 15B, 16A, 16B, 17A, 17B, 18A, and 18B.

In step 907, the UE may switch the state of the SCell. The UE may switch the state of the SCell based on the transition information, for example, the MAC CE received in step 905. For example, the UE may switch a first SCell from the activated state to the dormant state. For example, the UE may switch the first SCell from the activated state to the deactivated state. For example, the UE may switch a second SCell from the deactivated state to the dormant state. For example, the UE may switch the second SCell from the deactivated state to the activated state. For example, the UE may switch a third SCell from the dormant state to the activated state. For example, the UE may switch the third SCell from the dormant state to the deactivated state.

In step 909, the UE may operate according to the transitioned state. The UE may measure the corresponding SCell based on the transitioned state of the SCell. For example, when the SCell transitions to the activated state, the UE may measure the SCell in every DRX period. For example, when the SCell transitions to the deactivated state, the UE may measure the SCell in every DRX period or every SCell measurement period separated configured. For example, when the SCell transitions to the dormant state, the UE may measurement the SCell and report the measurement result.

Figure 10:
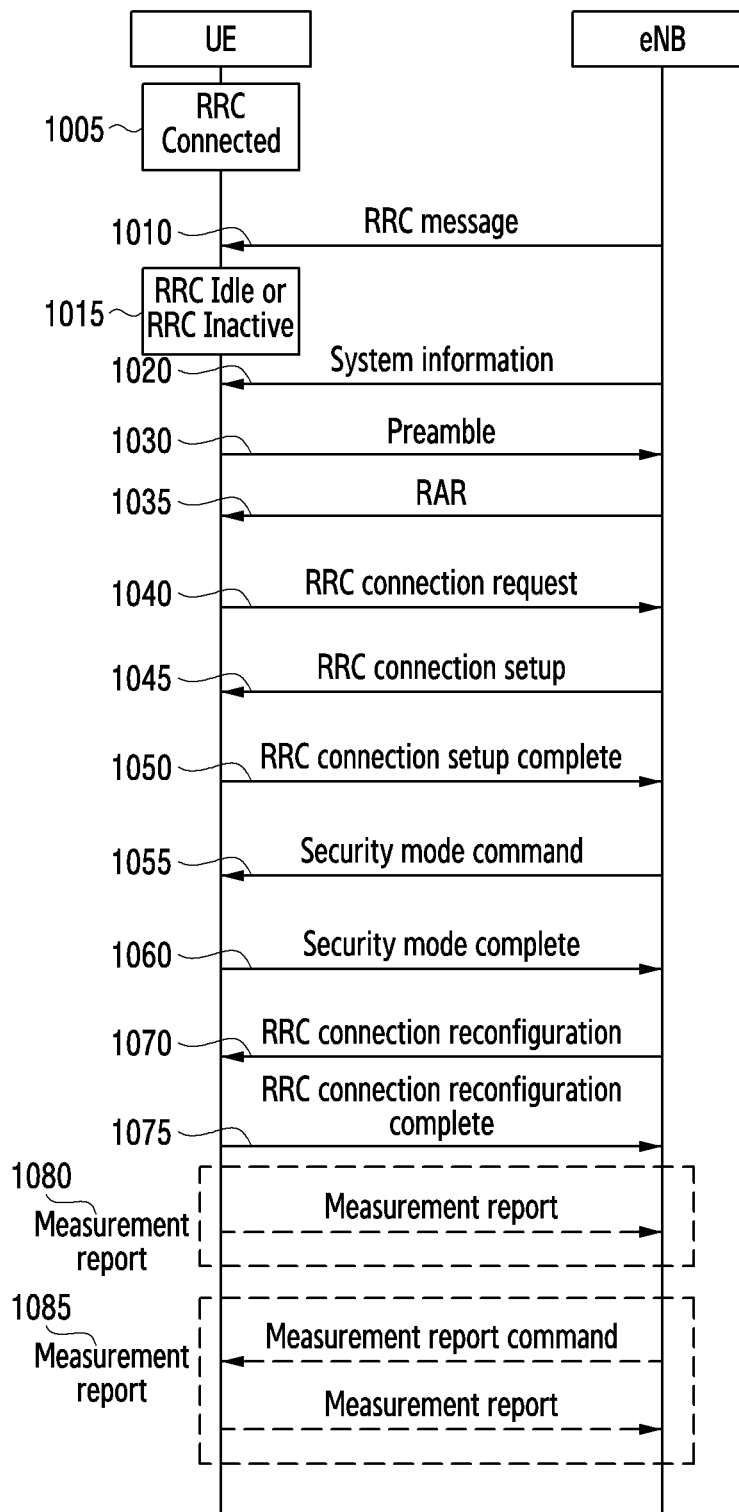
FIG. 10 is a flow diagram of signaling between an eNB and a UE for configuring an SCell in a wireless communication system according to an embodiment.

FIG. 10 is a flow diagram of signaling between an eNB and a UE for configuring an SCell in a wireless communication system according to an embodiment. The UE corresponds to the UE 135 of FIG. 1 or the UE 315 of FIG. 3. The eNB corresponds to the eNB 110 of FIG. 1, the gNB 310, or the eNB 315 of FIG. 3.

Referring to FIG. 10, the UE is in the RRC-connected mode in step 1005. When there is no data transmission and reception of the UE, which transmits and receives data in the RRC-connected mode, for a predetermined reason or for a predetermined time, the eNB may transmit an RRC message (for example, RRC connection release, RRC connection suspend, or a new RRC message) to the UE and control the UE to transition to the RRC idle mode or the RRC inactive mode in step 1010. That is, when the UE in the RRC-connected mode transitions to the RRC idle mode or the RRC inactive mode, the network may transmit the RRC message to instruct the UE to switch the mode.

According to an embodiment, by defining the indicator in the RRC message when making the UE transition to the RRC idle mode or the RRC inactive mode through the RRC message, the eNB may indicate to the UE whether to store and maintain or discard configuration information of SCells or SCell status (active status, idle status, or inactive status) information in the RRC idle mode or the RRC inactive mode. If mobility of the UE is not great, the configuration information may be directly reused.

In step 1015, the UE transitions to the RRC idle mode or the RRC inactive mode according to the indication of the RRC message. In the RRC idle mode or the RRC inactive mode, the UE may perform cell reselection during movement.

In step 1020, the UE may receive system information of the cell. The UE searches for a suitable cell based on cell reselection. When a cell on which the UE camps is found, the UE receives and reads system information of the cell in step 1020.

The UE may camp on the cell in the RRC idle mode or the RRC inactive mode and read information on a frequency to be measured, a priority of the frequency, and timer information from the system information of the corresponding cell (for example, SIB 5 in the LTE system and SIB 1, SIB 2, SIB 3, SIB 4, or SIB 5 in the NR system).

At least one piece of the information included in the RRC message described in step 1010 may be broadcasted as system information of step 1020. The UE in the RRC idle mode or the RRC inactive mode may perform frequency measurement according to frequency measurement information configured as the RRC message or frequency measurement information configured as system information.

In step 1030, the UE may transmit a RAP. The eNB may receive a random access preamble. In step 1035, the eNB may transmit a RAR in response to the RAP. The UE may receive the RAR.

Subsequently, the UE which does not currently configure the connection, that is, the UE in the RRC idle mode or the RRC inactive mode may perform an RRC connection establishment process with the eNB when data to be transmitted is generated. The UE may establish forward transmission synchronization with the eNB through the random access process in steps 1030 and 1040.

In step 1040, the UE may transmit an RRCConnectionRequest message to the eNB. The message includes a reason (establishmentCause) to establish the connection with an identifier of the UE. In step 1045, the eNB may transmit an RRCConnectionSetup message to allow the UE to establish the RRC connection. The message may include RRC connection configuration information. The RRC connection may be referred to as an SRB and is used for transmission and reception of the RRC message which is a control message between the UE and the eNB. The UE establishing the RRC connection transmits an RRCConnetionSetupComplete message to the eNB in step 1050.

The RRCConnetionSetupComplete message is included in a control message (for example, a service request) making a request by the UE for establishing a bearer for a predetermined service to the MME. The eNB may transmit the control message included in the RRCConnetionSetupComplete message to the MME. The MME determines whether to provide the service requested by the UE. If it is determined to provide the service requested by the UE based on the determination result, the MME transmits a setup request message (for example, an initial context setup request) to the eNB. The setup request message may include QoS information to be applied to establishment of the DRB and security-related information to be applied to the DRB (for example, a security key and a security algorithm). The eNB may transmit a security configuration message (for example, SecurityModeCommand) to configure security with the UE in step 1055 and transmit a security configuration completion message (for example, SecurityModeComplete) to inform the eNB of security configuration in step 1060, which completes the security configuration procedure.

In step 1070, the eNB may transmit an RRCConnection-Reconfiguration message to the UE. When security configuration is completed in steps 1055 and 1060, the eNB may transmit an RRCConnectionReconfiguration message to the UE. The message may include configuration information of the DRB for processing user data.

In step 1075, the UE may transmit an RRCConnectionReconfigurationComplete message to the eNB. The UE may establish the DRB by applying the configuration information of the DRB received in step 1070 and transmit the RRCConnectionReconfigurationComplete message to the eNB.

According to an embodiment, a common configuration parameter or a configuration parameter for each SCell may be introduced to efficiently perform configuration for a plurality of SCells through the RRC message (RRC connection reconfiguration of step 1070). The eNB or the UE may use the common configuration parameters or the configuration parameter for each of the SCells. When the common configuration parameter and the configuration parameter for each SCell are configured, the configuration for each SCell may have precedence over the common configuration parameter. For example, a group identifier is defined and then a mapping relation with each SCell identifier may be defined. That is, one group identifier may be mapped to each of all SCell identifiers and one group identifier may indicate common configuration information of all SCells. Further, a plurality of group identifiers may be defined and SCell identifiers mapped to respective group identifiers may be defined, so that configuration information of cells may be configured in group units. The RRC message may include mapping information with a bandwidth part ID indicating a bandwidth part to be used for the SCell based on the SCell identifier, time/frequency resource information, or bandwidth part configuration information corresponding to each SCell.

The eNB completing establishment of the DRB with the UE transmits an initial context setup complete message to the MME. The MME receiving the message exchanges an S1 bearer setup message and an S1 bearer setup response message with the S-GW in order to establish the S1 bearer. The S1 bearer is a connection for data transmission established between the S-GW and the eNB and corresponds to the DRB in one-to-one correspondence. When the processor is completed, the UE transmits and receives data through the eNB and the S-GW. Further, the eNB may transmit an RRC Connection Reconfiguration message in order to provide new configuration to the UE or add or change the configuration for a predetermined reason.

The UE may perform frequency measurement. The UE may perform frequency measurement for each of the configured SCells based on the received frequency measurement configuration information. The UE may perform frequency measurement according to the state of the UE for each of the configured SCells (activated state, dormant state, or deactivated state).

The eNB may report the frequency measurement result to the UE through various methods. In an embodiment, the UE may report the frequency measurement result to the eNB in step 1080. The eNB may report frequency measurement results satisfying a predetermined condition to the eNB. If there is a valid frequency measurement result when providing the report to the eNB, the UE may directly provide the report to the eNB through an RRC message or MAC control message or periodically provide the report. The UE may report the frequency measurement result only when there is a request for the frequency measurement information in step 1085. The UE may report the frequency measurement result to the eNB based on an indicator indicating the existence of the valid frequency measurement result. For example, the UE may transmit the indicator indicating the existence of the valid frequency measurement result to the eNB. The eNB may make a request for the frequency measurement result to the UE as necessary. Thereafter, the eNB may receive the frequency measurement result.

When the SCells are configured through the RRC message, an initial state of each SCell may be configured as an activated state, a dormant state, or a deactivated state. When the SCells are configured to have the initial state which is the activated state or the dormant state according to configuration information of the SCells, the UE may directly perform report frequency measurement for the SCells, so that the eNB may rapidly apply CA.

The activated state, the dormant state, or the deactivated state of each SCell may be indicated by transmitting MAC control information to the UE. In addition, switching between RRC modes may be indicated by transmitting MAC control information to the UE.

When the SCell is in the activated state or the dormant state, the UE in the RRC-connected mode may perform frequency measurement and report the frequency measurement result to the eNB. The frequency measurement report may be provided through an RRC message or MAC control information. When the state of each SCell is configured as the activated state or the dormant state through the RRC message, the UE may be configured based on frequency measurement configuration information including an integer indicating when PDCCH monitoring is started and when the report of the frequency (channel or cell) measurement result is started. For example, the UE may start the measurement report after time units (for example, subframes, time slots, or TTIs) corresponding to the indicated integer.

When the initial states of the SCells are configured using the RRC message, the eNB may define an indicator of the RRC message to rapidly apply CA and configure the initial state of each SCell as the activated state or the dormant state. If fast CA (CA configured according to fast frequency measurement) is not necessary, the initial state may be configured as the deactivated state. The eNB may configure a timer value in the RRC message, and when the timer value expires, configure the UE to automatically switch the state of the SCell from the activated state to the dormant state, or when the timer value expires, configure the UE to automatically switch the state of the SCell from the dormant state to the deactivated state, or when the timer value expires, configure the UE to automatically switch the state of the SCell from the activated state to the deactivated state, thereby saving battery power and reduce signaling overhead. The configuration of the SCells may be performed in initial connection configuration or in handover or performed as the eNB transmits the RRC message to the UE in the RRC-connected mode.

According to an embodiment, frequency measurement performed by the UE in the dormant state for the SCell may be different from frequency measurement performed in the activated state for the SCell. That is, while frequency measurement for the SCell performed in the activated state is possible based on a CSI-RS based on a time reference value of the Pcell of the current UE, frequency measurement in the dormant state may be difficult based on the CSI-RS. Accordingly, the UE may measure RSRP, RSRQ, and RS-SINR based on a CRS. Therefore, reference signals which are objects for measuring the frequency may be different in the activated state and the other state (for example, the dormant state).

As described above, the UE may initiate frequency measurement at various time points. That is, a time point at which frequency measurement starts may be one of the following time points.

The UE may start frequency measurement at a time point at which the UE receives the RRC message of step 1010 and reads frequency measurement configuration information.

The UE may receive the RRC message of step 1010, read frequency measurement configuration information, and start frequency measurement after n time units (for example, subframes, time slots, or TTIs) indicated (or pre-appointed) by the frequency measurement configuration information.

The UE may receive the RRC message of step 1010, read frequency measurement configuration information, and start frequency measurement after n time units (for example, subframes, time slots, or TTIs) indicated when the state of the UE for each SCell indicated (or pre-appointed) by the frequency measurement configuration information is configured and the configured state is the activated state or the dormant state.

The UE may receive the RRC message of step 1010, read frequency measurement configuration information, and start frequency measurement when the state of the UE for each SCell indicated (or pre-appointed) by the frequency measurement configuration information is configured and the configured state is the activated state or the dormant state.

The UE may transmit a necessary frequency measurement result among all frequency measurement results to the network (eNB). According to an embodiment, the UE performing the frequency measurement in the RRC idle mode or the RRC inactive mode may report the frequency measurement result for carriers (SCell), to which CA can be applied, to the network. The UE may report the measurement result only for the SCell satisfying a predetermined condition. In other words, the SCell to which CA can be applied is the SCell satisfying the predetermined condition.

The UE may report the frequency measurement report for the SCell satisfying the predetermined condition to the network based on measurement of the UE. If a period is given, the UE may perform measurement in every corresponding period. The predetermined condition may include at least one of the following conditions.

When a state in which the intensity of the signal of the frequency (for example, RSRP, RSRQ, or RS-SINR) is greater than a predetermined threshold value is maintained for a predetermined time, the condition is satisfied (the threshold value and the time may be configured in the UE through an RRC message or may be broadcasted through system information).

When a state in which the intensity of the signal of the frequency (for example, RSRP, RSRQ, or RS-SINR) is greater than a predetermined threshold value is measured a predetermined number of times or more, the condition is satisfied (the threshold value and the number of times may be configured in the UE through an RRC message or may be broadcasted through system information).

When a state in which the intensity of the signal of the frequency (for example, RSRP, RSRQ, or RS-SINR) is greater than a predetermined threshold value within a predetermined time is measured a predetermined number of times or more, the condition is satisfied (the threshold value, the time, and the number of times may be configured in the UE through an RRC message or may be broadcasted through system information).

When a state in which the intensity of the signal of the frequency (for example, RSRP, RSRQ, or RS-SINR) is greater than a predetermined threshold value within a first time (for example, while a timer is driven) is maintained for a second time, the condition is satisfied (the threshold value, the first time, and the second time may be configured in the UE through an RRC message or may be broadcasted through system information).

When a state in which the intensity of the signal of the frequency (for example, RSRP, RSRQ, or RS-SINR) is greater than a predetermined threshold value within a first time (for example, while a timer is driven) is measured a predetermined number of times or more, the condition is satisfied (the threshold value, the first time, and the number of times may be configured in the UE through an RRC message or may be broadcasted through system information).

When the frequency measured by the UE in the RRC idle mode or the RRC inactive mode is a cell or a frequency indicated by system information of the serving cell which the UE accesses, the condition is satisfied CA technology can be supported for a plurality of cells served by one eNB, so that the CA technology cannot be applied no matter how good is a signal of a cell served by another eNB. Accordingly, the frequency measurement result can be used for application of the CA technology only when the frequency measurement result is a measurement result for the cell which the UE accesses or the frequency supported by the eNB). For example, when the frequency is a frequency or a cell belonging to a cell list indicated by system information (white cell list), the corresponding frequency or cell satisfies the condition.

When the eNB does not know UE capability of the UE currently having the established connection or when the eNB is required to identify UE capability, the eNB may transmit a message (for example, a UE capability inquiry) asking of UE capability. The UE may transmit a message (for example, UE capability) reporting its own capability. Through the message, the UE may report information on whether frequency measurement can be performed in the RRC idle mode or the RRC inactive mode or information on frequencies or a frequency area which can be measured or a maximum number of frequencies which can be measured to the eNB.

When the state of the SCells configured in the UE is the activated state or the dormant state, when the UE performs handover or radio link failure (RLF) is generated, or when the Pcell is changed, the state of the SCells may transition to the deactivated state in order to prevent unnecessary PDCCH monitoring and frequency measurement. That is, the UE may fall back the state of each SCell. That is, the UE may perform implicit state transition.

For the SCell configured as the activated state, the UE monitor a PDCCH to monitor a signal of the eNB, perform channel quality indicator (CQI) or radio resource monitoring (RRM) measurement according to RRC configuration, and when the DRX is configured, perform CQI or RRM measurement according to the DRX, and report the measurement result to the eNB. The frequency measurement result report may be provided from the UE to the eNB through the RRC message, or MAC control information may be defined and then the frequency measurement report may be provided through the MAC control information.

For the SCell configured as the dormant state, the UE may perform frequency measurement (CQI or RRM measurement) according to the DRX of the Pcell and trigger the frequency measurement report so as to provide the report to the eNB. That is, the UE may perform frequency measurement in an on-duration interval in which the UE should turn on the RF to monitor the PDCCH in the DRX of the Pcell. The frequency measurement result report may be provided from the UE to the eNB through the RRC message. Alternatively, MAC control information may be defined and the UE may report the frequency measurement result through the MAC control information. In order to save battery power, PDCCH monitoring for monitoring the indication of the eNB may not be performed.

For the SCell configured as the dormant state, the UE may not perform PDCCH monitoring for monitoring the indication of the network in order to save battery power. The UE may provide a periodic frequency measurement (channel measurement) report in order to rapidly support activation of the SCell. The frequency measurement (channel measurement) report may be provided based on the CRS.

For the SCell configured as the deactivated state, the UE may not monitor the signal of the eNB. That is, not monitor the PDCCH and perform frequency measurement (RRM), but not report the measurement result to the eNB. In the deactivated state, the frequency measurement may be performed according to an SCell measurement report period configured through RRC.

Figure 11:
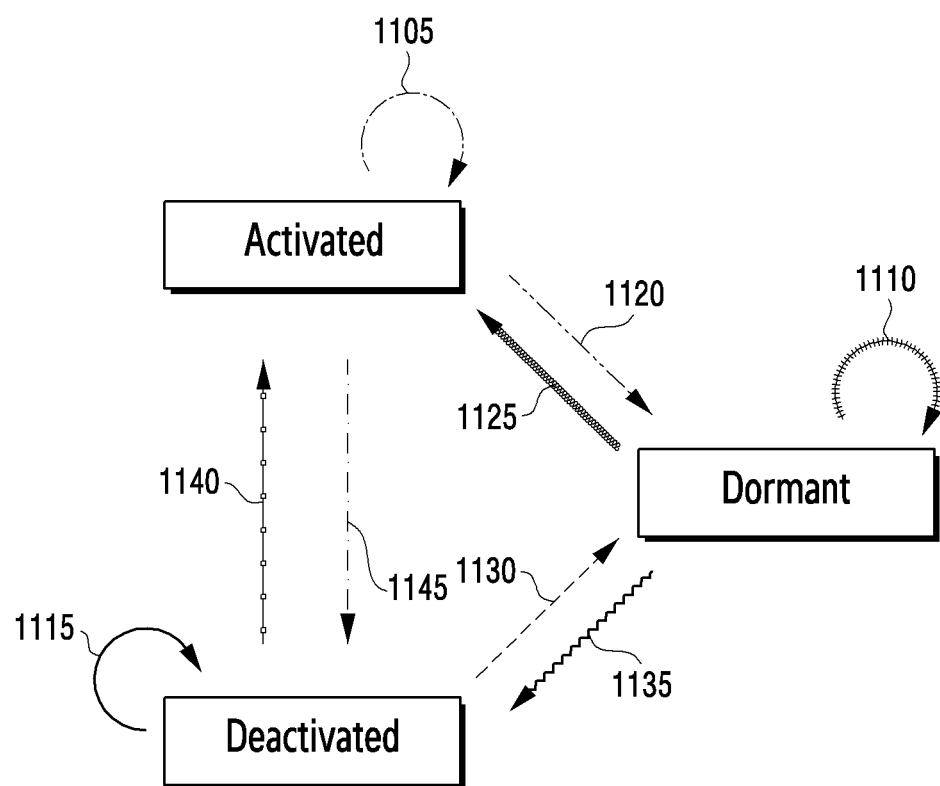
FIG. 11 is an illustration of state transition of an SCell according to an embodiment.

FIG. 11 is an illustration of a state transition of an SCell according to an embodiment. A UE may maintain a particular state for the SCell or transition to another particular state. The state for the SCell may be an activated state, a dormant state, or a deactivated state. That is, the UE may maintain the activated state, the dormant state, or the deactivated state for each SCell or perform state transition based on MAC control information. Hereinafter, the activated state may be referred to as Ac, the dormant state may be referred to as Do, and the deactivated state may be referred to as De, and thus the state transition for the SCell is described below. The state transition may include cases 1105, 1110, and 1115 in which the state which is the same as a previous state is maintained.

Referring to FIG. 11, nine state transitions below may be possible.

1105: Ac to Ac (maintain the state)
1110: Do to Do (maintain the state)
1115: De to De (maintain the state)
1120: Ac to Do (used for saving battery power of the UE and easily performing scheduling)
1125: Do to AC (used for activating CA)
1130: De to Do (used for receiving a frequency measurement report before activating CA)
1135: Do to De (used for preventing and deactivating a frequency measurement report in order to save battery power of the UE)
1140: De to AC (used for activating CA)
1145: Ac to De (used for saving battery power of the UE and easily performing scheduling)

According to an embodiment, a particular state transition may not be used. The state transition 1130 (De to Do) may not be supported if the frequency or the usage of use cases thereof is low. Whether to use the particular state transition is adaptively configurable. Hereinafter, detailed embodiments of MAC control information for supporting state transitions of the disclosure described in FIG. 11 is described below with reference to FIGS. 12A, 12B, 13A, 13B, 13C, 14A, 14B, 15A, 15B, 16A, 16B, 17A, 17B, 18A, and 18B. With reference to FIGS. 12A to 18B, roles of each MAC CE are described below. Each MAC CE may be identified by a MAC PDU and an LCID.

Figure 12A:
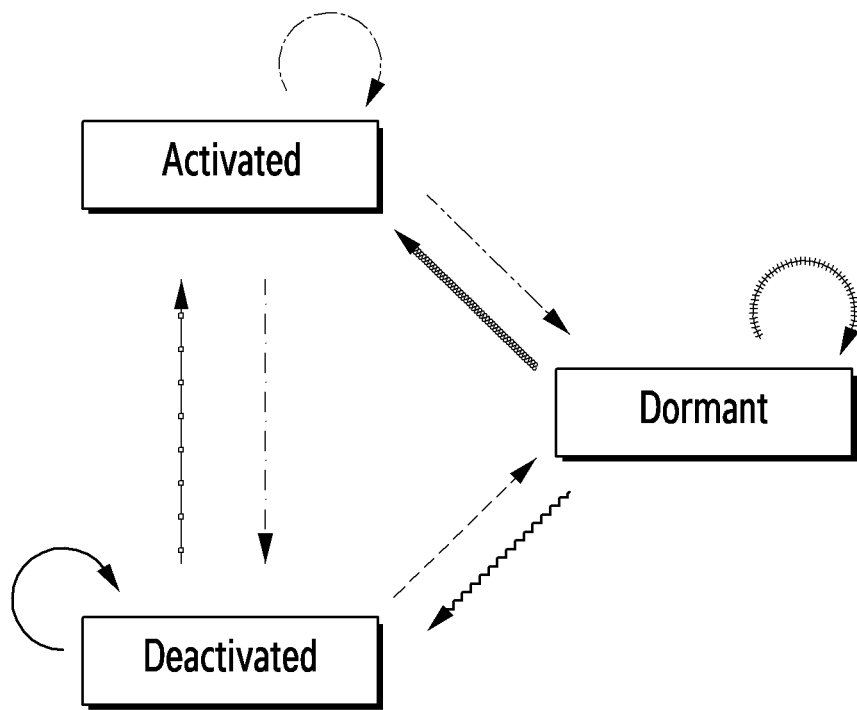
FIG. 12A is an illustration of medium access control (MAC) control information supporting the state transition for an SCell in a wireless communication system according to an embodiment.
Figure 12B:
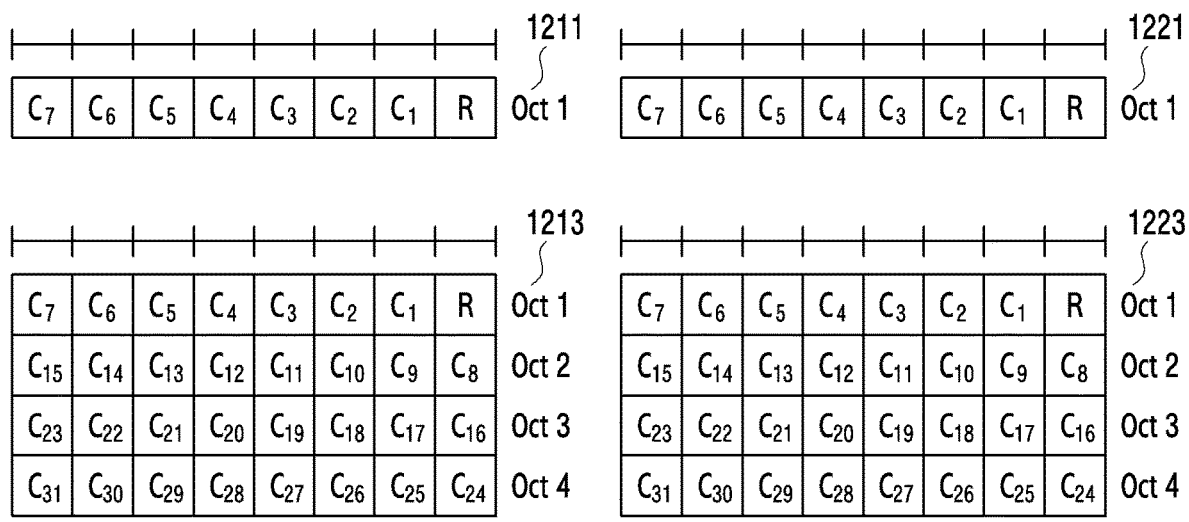
FIG. 12B is an illustration of an octet structure according to MAC control information supporting state transition for an SCell in a wireless communication system according to an embodiment.

FIGS. 12A and 12B are illustrations of a first embodiment of MAC control information supporting a state transition for an SCell in a wireless communication system according to an embodiment. The first embodiment of the MAC control information is described below with reference to FIG. 11. The first embodiment of the MAC control information illustrated in FIG. 12A does not support the state transition 1130 (De to Do) of FIG. 11. As described above, the state transition 1130 (De to Do) may not be supported because the frequency or the usage of use cases thereof may be low.

Referring to FIGS. 12A and 12B, a first MAC CE and a second MAC CE are defined as MAC control information, and state transition according to the first MAC CE or the second MAC CE is supported. The first MAC CE can deactivate the SCell which is in the dormant state but cannot activate the SCell. The second MAC CE cannot switch the state of the SCell which is in the deactivated state.

First MAC control information, that is, the first MAC CE according to the first embodiment is described below. The first MAC CE may be referred to as an activation/deactivation MAC CE. The first MAC CE may have the fixed size of 1 byte and may be identified by a logical channel identifier (LCID). The first MAC CE may have one reserved (R) field and a detailed format thereof is the same as that of an MAC CE 1211 of FIG. 12B. The MAC CE 1211 consists of one octet.

Further, the first MAC CE may have the fixed size of 4 bytes and may be identified by an LCID. The first MAC CE may have 31 C fields and one R field and a detailed format thereof is the same as that of an MAC CE 1213 of FIG. 12B. The MAC CE 1213 consists of four octets.

If configured cell identifiers (SCell indexes) do not exceed 7, the first MAC CE having the size of 1 byte may be used. Otherwise, the first MAC CE having the size of 4 bytes may be used.

C(i) field: indicates that the SCell corresponding to a cell ID i is in an activated state, a deactivated state, or a dormant (hibernation) state if there is an SCell configured with SCellIndex i. Otherwise, a MAC layer device (for example, a MAC entity) ignores this field. When the C(i) field is set to 1, the C(i) field indicates that the state of the SCell configured with SCellIndex i should be activated. However, when the state of the SCell configured with SCellIndex i is the dormant state, the MAC entity ignores the value of 1 of the C(i) field. When the C(i) field is set to 0, the C(i) field indicates that the state of the SCell configured with SCellIndex i is deactivated.

R field: denotes a reserved field and is configured as 0.

The first MAC CE according to the first embodiment may be defined as shown in Table 1 below.

TABLE 1

| C(i) field | State transition |
|---|---|
| 0 | Ac→De, Do→De, De→De |
| 1 | Ac→Ac, Do→Do, De→Ac |

Second MAC control information, that is, the second MAC CE in the first embodiment is described below. The second MAC CE may be referred to as an activation/hibernation MAC CE.

The second MAC CE may have the fixed size of 1 byte and may be identified by an LCID. The second MAC CE may have seven C fields and one R field and a detailed format thereof is the same as that of the MAC CE 1221 of FIG. 12B. The format is the same as that of the MAC CE 1221. The MAC CE 1221 consists of one octet.

Further, the second MAC CE may have the fixed size of 4 bytes and may be identified by an LCID. The second MAC CE may have 31 C fields and one R field and a detailed format thereof is the same as that of the MAC CE 1223 of FIG. 12B. The MAC CE 1223 consists of four octets.

If configured cell identifiers (SCell indexes) do not exceed 7, the second MAC CE having the size of 1 byte may be used. Otherwise, the second MAC CE having the size of 4 bytes may be used.

C(i) field: indicates that the SCell configured with SCellIndex i is in the activated state, the dormant state, or the deactivated state if there is an SCell configured with SCellIndex i. Otherwise, the MAC entity ignores this field. When the C(i) field is set to one value (0 or 1, for example, 1) of 1-bit information, the C(i) field indicates that the state for the SCell configured with SCellIndex i should be activated. However, when the SCell configured with SCellIndex i is in the deactivated state, the MAC entity ignores the one value (0 or 1, for example, 1) of the 1-bit information. When the C(i) field is set to one value (0 or 1, for example, 0) of 1-bit information, the C(i) field indicates that the state for the SCell configured with SCellIndex i shall be dormant. However, when the SCell configured with SCellIndex i is in the deactivated state, the MAC entity ignores the one value (0 or 1, for example, 1) of the 1-bit information.

R field: denotes a reserved field and is configured as 0.

The second MAC control information according to the first embodiment may be defined as shown in Table 2 below.

TABLE 2

| C(i) field | State transition |
|---|---|
| 0 | Ac→Do, Do→Do, De→De |
| 1 | Ac→Ac, Do→Ac, De→De |

In the first MAC CE and the second MAC CE according to the first embodiment, MAC CE having the size of 1 byte and MAC CEs having the size of 4 bytes may have different logical channel identifiers and thus may be distinguished from each other. Further, the first MAC CE and the second MAC CE may have fixed lengths. In this case, a length (L) field is not needed in a MAC sub header.

In another method, the R field may be used for saving a space of the LCID. LCID 1 indicates the first MAC CE or the second MAC CE having the size of 1 byte, and may indicate the first MAC CE having the size of 1 byte if the R field value is 0 and indicate the second MAC CE having the size of 1 byte if the R field value is 1. LCID 2 indicates the first MAC CE or the second MAC CE having the size of 4 bytes, and may indicate the first MAC CE having the size of 4 bytes if the R field value is 0 and indicate the second MAC CE having the size of 4 bytes if the R field value is 1. Accordingly, in this case, an L field is not needed in a MAC sub header.

MAC control information indicating the state transition of the disclosure should support all state transition for each cell of FIG. 11. An example of how the first MAC CE and the second MAC CE in the first embodiment support the state transition of each SCell is described below. When there is a plurality of states for each SCell as shown in Table 3 below, it may be identified that MAC control information is correctly designed through a change in only one state to another state. The first MAC CE and the second MAC CE in the first embodiment support state transitions for the number of all cases as shown in Table 3 below.

TABLE 3

| SCell index | 7 | 6 | 5 | 4 | 3 | 2 | 1 |
|---|---|---|---|---|---|---|---|
| State | Ac | Ac | Ac | De | De | Do | Do |
| MAC CE 1 | 0 | 1 | 1 | 0 | 0 | 1 | 1 |
| State | De | Ac | Ac | De | De | Do | Do |
| MAC CE 2 | 0 | 0 | 1 | 0 | 0 | 0 | 0 |
| State | De | Do | Ac | De | De | Do | Do |
| MAC CE 1 | 0 | 1 | 1 | 1 | 0 | 1 | 1 |
| State | De | Do | Ac | Ac | De | Do | Do |
| MAC CE 1 | 0 | 0 | 1 | 1 | 0 | 1 | 1 |
| State | De | De | Ac | Ac | De | Do | Do |

TABLE 3-continued

| SCell index | 7 | 6 | 5 | 4 | 3 | 2 | 1 |
|---|---|---|---|---|---|---|---|
| MAC CE 2 | 0 | 0 | 1 | 1 | 0 | 1 | 0 |
| State | De | De | Ac | Ac | De | Ac | Do |

Figure 13A:
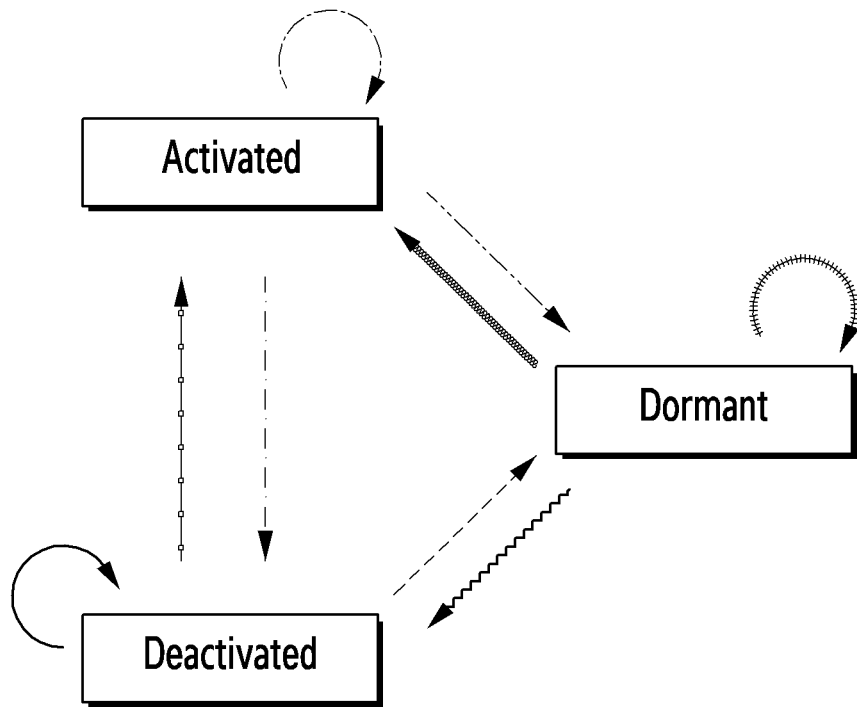
FIG. 13A is an illustration of MAC control information supporting the state transition for an SCell in a wireless communication system according to an embodiment.
Figure 13B:
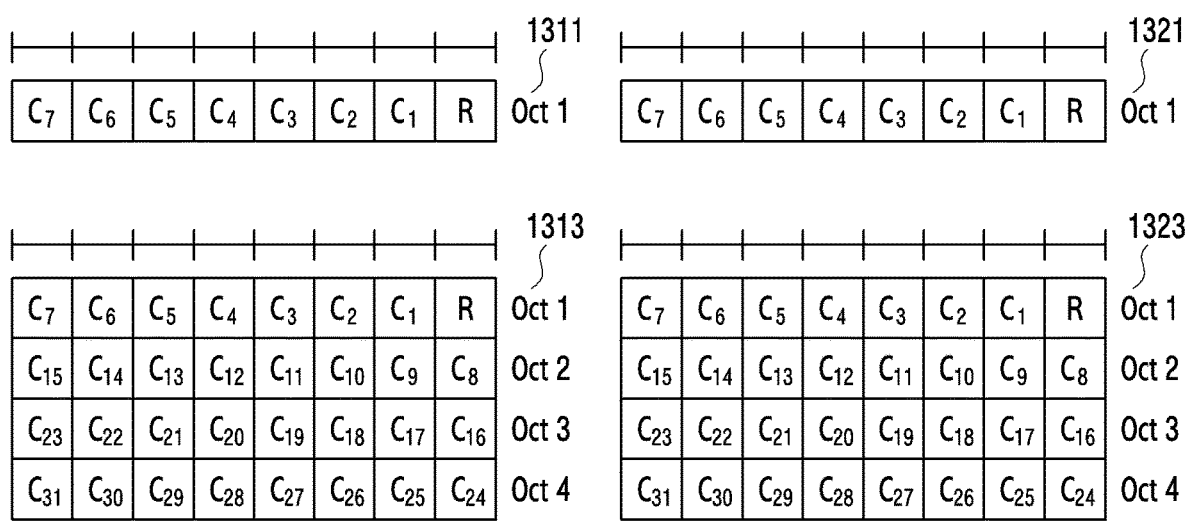
FIG. 13B is an illustration of an octet structure according to MAC control information supporting state transition for an SCell in a wireless communication system according to an embodiment.
Figure 13C:
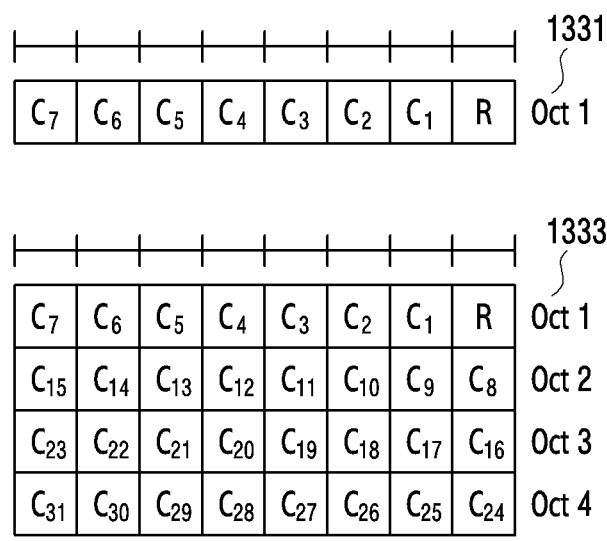
FIG. 13C is an illustration of an octet structure according to MAC control information supporting state transition for an SCell in a wireless communication system according to an embodiment.

FIGS. 13A, 13B, and 13C are illustrations of a second embodiment of MAC control information supporting state transition for the SCell in a wireless communication system according to an embodiment. The second embodiment of the MAC control information is described below with reference to FIG. 11. The second embodiment of the MAC control information supports the state transition 1130 (De to Do) of FIG. 11. That is, even though the frequency or the usage of use cases of the state transition 1130 (De to Do) is low, it is possible to save battery power of the UE and report a frequency measurement result in advance by switching the SCell in the deactivated state to the dormant state. The eNB may determine whether to perform activation according to the reported frequency measurement result and thus the state transition 1130 may be useful.

Referring to FIGS. 13A, 13B, and 13C, a first MAC CE and a second MAC CE are defined as the MAC control information, and state transition according to the first MAC CE or the second MAC CE is supported. The first MAC CE can deactivate the SCell which is in the dormant state but cannot activate the SCell which is in the dormant state. Further, the second MA CE may switch the SCell in the deactivated state to the dormant state through one value (0 or 1, for example, 1) of 1-bit information and continuously maintain the deactivated state of the SCell which is in the deactivated state through one value (0 or 1, for example, 0) of 1-bit information.

First MAC control information, that is, the first MAC CE in the second embodiment is described below. The first MAC CE may be referred to as an activation/deactivation MAC CE. The first MAC CE may have the fixed size of one byte and may be identified by an LCID. The first MAC CE may have seven C fields and one R field and a detailed format thereof is the same as that of an MAC CE 1311 of FIG. 13B. The MAC control information 1311 consists of one octet.

Further, the first MAC CE may have the fixed size of 4 bytes and may be identified by an LCID. The first MAC CE may have 31 C fields and one R field and a detailed format thereof is the same as that of an MAC CE 1313 of FIG. 13B. The MAC CE 1313 consists of four octets.

If configured cell identifiers (SCell indexes) do not exceed 7, the first MAC CE having the size of 1 byte may be used. Otherwise, the first MAC CE having the size of 4 bytes may be used.

C(i) field: indicates that the SCell configured with SCellIndex i is in the activated state, the dormant state, or the deactivated state if there is an SCell configured with SCellIndex i. Otherwise, the MAC entity ignores this field. When the C(i) field is set to 1, the C(i) field indicates that the state of the SCell configured with SCellIndex i should be activated. However, when the state of the SCell configured with SCellIndex i is the dormant state, the MAC entity ignores the value of 1 of the C(i) field. When the C(i) field is set to 0, the C(i) field indicates that the state of the SCell configured with SCellIndex i is deactivated.

R field: denotes a reserved field and is configured as 0.

The first MAC CE according to the first embodiment may be defined as shown in Table 4 below.

TABLE 4

| C(i) field | State transition |
|---|---|
| 0 | Ac→De, Do→De, De→De |
| 1 | Ac→Ac, Do→Do, De→Ac |

Second MAC control information, that is, the second MAC CE in the second embodiment is described below. The second MAC CE may be referred to as an activation/hibernation MAC CE.

The second MAC CE may have the fixed size of one byte and may be identified by an LCID. The second MAC CE may have seven C fields and one R field and a detailed format thereof is the same as that of an MAC CE 1321 of FIG. 13B. The format is the same as that of the MAC CE 1321. The MAC CE 1321 consists of one octet.

Further, the second MAC CE may have the fixed size of 4 bytes and may be identified by an LCID. The second MAC CE may have 31 C fields and one R field and a detailed format thereof is the same as that of an MAC CE 1323 of FIG. 13B. The MAC CE 1323 consists of four octets.

If configured cell identifiers (SCell indexes) do not exceed 7, the second MAC CE having the size of 1 byte may be used. Otherwise, the second MAC CE having the size of 4 bytes may be used.

C(i) field: indicates that the SCell configured with SCellIndex i is in the activated state, the dormant state, or the deactivated state if there is an SCell configured with SCellIndex i. Otherwise, the MAC entity ignores this field. When the C(i) field is set to one value (0 or 1, for example, 1) of 1-bit information, the C(i) field indicates that the state for the SCell configured with SCellIndex i should be activated. However, when the state of the SCell configured with SCellIndex i is the deactivated state, one value (0 or 1, for example, 1) of 1-bit information of the C(i) field indicates state transition of the SCell to the dormant state. When the C(i) field is set to one value (0 or 1, for example, 0) of 1-bit information, the C(i) field indicates that the state for the SCell configured with SCellIndex i shall be dormant. However, when the SCell configured with SCellIndex i is in the deactivated state, the MAC entity ignores the one value (0 or 1, for example, 1) of the 1-bit information.

R field: denotes a reserved field and is configured as 0.

The second MAC control information according to the second embodiment may be defined as shown in Table 5 below.

TABLE 5

| C(i) field | State transition |
|---|---|
| 0 | Ac→Do, Do→Do, De→De |
| 1 | Ac→Ac, Do→Ac, De→Do |

In the second embodiment, the second MAC CE according to another embodiment may be configured to be the same as the design method described above. Alternatively, another second MAC CE may be designed such that the meanings indicated by bit values (0 and 1) of each bit having 0 or 1 are exchanged.

The second MAC CE may have the fixed size of one byte and may be identified by an LCID. The second MAC CE may have seven C fields and one R field and a detailed format thereof is the same as that of an MAC CE 1331 of FIG. 13C.

Further, the second MAC CE may have the fixed size of four bytes and may be identified by an LCID. The second MAC CE may have 31 C fields and one R field and a detailed format thereof is the same as that of an MAC CE 1333 of FIG. 13C.

If configured cell identifiers (SCell indexes) do not exceed 7, the second MAC CE having the size of 1 byte may be used. Otherwise, the second MAC CE having the size of 4 bytes may be used.

C(i) field: indicates that the SCell configured with SCellIndex i is in the activated state, the dormant state, or the deactivated state if there is an SCell configured with SCellIndex i. Otherwise, the MAC entity ignores this field. When the C(i) field is set to one value (0 or 1, for example, 0) of 1-bit information, the C(i) field indicates that the state for the SCell configured with SCellIndex i should be activated. However, when the SCell configured with SCellIndex i is in the deactivated state, the MAC entity ignores the one value (0 or 1, for example, 1) of the 1-bit information. When the C(i) field is set to one value (0 or 1, for example, 1) of 1-bit information, the C(i) field indicates that the state for the SCell configured with SCellIndex i should be the dormant state.

R field: denotes a reserved field and is configured as 0.

TABLE 5-1

| C(i) field | State transition |
|---|---|
| 0 | Ac→Ac, Do→Ac, De→De |
| 1 | Ac→Do, Do→Do, De→Do |

In the first MAC CE and the second MAC CE according to the second embodiment, MAC CE having the size of 2 byte and MAC CEs having the size of 4 bytes may have different logical channel identifiers and thus are distinguished from each other. Further, the first MAC CE and the second MAC CE may have fixed lengths. Accordingly, in this case, an L field is not needed in a MAC sub header.

In another method, the R field may be used for saving a space of the LCID. That is, LCID 1 indicates the first MAC CE or the second MAC CE having the size of 1 byte, and may indicate the first MAC CE having the size of 1 byte if the R field value is 0 and indicate the second MAC CE having the size of 1 byte if the R field value is 1. LCID 2 indicates the first MAC CE or the second MAC CE having the size of 4 bytes, and may indicate the first MAC CE having the size of 4 bytes if the R field value is 0 and indicate the second MAC CE having the size of 4 bytes if the R field value is 1. Accordingly, in this case, an L field is not needed in a MAC sub header.

MAC control information indicating the state transmission of the disclosure should support all state transmissions for each SCell of FIG. 11. An example of how the first MAC CE and the second MAC CE in the first embodiment support the state transition of each SCell is described below.

When there is a plurality of states for each SCell as shown in Table 6 below, it may be identified that MAC control information is correctly designed through a change in only one state to another state. The first MAC CE and the second MAC CE in the second embodiment support state transitions for the number of all cases as shown in Table 6 below.

TABLE 6

| SCell index | 7 | 6 | 5 | 4 | 3 | 2 | 1 |
|---|---|---|---|---|---|---|---|
| State | Ac | Ac | Ac | De | De | Do | Do |
| MAC CE 1 | 0 | 1 | 1 | 0 | 0 | 1 | 1 |

TABLE 6-continued

| SCell index | 7 | 6 | 5 | 4 | 3 | 2 | 1 |
|---|---|---|---|---|---|---|---|
| State | <u>De</u> | Ac | Ac | De | De | Do | Do |
| MAC CE 2 | 0 | 0 | 1 | 0 | 0 | 0 | 0 |
| State | De | <u>Do</u> | Ac | De | De | Do | Do |
| MAC CE 1 | 0 | 1 | 1 | 1 | 0 | 1 | 1 |
| State | De | Do | Ac | <u>Ac</u> | De | Do | Do |
| MAC CE 1 | 0 | 0 | 1 | 1 | 0 | 1 | 1 |
| State | De | <u>De</u> | Ac | Ac | De | Do | Do |
| MAC CE 2 | 0 | 0 | 1 | 1 | 0 | 1 | 0 |
| State | De | De | Ac | Ac | De | <u>Ac</u> | Do |
| MAC CE 2 | 1 | 0 | 1 | 1 | 0 | 1 | 0 |
| State | <u>Do</u> | De | Ac | Ac | De | Ac | Do |

Figure 14A:
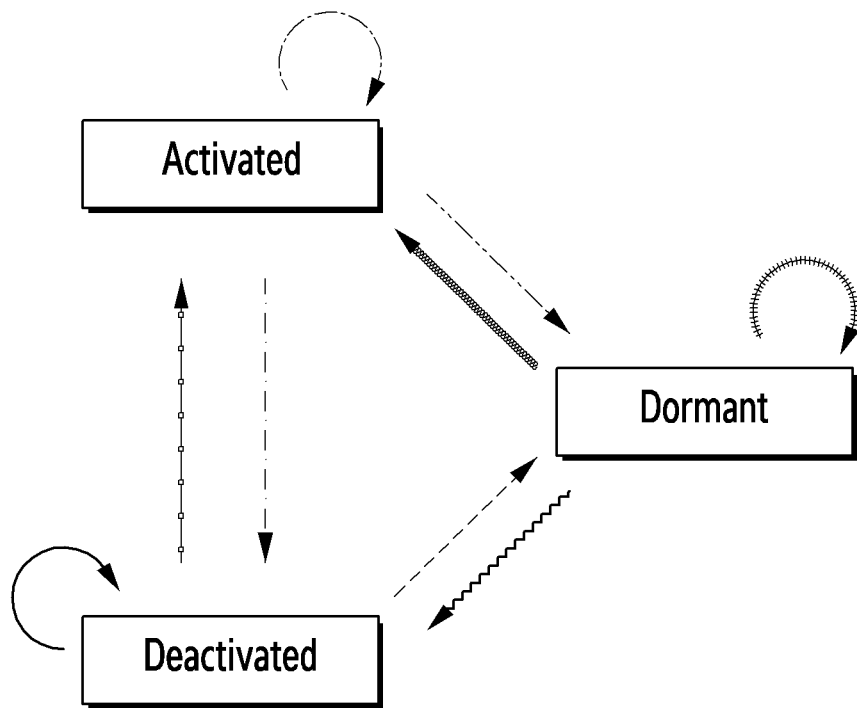
FIG. 14A is an illustration of MAC control information supporting the state transition for an SCell in a wireless communication system according to an embodiment.
Figure 14B:
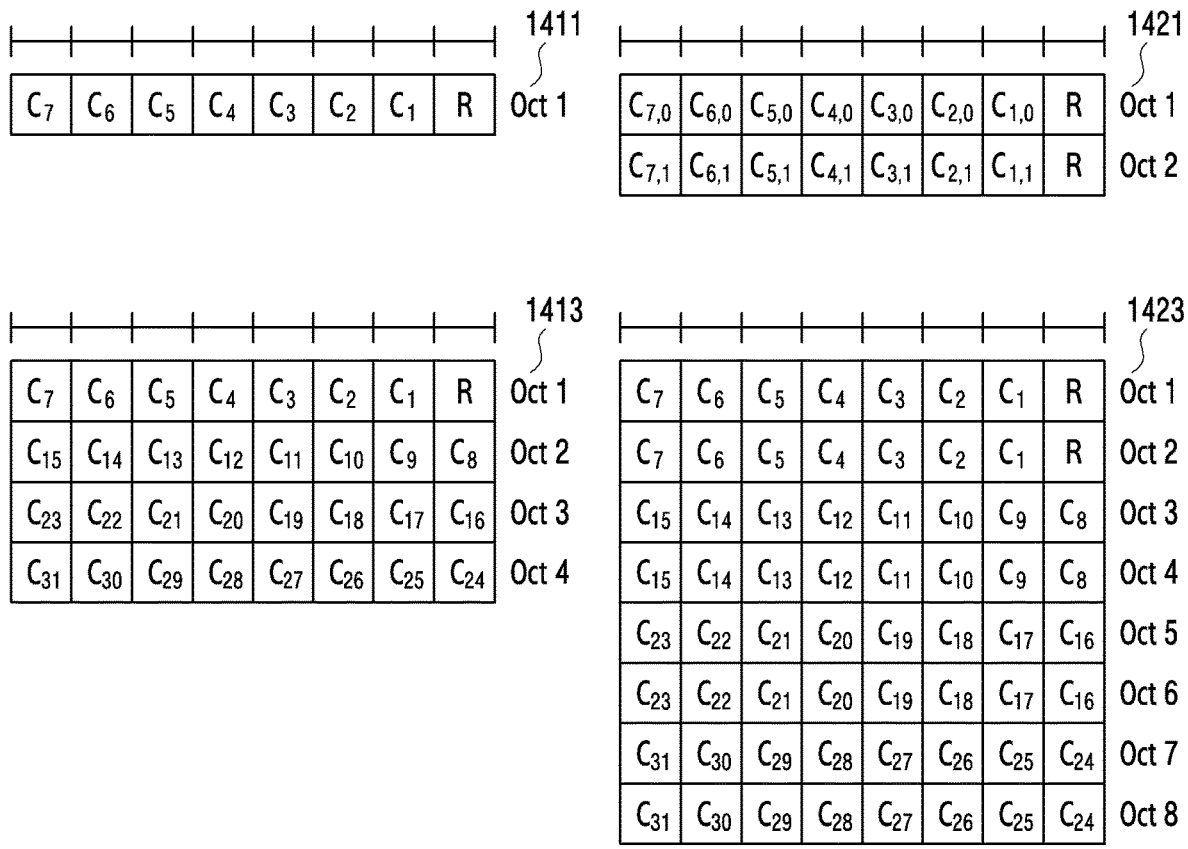
FIG. 14B is an illustration of an octet structure according to MAC control information supporting state transition for an SCell in a wireless communication system according to an embodiment.

FIGS. 14A and 14B are illustrations of a third embodiment of MAC control information supporting state transition for the SCell in a wireless communication system according to an embodiment. The third embodiment of the MAC control information is described below with reference to FIG. 11. The third embodiment of the MAC control information supports the state transition 1130 (De to Do) of FIG. 11. That is, even though the frequency or the usage of use cases of the state transition 1130 (De to Do) is low, it is possible to save battery power of the UE and report a frequency measurement result in advance by switching the SCell in the deactivated state to the dormant state. The eNB may determine whether to perform activation according to the reported frequency measurement result and thus the state transition 1130 may be used.

Referring to FIGS. 14A and 14B, a first MAC CE and a second MAC CE are defined as the MAC control information, and state transition according to the first MAC CE or the second MAC CE is supported. The first MAC CE cannot switch the state of the SCell which is in the dormant state. The second MAC CE may indicate each of all states for each SCell through 2 bits or initialize the states to a particular state. Accordingly, if the second MAC CE is used, the eNB does not need to track the state transition for each SCell of the UE. Therefore, complexity of implantation of the eNB may be reduced.

First MAC control information, that is, the first MAC CE in the third embodiment is described below. The first MAC CE may be referred to as an activation/deactivation MAC CE. The first MAC CE may have the fixed size of one byte and may be identified by an LCID. The first MAC CE may have seven C fields and one R field and a detailed format thereof is the same as that of an MAC CE 1411 of FIG. 14B. The MAC CE 1411 consists of one octet.

Further, the first MAC CE may have the fixed size of 4 bytes and may be identified by an LCID. The first MAC CE may have 31 C fields and one R field and a detailed format thereof is the same as that of an MAC CE 1413 of FIG. 14B. The MAC CE 1413 consists of four octets.

If configured cell identifiers (SCell indexes) do not exceed 7, the first MAC CE having the size of 1 byte may be used. Otherwise, the first MAC CE having the size of 4 bytes may be used.

C(i) field: indicates that the SCell configured with SCellIndex i is in the activated state, the deactivated state, or the dormant state if there is an SCell configured with SCellIndex i. Otherwise, the MAC entity ignores this field. When the C(i) field is set to 1, the C(i) field indicates that the state of the SCell configured with SCellIndex i should be activated. However, when the state of the SCell configured with SCellIndex i is the dormant state, the MAC entity ignores the C(i) field. When the C(i) field is set to 0, the C(i) field indicates that the state of the SCell configured with SCellIndex i is deactivated.

R field: denotes a reserved field and is configured as 0.

The first MAC CE according to the third embodiment may be defined as shown in Table 7 below.

TABLE 7

| C(i) field | State transition |
|---|---|
| 0 | Ac→De, Do→Do, De→De |
| 1 | Ac→Ac, Do→Do, De→Ac |

Second MAC control information, that is, the second MAC CE in the third embodiment is described below. The second MAC CE may be referred to as an activation/hibernation MAC CE.

The second MAC CE may have the fixed size of 2 bytes and may be identified by an LCID. The second MAC CE may have seven C fields having the size of 2 bits and one R field having the size of 2 bits and a detailed format thereof is the same as that of an MAC CE 1421 of FIG. 14B. The MAC CE 1421 consists of two octets.

The second MAC CE may have the fixed size of 8 bytes and may be identified by an LCID. The second MAC CE may have 31 C fields having the size of 2 bits and one R field having the size of 2 bits and a detailed format thereof is the same as that of an MAC CE 1423 of FIG. 14B. The MAC CE 1423 consists of 8 octets.

If configured cell identifiers (SCell indexes) do not exceed 7, the second MAC CE having the size of 2 byte may be used. Otherwise, the second MAC CE having the size of 8 bytes may be used.

C(i,1) C(i,0) field: 2-bit information indicating that the SCell configured with SCellIndex i is in the activated state, the dormant state, or the deactivated state if there is an SCell configured with SCellIndex i. Otherwise, the MAC entity ignores this field. When the C(i,1) C(i,0) field is set to one value (00, 01, 10, or 11, for example, 00) of 2-bit information, the C(i,1) C(i,0) field may indicate that the state transition for the SCell configured with SCellIndex i does not occur or may be a reserved value. When the C(i) field is set to one value (00, 01, 10, or 11, for example, 01) of 2-bit information, the C(i,1) C(i,0) field indicates that the state for the SCell configured with SCellIndex i should be activated. When the C(i,1) C(i,0) field is set to one value (00, 01, 10, or 11, for example, 10) of 2-bit information, the C(i,1) C(i,0) field indicates that the state for the SCell configured with SCellIndex i should be deactivated. When the C(i,1) C(i,0) field is set to one value (00, 01, 10, or 11, for example, 11) of 2-bit information, the C(i,1) C(i,0) field indicates that the state for the SCell configured with SCellIndex i should be dormant.

R field: denotes a reserved field and is configured as 0.

The second MAC control information according to the third embodiment may be defined as shown in Table 8 below.

TABLE 8

| C(i) field | State transition |
|---|---|
| 00 | No state transition or reserved |
| 01 | Activation (activated state) |
| 10 | Deactivation (deactivated state) |
| 11 | Hibernation (dormant state) |

When 2 bits are used, the second MAC control information according to the third embodiment may be defined as shown in Table 9 below in order not to support the state transition 1130 (De to Do).

TABLE 9

| C(i) field | State transition |
|---|---|
| 00 | No state transition or reserved |
| 01 | Ac/Do/De→Ac |
| 10 | Ac/Do→Do, De→De |
| 11 | Ac/Do/De→De |

In the first MAC CE and the second MAC CE according to the third embodiment, MAC CEs having the size of 1 byte or 2 bytes and MAC CEs having the size of 4 bytes or 8 bytes may have different logical channel identifiers and thus may be distinguished from each other. Further, the first MAC CE and the second MAC CE may have fixed lengths. Accordingly, in this case, an L field is not needed in a MAC sub header.

In another method, an L field of a MAC sub header may be used to save a space of the LCID. That is, LCID 1 may indicate the first MAC CE having the size of 1 byte or the second MAC CE having the size of 2 bytes, and may perform optimization by indicating the first MAC CE having the size of 1 byte if the L field value indicates 1 byte and indicating the second MAC CE having the size of 2 bytes if the L field value indicates 2 bytes LCID 2 may indicate the first MAC CE having the size of 4 bytes or the second MAC CE having the size of 8 bytes, and may perform optimization by indicating the first MAC CE having the size of 4 bytes if the L field value indicates 4 byte and indicating the second MAC CE having the size of 8 bytes if the L field value indicates 8 bytes Accordingly, in this case, the L field is not needed in the MAC sub header.

The MAC control information indicating the state transition in the disclosure should support all state transitions for each SCell of FIG. 11. It may be easily identified whether the first MAC CE and the second MAC CE in the third embodiment of the disclosure support all state transitions of FIG. 11. It may be intuitively identified whether the third embodiment supports all state transitions for each SCell of FIG. 11 based on the description and tables of FIG. 14A.

Figure 15A:
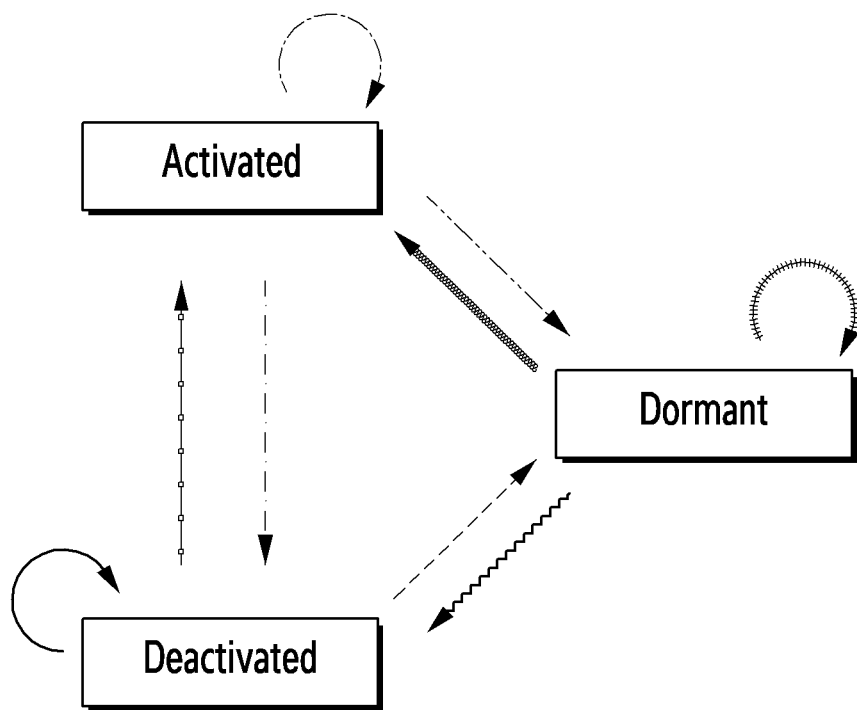
FIG. 15A is an illustration of MAC control information supporting the state transition for an SCell in a wireless communication system according to an embodiment.
Figure 15B:
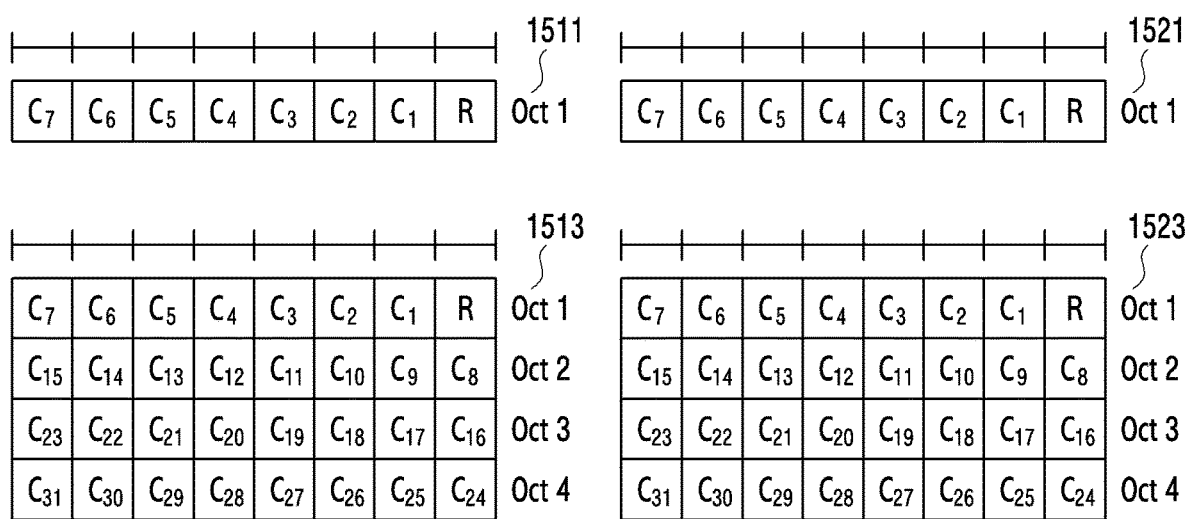
FIG. 15B is an illustration of an octet structure according to MAC control information supporting state transition for an SCell in a wireless communication system according to an embodiment.

FIGS. 15A and 15B are illustrations of a fourth embodiment of MAC control information supporting state transition for an SCell in a wireless communication system according to an embodiment. The fourth embodiment of the MAC control information is described below with reference to FIG. 11. The fourth embodiment of the MAC control information supports the state transition 1130 (De to Do) of FIG. 11. That is, even though the frequency or the usage of use cases of the state transition 1130 (De to Do) is low, it is possible to save battery power of the UE and report a frequency measurement result in advance by switching the SCell in the deactivated state to the dormant state. The eNB may determine whether to perform activation according to the reported frequency measurement result and thus the state transition 1130 may be used.

Referring to FIGS. 15A and 15B, a first MAC CE and a second MAC CE are defined as the MAC control information and state transition is supported. The first MAC CE can deactivate the SCell which is in the dormant state but cannot activate the SCell. Further, the second MAC CE may switch the SCell in the deactivated state to the dormant state through one value (0 or 1, for example, 1) of 1-bit information and continuously maintain the deactivated state of the SCell which is in the deactivated state through one value (0 or 1, for example, 0) of 1-bit information.

First MAC control information, that is, the first MAC CE in the fourth embodiment is described below. The first MAC CE may be referred to as an activation/deactivation MAC CE. The first MAC CE may have the fixed size of one byte and may be identified by an LCID. The first MAC CE may have seven C fields and one R field and a detailed format thereof is the same as that of an MAC CE 1511 of FIG. 15B. The MAC CE 1511 consists of one octet.

Further, the first MAC CE may have the fixed size of 4 bytes and may be identified by an LCID. The first MAC CE may have 31 C fields and one R field and a detailed format thereof is the same as that of an MAC CE 1513 of FIG. 15B. The MAC CE 1513 consists of 4 octets.

If configured cell identifiers (SCell indexes) do not exceed 7, the first MAC CE having the size of 1 byte may be used. Otherwise, the first MAC CE having the size of 4 bytes may be used.

C(i) field: indicates that the SCell configured with SCellIndex i is in the activated state, the dormant state, or the deactivated state if there is an SCell configured with SCellIndex i. Otherwise, the MAC entity ignores this field. When the C(i) field is set to 1, the C(i) field indicates that the state of the SCell configured with SCellIndex i should be activated. However, when the state of the SCell configured with SCellIndex i is the dormant state, the MAC entity ignores the value of 1 of the C(i) field. When the C(i) field is set to 0, the C(i) field indicates that the state of the SCell configured with SCellIndex i is deactivated.

R field: denotes a reserved field and is configured as 0.

The first MAC CE according to the fourth embodiment may be defined as shown in Table 10 below.

TABLE 10

| C(i) field | State transition |
|---|---|
| 0 | Ac→De, Do→De, De→De |
| 1 | Ac→Ac, Do→Do, De→Ac |

Second MAC control information, that is, the second MAC CE in the fourth embodiment is described below. The second MAC CE may be referred to as an activation/hibernation MAC CE.

The second MAC CE may have the fixed size of 1 byte and may be identified by an LCID. The second MAC CE may have seven C fields and one R field and a detailed format thereof is the same as that of an MAC CE 1521 of FIG. 15B. The format is the same as that of the MAC CE 1521 of FIG. 15B. The MAC CE 1521 consists of one octet.

Further, the second MAC CE may have the fixed size of 4 bytes and may be identified by an LCID. The second MAC CE may have 31 C fields and one R field and a detailed format thereof is the same as that of an MAC CE 1523 of FIG. 15B. The MAC CE 1523 consists of 4 octets.

If configured cell identifiers (SCell indexes) do not exceed 7, the second MAC CE having the size of 1 byte may be used. Otherwise, the second MAC CE having the size of 4 bytes may be used.

C(i) field: indicates that the SCell configured with SCellIndex i is in the activated state, the dormant state, or the deactivated state if there is an SCell configured with SCellIndex i. Otherwise, the MAC entity ignores this field. When the C(i) field is set to one value (0 or 1, for example, 1) of 1-bit information, the C(i) field indicates that the state for the SCell configured with SCellIndex i should be activated. However, when the state of the SCell configured with SCellIndex i is the deactivated state, one value (0 or 1, for example, 0) of 1-bit information of the C(i) field indicates state transition of the SCell to the dormant state. When the C(i) field is set to one value (0 or 1, for example, 0) of 1-bit information, the C(i) field indicates that the state for the SCell configured with SCellIndex i shall be dormant. However, when the SCell configured with SCellIndex i is in the deactivated state, the MAC entity ignores the one value (0 or 1, for example, 1) of the 1-bit information.

R field: denotes a reserved field and is configured as 0.

The second MAC control information according to the fourth embodiment may be defined as shown in Table 11 below.

TABLE 11

| C(i) field | State transition |
|---|---|
| 0 | Ac→Do, Do→Do, De→De |
| 1 | Ac→Ac, Do→Ac, De→Do |

In the first MAC CE and the second MAC CE according to the fourth embodiment, MAC CE having the size of 4 byte and MAC CEs having the size of 4 bytes may have different LCIDs and thus are distinguished from each other. Further, the first MAC CE and the second MAC CE may have fixed lengths. Accordingly, in this case, an L field is not needed in a MAC sub header.

In another method, the R field may be used to save a space of the LCID. That is, LCID 1 indicates the first MAC CE or the second MAC CE having the size of 1 byte, and may perform optimization by indicating the first MAC CE having the size of 1 byte if the R field value is 0 and indicating the second MAC CE having the size of 1 byte if the R field value is 1. LCID 2 indicates the first MAC CE or the second MAC CE having the size of 4 byte, and may perform optimization by indicating the first MAC CE having the size of 4 byte if the R field value is 0 and indicating the second MAC CE having the size of 4 bytes if the R field value is 4. Accordingly, in this case, an L field is not needed in a MAC sub header.

MAC control information indicating the state transmission of the disclosure should support all state transmissions for each SCell of FIG. 11. An example of how the first MAC CE and the second MAC CE in the fourth embodiment support the state transition is described below.

When there is a plurality of states for each SCell as shown in Table 12 below, it may be identified that MAC control information is correctly designed through a change in only one state to another state. The first MAC CE and the second MAC CE in the fourth embodiment of the disclosure support the state transition for the number of all cases as shown in Table 12 below.

TABLE 12

| SCell index | 7 | 6 | 5 | 4 | 3 | 2 | 1 |
|---|---|---|---|---|---|---|---|
| State | Ac | Ac | Ac | De | De | Do | Do |
| MAC CE 1 | 0 | 1 | 1 | 0 | 0 | 1 | 1 |
| State | De | Ac | Ac | De | De | Do | Do |
| MAC CE 2 | 0 | 0 | 1 | 1 | 1 | 1 | 1 |
| State | De | Do | Ac | De | De | Do | Do |
| MAC CE 1 | 0 | 1 | 1 | 1 | 0 | 1 | 1 |
| State | De | Do | Ac | Ac | De | Do | Do |
| MAC CE 1 | 0 | 0 | 1 | 1 | 0 | 1 | 1 |
| State | De | De | Ac | Ac | De | Do | Do |
| MAC CE 2 | 1 | 1 | 1 | 1 | 1 | 1 | 0 |

TABLE 12-continued

| SCell index | 7 | 6 | 5 | 4 | 3 | 2 | 1 |
|---|---|---|---|---|---|---|---|
| State | De | De | Ac | Ac | De | <u>Ac</u> | Do |
| MAC CE 2 | 0 | 1 | 1 | 1 | 1 | 1 | 0 |
| State | <u>Do</u> | De | Ac | Ac | De | Ac | Do |

Figure 16A:
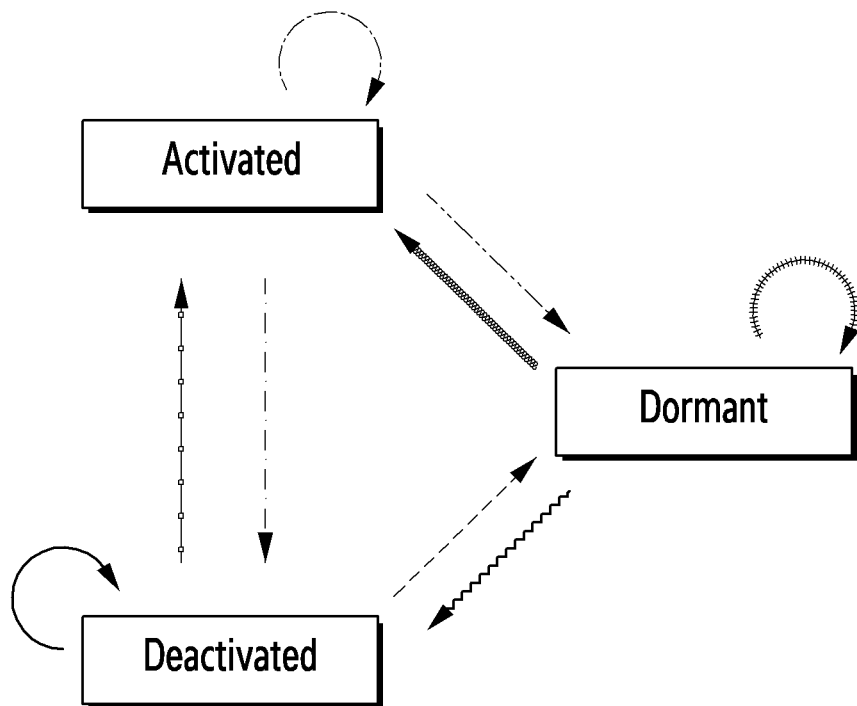
FIG. 16A is an illustration of MAC control information supporting the state transition for an SCell in a wireless communication system according to an embodiment.
Figure 16B:
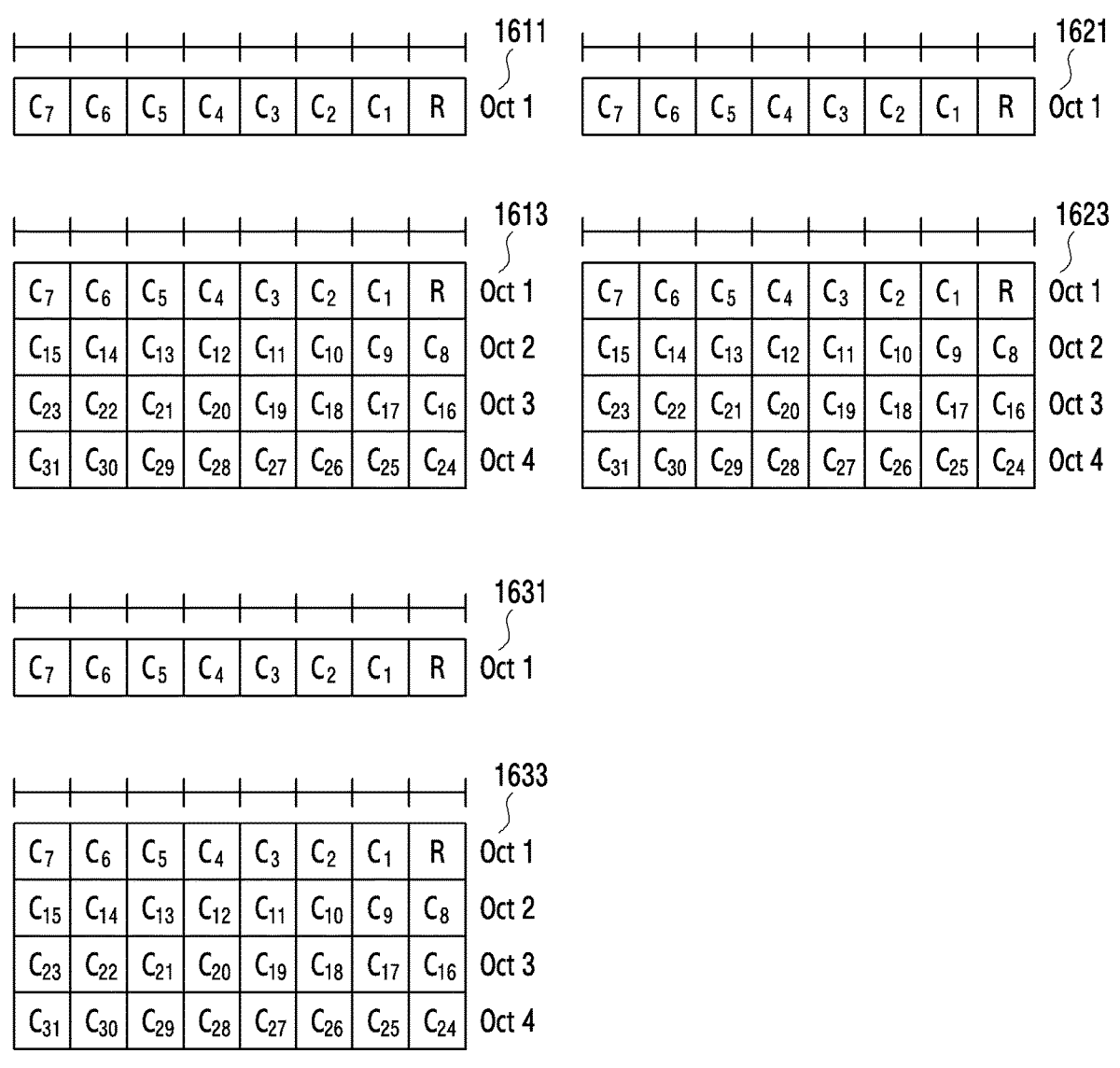

FIGS. 16A and 16B are illustrations of a fifth embodiment of MAC control information supporting state transition for an SCell in a wireless communication system according to an embodiment. The fifth embodiment of the MAC control information is described below with reference to FIG. 11. The fifth embodiment of the MAC control information supports the state transition 1130 (De to Do) of FIG. 11. That is, even though the frequency or the usage of use cases of the state transition 1130 (De to Do) is low, it is possible to save battery power of the UE and report a frequency measurement result in advance by switching the SCell in the deactivated state to the dormant state. The eNB may determine whether to perform activation according to the reported frequency measurement result and thus the state transition 1130 may be useful.

Referring to FIGS. 16A and 16B, a first MAC CE, a second MAC CE, and a third MAC CE are defined as the MAC control information, and state transition according to the first MAC CE, the second MAC CE, or the third MAC CE is supported. The first MAC CE does not perform state transition for the dormant state of the SCell. The second MAC CE continuously maintains the deactivated state for the SCell which is in the deactivated state through one value (0 or 1, for example, 1) of 1-bit information. Further, the second MAC CE does not perform state transition for the SCell through one value (0 or 1, for example, 0) of 1-bit information. The third MAC CE continuously maintains the activated state for the SCell which is in the activated state through one value (0 or 1, for example, 1) of 1-bit information. Further, the third MAC CE does not perform state transition for the SCell through one value (0 or 1, for example, 0) of 1-bit information.

First MAC control information, that is, the first MAC CE in the fifth embodiment is described below. The first MAC CE may be referred to as an activation/deactivation MAC CE. The first MAC CE may have the fixed size of 1 byte and may be identified by an LCID. The first MAC CE may have seven C fields and one R field and a detailed format thereof is the same as that of an MAC CE 1611 of FIG. 16B. The MAC control information 1611 consists of one octet.

Further, the first MAC CE may have the fixed size of 4 bytes and may be identified by an LCID. The first MAC CE may have 31 C fields and one R field and a detailed format thereof is the same as that of an MAC CE 1613 of FIG. 16B. The MAC CE 1613 consists of 4 octets.

If configured cell identifiers (SCell indexes) do not exceed 7, the first MAC CE having the size of 1 byte may be used. Otherwise, the first MAC CE having the size of 4 bytes may be used.

C(i) field: indicates that the SCell configured with SCellIndex i is in the activated state, the deactivated state, or the dormant state if there is an SCell configured with SCellIndex i. Otherwise, the MAC entity ignores this field. When the C(i) field is set to 1, the C(i) field indicates that the state of the SCell configured with SCellIndex i should be activated. When the C(i) field is set to 0, the C(i) field indicates that the state of the SCell configured with SCellIndex i is deactivated. However, when the state of the SCell configured with SCellIndex i is the dormant state, the MAC entity ignores the C(i) field.

R field: denotes a reserved field and is configured as 0.

The first MAC CE according to the fifth embodiment may be defined as shown in Table 13 below.

TABLE 13

| C(i) field | State transition |
|---|---|
| 0 | Ac→De, Do→Do, De→De |
| 1 | Ac→Ac, Do→Do, De→Ac |

Second MAC control information, that is, the second MAC CE in the fifth embodiment is described below. The second MAC CE may be referred to as an activation/hibernation MAC CE.

The second MAC CE may have the fixed size of 1 byte and may be identified by an LCID. The second MAC CE may have seven C fields and one R field and a detailed format thereof is the same as that of an MAC CE 1621 of FIG. 16B. The MAC CE 1621 consists of one octet.

Further, the second MAC CE may have the fixed size of 4 bytes and may be identified by an LCID. The second MAC CE may have 31 C fields and one R field and a detailed format thereof is the same as that of an MAC CE 1623 of FIG. 16B. The MAC CE 1623 consists of 4 octets.

If configured cell identifiers (SCell indexes) do not exceed 7, the second MAC CE having the size of 1 byte may be used. Otherwise, the second MAC CE having the size of 4 bytes may be used.

C(i) field: indicates that the SCell configured with SCellIndex i is in the activated state, the dormant state, or the deactivated state if there is an SCell configured with SCellIndex i. Otherwise, the MAC entity ignores this field. When the C(i) field is set to one value (0 or 1, for example, 1) of 1-bit information, the C(i) field indicates state transition to the dormant state if the state for the SCell configured with SCellIndex i is the activated state, indicates the state transition to the activated state if the state for the SCell is the dormant state, and indicates the transition state to the deactivated state if the state for the SCell is the deactivated state. However, when the C(i) field configured with SCellIndex i is configured as one value (0 or 1, for example, 0) of 1-bit information, the C(i) field may indicate to not perform state transition for the SCell or the one value (for example, 0) may be a reserved value.

R field: denotes a reserved field and is configured as 0.

The second MAC control information according to the fifth embodiment may be defined as shown in Table 14 below.

TABLE 14

| C(i) field | State transition |
|---|---|
| 0 | No state transition or reserved |
| 1 | Ac→Do, Do→Ac, De→De |

Not only first MAC control information and second MAC control information, but also third MAC control information is defined. Third MAC control information, that is, the third MAC CE in the fifth embodiment is described below. The third MAC CE may be referred to as a deactivation/hibernation MAC CE.

The third MAC CE may have the fixed size of 1 byte and may be identified by an LCID. The third MAC CE may have seven C fields and one R field and a detailed format thereof is the same as that of an MAC CE 1631 of FIG. 16B. The MAC CE 1631 consists of one octet.

Further, the second MAC CE may have the fixed size of 4 bytes and may be identified by an LCID. The second MAC CE may have 31 C fields and one R field and a detailed format thereof is the same as that of an MAC CE 1633 of FIG. 16B. The MAC CE 1633 consists of 4 octets.

If configured cell identifiers (SCell indexes) do not exceed 7, the third MAC CE having the size of 1 byte may be used. Otherwise, the third MAC CE having the size of 4 bytes may be used.

C(i) field: indicates that the SCell configured with SCellIndex i is in the activated state, the dormant state, or the deactivated state if there is an SCell configured with SCellIndex i. Otherwise, the MAC entity ignores this field. When the C(i) field is set to one value (0 or 1, for example, 1) of 1-bit information, the C(i) field indicates state transition to the dormant state if the state for the SCell configured with SCellIndex i is deactivated state, indicates the state transition to the deactivated state if the state for the SCell is the dormant state, and indicates the transition state to the activated state if the state for the SCell is the activated state. However, when the C(i) field configured with SCellIndex i is configured as one value (0 or 1, for example, 0) of 1-bit information, the C(i) field may indicate to not perform state transition for the SCell or the one value (for example, 0) may be a reserved value.

R field: denotes a reserved field and is configured as 0.

The third MAC control information according to the fifth embodiment may be defined as shown in Table 15 below.

TABLE 15

| C(i) field | State transition |
|---|---|
| 0 | No state transition or reserved |
| 1 | Ac→Ac, Do→De, De→Do |

In the first MAC CE, the second MAC CE, and the third MAC CE according to the fifth embodiment, MAC CEs having the size of 1 byte and MAC CEs having the size of 4 bytes may be distinguished through different LCIDs. Each of the first MAC CE, the second MAC CE, and the third MAC CE may have a fixed length. Accordingly, in this case, an L field is not needed in a MAC sub header.

The MAC control information indicating the state transition in the disclosure should support all state transitions for each SCell of FIG. 11. When the first MAC CE, the second MAC CE, and the third MAC CE in the fifth embodiment of the disclosure are used, it may be easily identified whether all state transitions of FIG. 11 are supported. It may be intuitively identified whether the fifth embodiment supports all state transitions for each SCell of FIG. 11 based on the description and tables of FIG. 16A.

Figure 17A:
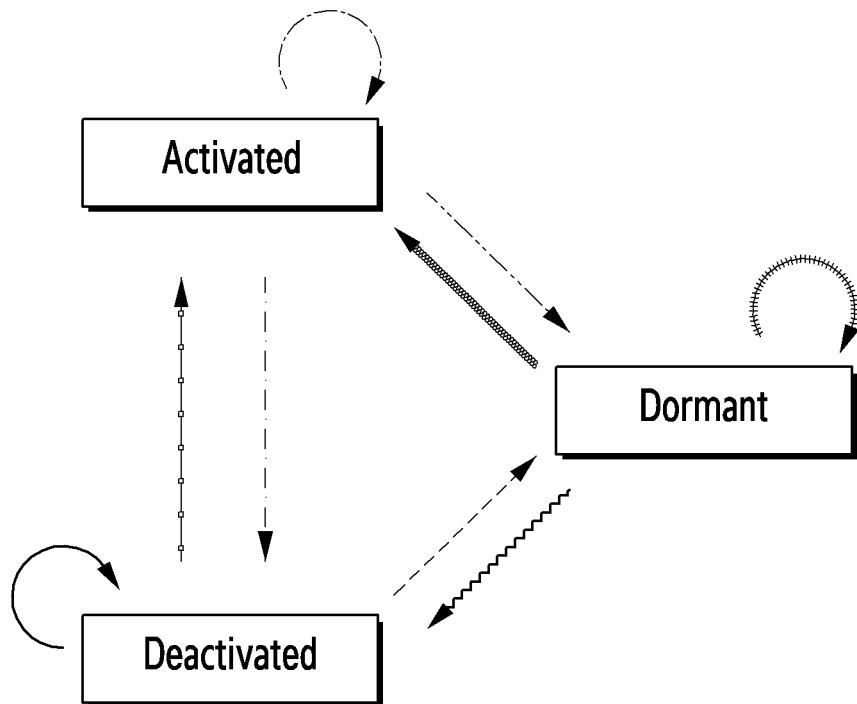
FIG. 17A is an illustration of MAC control information supporting the state transition for an SCell in a wireless communication system according to an embodiment.
Figure 17B:
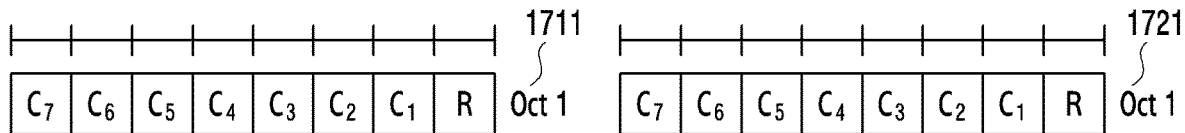
FIG. 17B is an illustration of an octet structure according to MAC control information supporting state transition for an SCell in a wireless communication system according to an embodiment.
Figure 17B:
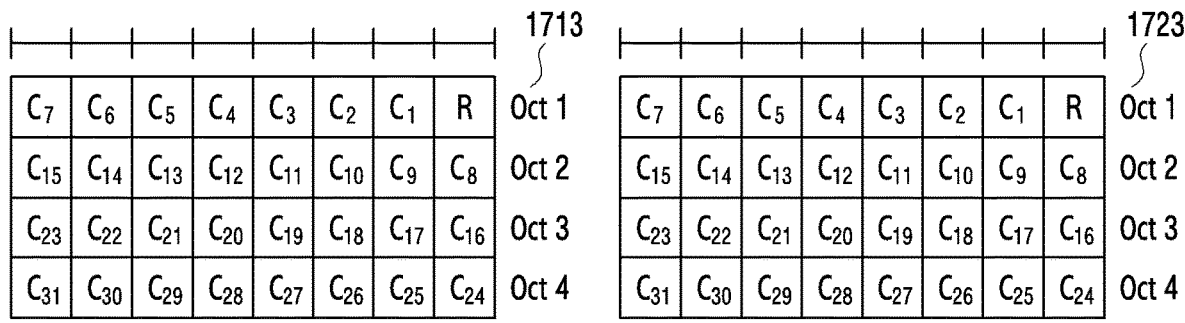
Figure 17B:
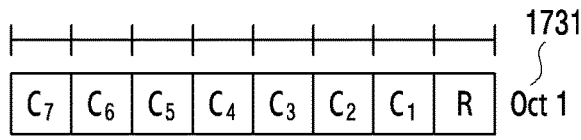
Figure 17B:
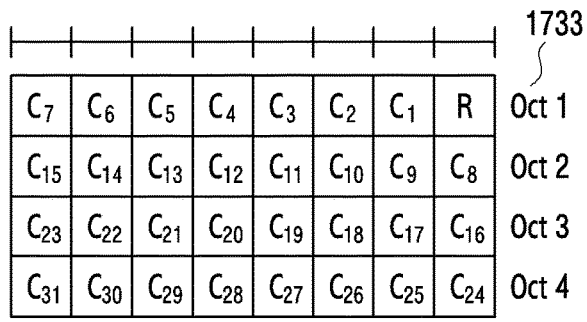

FIGS. 17A and 17B are illustrations of a sixth embodiment of MAC control information supporting state transition for an SCell in a wireless communication system according to an embodiment. The sixth embodiment of the MAC control information is described below with reference to FIG. 11. The sixth embodiment of the MAC control information supports the state transition 1130 (De to Do) of FIG. 11. That is, even though the frequency or the usage of use cases of the state transition 1130 (De to Do) is low, it is possible to save battery power of the UE and report a frequency measurement result in advance by switching the SCell in the deactivated state to the dormant state. The eNB may determine whether to perform activation according to the reported frequency measurement result and, thus, the state transition 1130 may be used.

Referring to FIGS. 17A and 17B, a first MAC CE, a second MAC CE, and a third MAC CE are defined as the MAC control information, and state transition according to the first MAC CE, the second MAC CE, or the third MAC CE is supported. The first MAC CE does not perform state transition for the dormant state of the SCell. The second MAC CE continuously maintains the deactivated state for the SCell which is in the deactivated state through one value (0 or 1, for example, 1) of 1-bit information. Further, the second MAC CE does not perform state transition for the SCell through one value (0 or 1, for example, 0) of 1-bit information. The third MAC CE continuously maintains the activated state for the SCell which is in the activated state through one value (0 or 1, for example, 1) of 1-bit information. Further, the third MAC CE does not perform state transition for the SCell through one value (0 or 1, for example, 0) of 1-bit information.

First MAC control information, that is, the first MAC C in the sixth embodiment is described below. The first MAC CE may be referred to as an activation/deactivation MAC CE. The first MAC CE may have the fixed size of 1 byte and may be identified by an LCID. The first MAC CE may have seven C fields and one R field and a detailed format thereof is the same as that of an MAC CE 1711 of FIG. 17B. The MAC CE 1711 consists of one octet.

Further, the first MAC CE may have the fixed size of 4 bytes and may be identified by an LCID. The first MAC CE may have 31.0 fields and one R field and a detailed format thereof is the same as that of an MAC CE 1713 of FIG. 17B. The MAC CE 1713 consists of 4 octets.

If configured cell identifiers (SCell indexes) do not exceed 7, the first MAC CE having the size of 1 byte may be used. Otherwise, the first MAC CE having the size of 4 bytes may be used.

C(i) field: indicates that the SCell configured with SCellIndex i is in the activated state, the deactivated state, or the dormant state if there is an SCell configured with SCellIndex i. Otherwise, the MAC entity ignores this field. When the C(i) field is set to 1, the C(i) field indicates that the state of the SCell configured with SCellIndex i should be activated. When the C(i) field is set to 0, the C(i) field indicates that the state of the SCell configured with SCellIndex i is deactivated. However, when the state of the SCell configured with SCellIndex i is the dormant state, the MAC entity ignores the C(i) field.

R field: denotes a reserved field and is configured as 0.

The first MAC CE according to the sixth embodiment may be defined as shown in Table 16 below.

TABLE 16

| C(i) field | State transition |
|---|---|
| 0 | Ac→De, Do→Do, De→De |
| 1 | Ac→Ac, Do→Do, De→Ac |

Second MAC control information, that is, the second MAC CE in the sixth embodiment is described below. The second MAC CE may be referred to as a hibernation MAC CE.

The second MAC CE may have the fixed size of 1 byte and may be identified by an LCID. The second MAC CE may have seven C fields and one R field and a detailed format thereof is the same as that of an MAC CE 1721 of FIG. 17B. The MAC CE 1721 consists of one octet.

Further, the second MAC CE may have the fixed size of 4 bytes and may be identified by an LCID. The second MAC CE may have 31 C fields and one R field and a detailed format thereof is the same as that of an MAC CE 1723 of FIG. 17B. The MAC CE 1723 consists of 4 octets.

If configured cell identifiers (SCell indexes) do not exceed 7, the second MAC CE having the size of 1 byte may be used. Otherwise, the second MAC CE having the size of 4 bytes may be used.

C(i) field: indicates that the SCell configured with SCellIndex i is in the activated state, the dormant state, or the deactivated state if there is an SCell configured with SCellIndex i. Otherwise, the MAC entity ignores this field. When the C(i) field is set to one value (0 or 1, for example, 1) of 1-bit information, the C(i) field indicates state transition to the dormant state if the state for the SCell configured with SCellIndex i is the activated state, indicates the state transition to the deactivated state if the state for the SCell is the dormant state, and indicates the transition state to the deactivated state if the state for the SCell is the deactivated state. However, when the C(i) field configured with SCellIndex i is configured as one value (0 or 1, for example, 0) of 1-bit information, the C(i) field may indicate to not perform state transition for the SCell or the one value (for example, 0) may be a reserved value.

R field: denotes a reserved field and is configured as 0.

The second MAC control information according to the sixth embodiment may be defined as shown in Table 17 below.

TABLE 17

| C(i) field | State transition |
|---|---|
| 0 | No state transition or reserved |
| 1 | Ac→Do, Do→De, De→De |

Third MAC control information, that is, the third MAC CE in the sixth embodiment is described below. The third MAC CE may be referred to as an activation MAC CE.

The third MAC CE may have the fixed size of 1 byte and may be identified by an LCID. The third MAC CE may have seven C fields and one R field and a detailed format thereof is the same as that of an MAC CE 1731 of FIG. 17B. The MAC CE 1731 consists of one octet.

Further, the second MAC CE may have the fixed size of 4 bytes and may be identified by an LCID. The second MAC CE may have 31 C fields and one R field and a detailed format thereof is the same as that of an MAC CE 1733 of FIG. 17B. The MAC CE 1733 consists of 4 octets.

If configured cell identifiers (SCell indexes) do not exceed 7, the third MAC CE having the size of 1 byte may be used. Otherwise, the third MAC CE having the size of 4 bytes may be used.

C(i) field: indicates that the SCell configured with SCellIndex i is in the activated state, the dormant state, or the deactivated state if there is an SCell configured with SCellIndex i. Otherwise, the MAC entity ignores this field. When the C(i) field is set to one value (0 or 1, for example, 1) of 1-bit information, the C(i) field indicates state transition to the dormant state if the state for the SCell configured with SCellIndex i is deactivated state, indicates the state transition to the activated state if the state for the SCell is the dormant state, and indicates the transition state to the activated state if the state for the SCell is the activated state. However, when the C(i) field configured with SCellIndex i is configured as one value (0 or 1, for example, 0) of 1-bit information, the C(i) field may indicate to not perform state transition for the SCell or the one value (for example, 0) may be a reserved value.

R field: denotes a reserved field and is configured as 0.

The third MAC control information according to the sixth embodiment may be defined as shown in Table 18 below.

TABLE 18

| C(i) field | State transition |
|---|---|
| 0 | No state transition or reserved |
| 1 | Ac→Ac, Do→Ac, De→Do |

In the first MAC CE, the second MAC CE, and the third MAC CE according to the sixth embodiment, MAC CEs having the size of 1 byte and MAC CEs having the size of 4 bytes may be distinguished through different logical channel identifiers. Each of the first MAC CE, the second MAC CE, and the third MAC CE may have a fixed length. Accordingly, in this case, an L field is not needed in a MAC sub header.

The MAC control information indicating the state transition in the disclosure should support all state transitions for each SCell of FIG. 11. When the first MAC CE, the second MAC CE, and the third MAC CE in the sixth embodiment of the disclosure are used, it may be easily identified whether all state transitions of FIG. 11 are supported. It may be intuitively identified whether the sixth embodiment supports all state transitions for each SCell of FIG. 11 based on the description and tables of FIG. 17A.

Figure 18A:
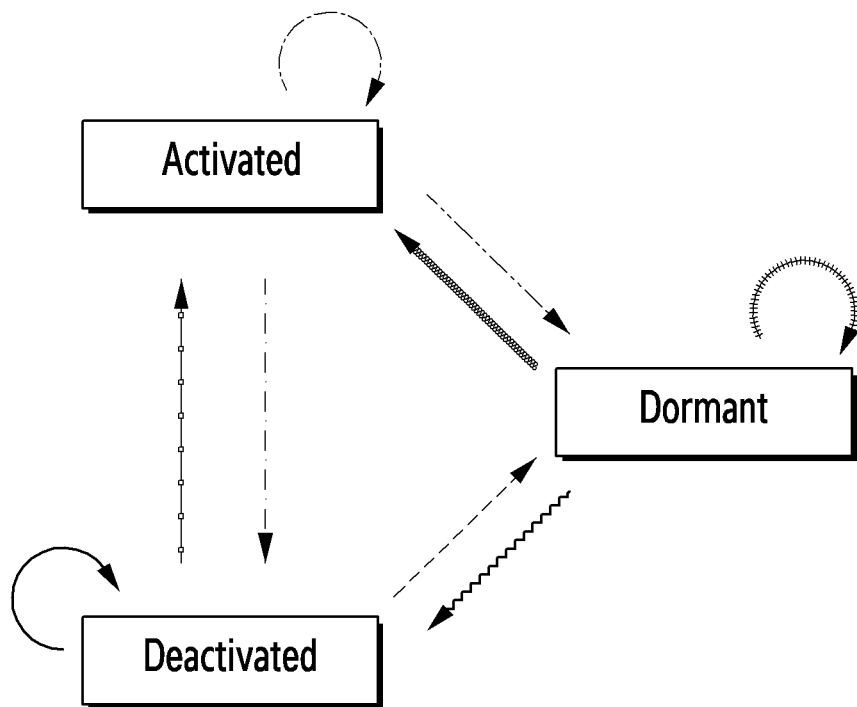
FIG. 18A is an illustration of MAC control information supporting the state transition for an SCell in a wireless communication system according to an embodiment.
Figure 18B:
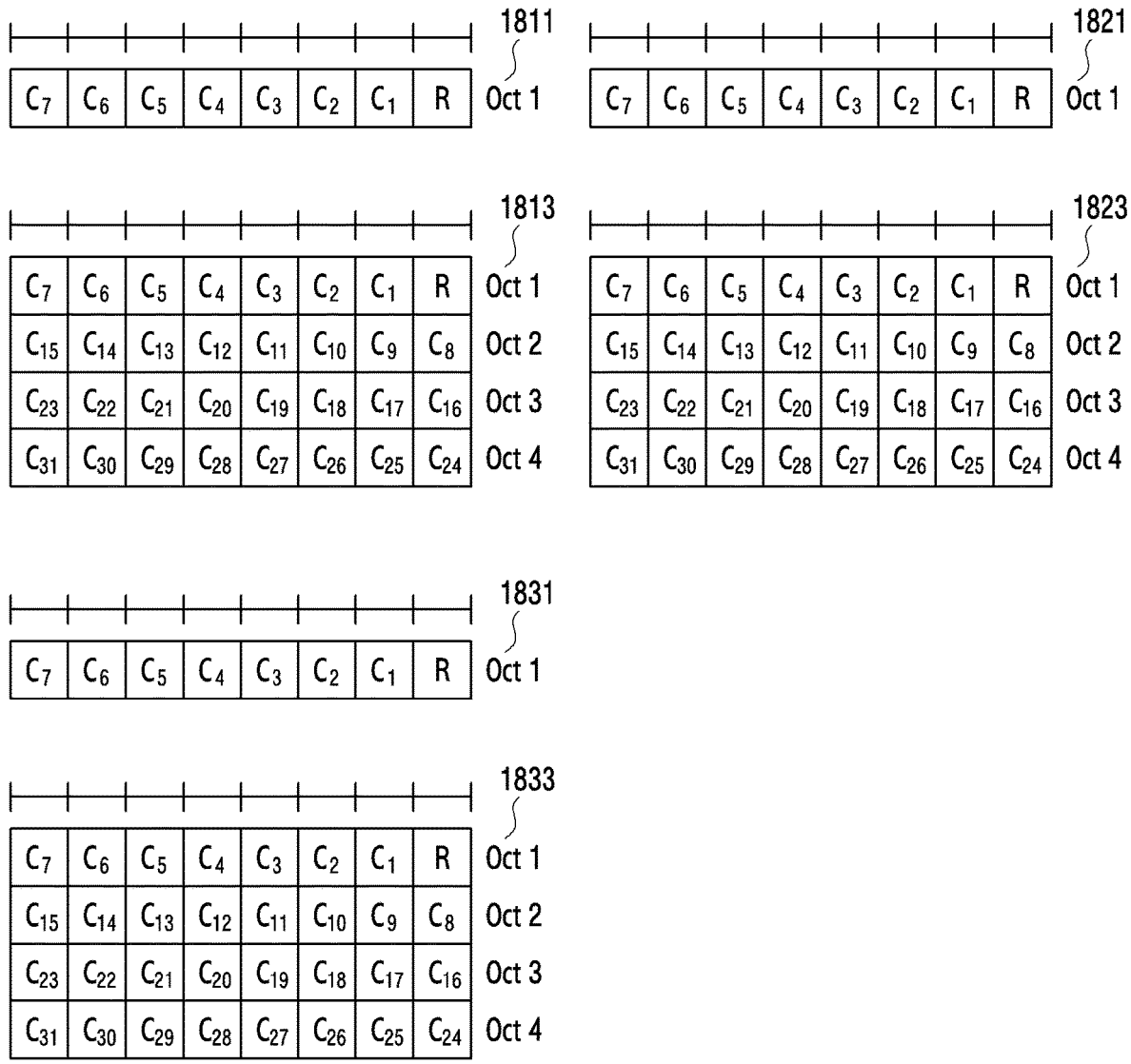
FIG. 18B is an illustration of an octet structure according to MAC control information supporting state transition for an SCell in a wireless communication system according to an embodiment.

FIGS. 18A and 18B illustrate a seventh embodiment of MAC control information supporting state transition for an SCell in a wireless communication system according to an embodiment. The seventh embodiment of the MAC control information is described with reference to FIG. 11. The seventh embodiment of the MAC control information supports the state transition 1130 (De to Do) of FIG. 11. That is, even though the frequency or the usage of use cases of the state transition 1130 (De to Do) is low, it is possible to save battery power of the UE and report a frequency measurement result in advance by switching the SCell in the deactivated state to the dormant state. The eNB may determine whether to perform activation according to the reported frequency measurement result and thus the state transition 1130 may be useful.

Referring to FIGS. 18A and 18B, a first MAC CE, a second MAC CE, and a third MAC CE are defined as the MAC control information, and state transition according to the first MAC CE, the second MAC CE, or the third MAC CE is supported. The first MAC CE does not perform state transition for the dormant state of the SCell. The second MAC CE does not perform state transition for the deactivated state of the SCell. The third MAC CE does not perform state transition for the activated state of the SCell.

First MAC control information, that is, the first MAC C in the seventh embodiment is described below. The first MAC CE may be referred to as an activation/deactivation MAC CE. The first MAC CE may have the fixed size of 1 byte and may be identified by an LCID. The first MAC CE may have seven C fields and one R field and a detailed format thereof is the same as that of an MAC CE 1811 of FIG. 18B. The MAC CE 1811 consists of one octet.

Further, the first MAC CE may have the fixed size of 4 bytes and may be identified by an LCID. The first MAC CE may have 31 C fields and one R field and a detailed format thereof is the same as that of an MAC CE 1813 of FIG. 18B. The MAC CE 1813 consists of 4 octets.

If configured cell identifiers (SCell indexes) do not exceed 7, the first MAC CE having the size of 1 byte may be used. Otherwise, the first MAC CE having the size of 4 bytes may be used.

C(i) field: indicates that the SCell configured with SCellIndex i is in the activated state, the deactivated state, or the dormant state if there is an SCell configured with SCellIndex i. Otherwise, the MAC entity ignores this field. When the C(i) field is set to 1, the C(i) field indicates that the state of the SCell configured with SCellIndex i should be activated. When the C(i) field is set to 0, the C(i) field indicates that the state of the SCell configured with SCellIndex i is deactivated. However, when the state of the SCell configured with SCellIndex i is the dormant state, the MAC entity ignores the C(i) field.

R field: denotes a reserved field and is configured as 0.

The first MAC CE according to the seventh embodiment may be defined as shown in Table 19 below.

TABLE 19

| C(i) field | State transition |
| --- | --- |
| 0 | Ac→De, Do→Do, De→De |
| 1 | Ac→Ac, Do→Do, De→Ac |

Second MAC control information, that is, the second MAC CE in the seventh embodiment is described below. The second MAC CE may be referred to as an activation/hibernation MAC CE.

The second MAC CE may have the fixed size of 1 byte and may be identified by an LCID. The second MAC CE may have seven C fields and one R field and a detailed format thereof is the same as that of an MAC CE 1821 of FIG. 18B. The MAC CE 1821 consists of one octet.

Further, the second MAC CE may have the fixed size of 4 bytes and may be identified by an LCID. The second MAC CE may have 31 C fields and one R field and a detailed format thereof is the same as that of an MAC CE 1823 of FIG. 18B. The MAC CE 1823 consists of 4 octets.

If configured cell identifiers (SCell indexes) do not exceed 7, the second MAC CE having the size of 1 byte may be used. Otherwise, the second MAC CE having the size of 4 bytes may be used.

C(i) field: indicates that the SCell configured with SCellIndex i is in the activated state, the dormant state, or the deactivated state if there is an SCell configured with SCellIndex i. Otherwise, the MAC entity ignores this field. When the C(i) field is set to one value (0 or 1, for example, 1) of 1-bit information, the C(i) field indicates state transition to the activated state if the state for the SCell configured with SCellIndex i is the activated state, indicates the state transition to the activated state if the state for the SCell is the dormant state, and indicates the transition state to the deactivated state if the state for the SCell is the deactivated state. When the C(i) field is set to one value (0 or 1, for example, 0) of 1-bit information, the C(i) field indicates state transition to the dormant state if the state for the S Cell configured with SCellIndex i is the activated state, indicates the state transition to the dormant state if the state for the SCell is the dormant state, and indicates the transition state to the deactivated state if the state for the SCell is the deactivated state.

R field: denotes a reserved field and is configured as 0.

The second MAC control information according to the seventh embodiment may be defined as shown in Table 20 below.

TABLE 20

| C(i) field | State transition |
| --- | --- |
| 0 | Ac→Do, Do→Do, De→De |
| 1 | Ac→Ac, Do→Ac, De→De |

Third MAC control information, that is, the third MAC CE in the seventh embodiment is described below. The third MAC CE may be referred to as a deactivation/hibernation MAC CE.

The third MAC CE may have the fixed size of 1 byte and may be identified by an LCID. The third MAC CE may have seven C fields and one R field and a detailed format thereof is the same as that of an MAC CE 1831 of FIG. 18B. The MAC CE 1831 consists of one octet.

Further, the third MAC CE may have the fixed size of 4 bytes and may be identified by an LCID. The third MAC CE may have 31 C fields and one R field and a detailed format thereof is the same as that of an MAC CE 1833 of FIG. 18B. The MAC CE 1833 consists of 4 octets.

If configured cell identifiers (SCell indexes) do not exceed 7, the third MAC CE having the size of 1 byte may be used. Otherwise, the third MAC CE having the size of 4 bytes may be used.

C(i) field: indicates that the SCell configured with SCellIndex i is in the activated state, the dormant state, or the deactivated state if there is an SCell configured with SCellIndex i. Otherwise, the MAC r ignores this field. When the C(i) field is set to one value (0 or 1, for example, 1) of 1-bit information, the C(i) field indicates state transition to the activated state if the state for the SCell configured with SCellIndex i is the activated state, indicates the state transition to the activated state if the state for the SCell is the dormant state, and indicates the transition state to dormant state if the state for the SCell is the deactivated state. When the C(i) field is set to one value (0 or 1, for example, 0) of 1-bit information, the C(i) field indicates state transition to the activated state if the state for the SCell configured with SCellIndex i is the activated state, indicates the state transition to the deactivated state if the state for the SCell is the dormant state, and indicates the transition state to the deactivated state if the state for the SCell is the deactivated state.

R field: denotes a reserved field and is configured as 0.

The third MAC control information according to the seventh embodiment may be defined as shown in Table 21 below.

TABLE 21

| C(i) field | State transition |
| --- | --- |
| 0 | Do→De, De→De, Ac→Ac |
| 1 | De→Do, Ac→Ac, Do→Do |

In the first MAC CE, the second MAC CE, and the third MAC CE according to the seventh embodiment, MAC CEs having the size of 1 byte and MAC CEs having the size of 4 bytes may be distinguished through different logical channel identifiers. Each of the first MAC CE, the second MAC CE, and the third MAC CE may have a fixed length. Accordingly, in this case, an L field is not needed in a MAC sub header.

The MAC control information indicating the state transition in the disclosure should support all state transitions for each SCell of FIG. 11. When the first MAC CE, the second MAC CE, and the third MAC CE in the seventh embodiment of the disclosure are used, it may be easily identified whether all state transitions of FIG. 11 are supported. It may be intuitively identified whether the sixth embodiment supports all state transitions for each SCell of FIG. 11 based on the description and tables of FIG. 17A.

According to an embodiment, the eNB transmits frequency measurement configuration information to the UE. The UE is configured based on frequency measurement configuration information. In the disclosure, the eNB may configure RRC connection reconfiguration (for example, CA configuration, CSI configuration, or sounding reference signal (SRS) configuration) in the UE through the RRC message (for example, RRC connection setup or RRC connection reconfiguration). CSI, SRS, bandwidth part (BWP) configuration may include periodic CSI (P-CSI), semi-persistent CSI (SP-CSI), or aperiodic CSI (AP-CSI) configuration for each special cell (SpCell)/upload (UL) BWP or P-SRS configuration for each serving cell/UL BWP. The SpCell may be a Pcell of each cell group in DC, that is, a Pcell of a master cell group (MCG) and a PSCell of a secondary cell group (SCG). CA configuration may include DL BWP or UL BWP configuration for each SCell, SCell index (SCellIndex) configuration, or initially configured state (activated state, deactivated state, or dormant state).

Hereinafter, operations of the UE according to the initial state of the SCell are described.

In serving cells of which the initial state is the activated state, the UE may perform operation 1 after operation 1-1. In serving cells of which the initial state is the deactivated state, the UE may perform operation 3. A time point at which operation 1-1 is applied may be a subframe n+x. A subframe n may be a subframe in which an RRC message for configuring the initial state as the activated state is received, and x may be a predetermined integer or an integer configured through an RRC message. Operation 1-1 includes at least one of power headroom (PHR) trigger and SCellDe-activationTimer start. Operation 1 includes at least one of PDCCH monitoring, CSI report, SRS transmission, SCell-DeactivationTimer driving, type 1 CG transmission, serving cell measurement in every DRX cycle. Operation 3 includes serving cell measurement in every greater value among the DRX cycle and sCellMeasCycle, that is, every Max [DRX cycle, sCellMeasCycle]. The sCellMeasCycle is a parameter for determining an SCell measurement interval.

For serving cells (SCells) receiving a MAC CE indicating state transition of the serving cell and instructed to be in the activated state according to various embodiments of the disclosure, the UE may perform operation 1 after operation 1-1. A time point at which operation 1-1 is applied may be a subframe m+y, and the subframe m may be a subframe receiving the MAC CE and y is a predetermined integer or an integer configured through an RRC message. For serving cells (SCells) receiving the MAC CE in the disclosure and instructed to be in the deactivated state, the UE starts operation 3 after operation 3-1 in subframe m+z. z may be a predetermined integer or an integer configured through an RRC message. For serving cells of which the initial state is configured as the dormant state or serving cells receiving the MAC CE and transitioning to the dormant state, the UE may continuously perform operation 2. Operation 3-1 may include at least one of an operation for stopping or resetting a timer for the SCell (SCellDeactivationTimer), deactivate type 2 configured grant (CG), and suspend type 2 CG.

Operation 2 may include at least one of CSI report, SRS transmission, serving cell measurement in every DRX cycle, and measurement result report.

In dormant state serving cells receiving the MAC CE and instructed to transition to the activated state according to various embodiments of the disclosure indicating state transition of the serving cell, the UE performs operation 1 after operation 1-1. In activated state serving cells receiving the MAC CE and instructed to transition to the dormant state, the UE performs operation 2 after operation 2-1. A time point at which operation 1-1 and operation 2-1 are applied may be a symbol k+y (for example, a symbol in which the UE completes HARQ feedback transmission for the received MAC CE). Operation 2-1 may include at least one of an operation for stopping or resetting a timer for the SCell (SCellDeactivationTimer), deactivate type 2 CG, and suspend type 2 CG. The symbol k may be a symbol in which the MAC CE is received, and y may be a predetermined integer or an integer configured through an RRC message.

Figure 19:
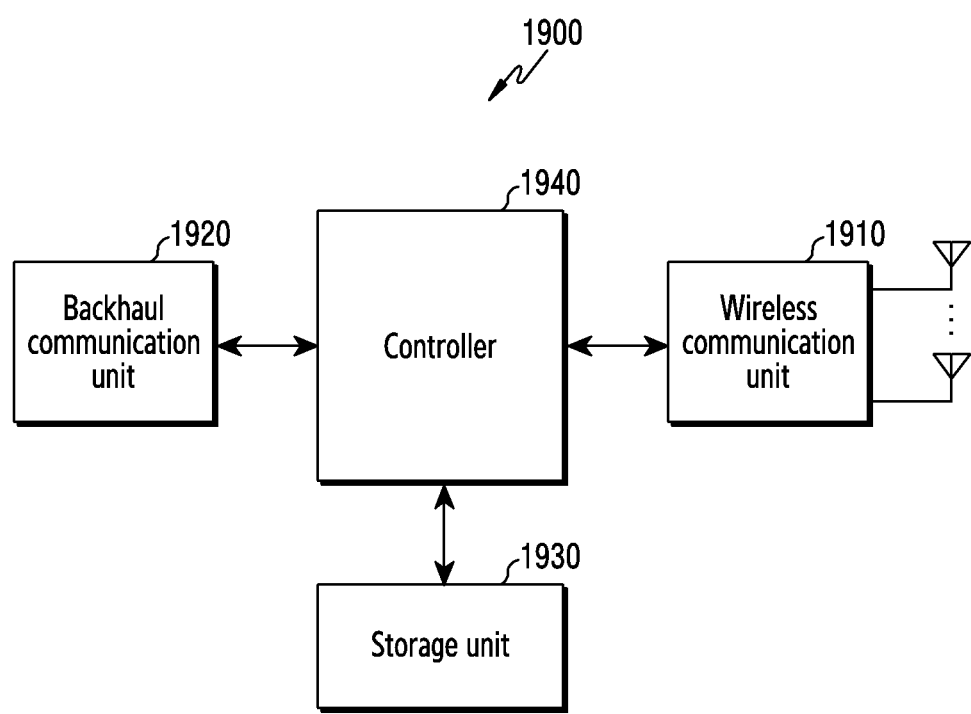
FIG. 19 is a block diagram of an eNB in a wireless communication system according to an embodiment.

FIG. 19 is a block diagram of an eNB 1900 in a wireless communication system according to an embodiment. The eNB 1900 may be the eNB 110 of FIG. 1, the gNB 310, or the eNB 315 of FIG. 3. The term " . . . unit" or the ending of a word, such as " . . . or", " . . . er", or the like may indicate a unit of processing at least one function or operation, and this may be embodied by hardware, software, or a combination of hardware and software.

Referring to FIG. 19, the eNB 1900 includes a wireless communication unit 1910, a backhaul communication unit 1920, a storage unit 1930, and a controller 1940.

The wireless communication unit 1910 performs functions for transmitting and receiving signals through a wireless channel. For example, the communication unit 1910 performs a function of conversion between a baseband signal and a bit stream according to a physical layer standard of the system. For example, in data transmission, the wireless communication unit 1910 generates complex symbols by encoding and modulating a transmission bitstream. In data reception, the communication unit 1910 restores a reception bitstream by demodulating and decoding a baseband signal. The wireless communication unit 1910 up-converts a baseband signal into a radio frequency (RF) band signal and transmits the same through an antenna, and down-converts an RF band signal received through an antenna into a baseband signal.

To this end, the wireless communication unit 1910 may include a transmission filter, a reception filter, an amplifier, a mixer, an oscillator, a digital-to-analog convertor (DAC), an analog-to-digital convertor (ADC), and the like. Further, the wireless communication unit 1910 may include a plurality of transmission/reception paths. In addition, the wireless communication unit 1910 may include at least one antenna array consisting of a plurality of antenna elements. On the hardware side, the wireless communication unit 1910 may include a digital unit and an analog unit, and the analog unit may include a plurality of sub-units according to operation power, operation frequency, and the like.

The wireless communication unit 1910 may transmit and receive a signal. For example, the wireless communication unit 1910 may transmit a synchronization signal, a reference signal, system information, a message, control information, or data. The wireless communication unit 1910 may perform beamforming. The wireless communication unit 1910 may apply a beamforming weighted value to a signal in order to assign directivity according to settings of the controller 1940 to the signal to be transmitted and received.

The wireless communication unit 1910 transmits and receives the signal as described above. Accordingly, some or all of the wireless communication unit 1910 may be referred to as a "transmitter", a "receiver", or a "transceiver". In addition, the transmission and reception performed through a wireless channel, which is described in the following descriptions, may be understood to indicate that the above-described processing is performed by the communication unit 1910.

The backhaul communication unit 1920 provides an interface for performing communication with other nodes within the network. That is, the backhaul communication unit 1920 converts a bit stream transmitted from the base station to another node, for example, another access node, another base station, or a core network, into a physical signal, and converts a physical signal received from another node into a bit stream.

The storage unit 1930 stores data, such as a basic program for operating a base station, an application, configuration information, and the like. For example, the storage unit 1930 may store information on a bearer allocated to the accessed UE and a measurement result reported from the accessed UE. For example, the storage unit 1930 may store information which is a reference for determining whether to provide or stop multiple connections to the UE. The storage unit 1930 may be configured as volatile memory, non-volatile memory, or a combination of volatile memory and non-volatile memory. Further, the storage unit 1930 provides stored data in response to a request from the controller 1940.

The controller 1940 controls the overall operation of the eNB 1900. For example, the controller 1940 transmits and receives a signal through the wireless communication unit 1910 or the backhaul communication unit 1920. Further, the controller 1940 records data in the storage unit 1930 and reads the recorded data. The controller 1940 may perform the functions of a protocol stack (for example, illustrated in FIG. 2 or 4) required by communication standards. To this end, the controller 1940 may include at least one processor. According to an embodiment, the controller 1940 may control the eNB 1900 to perform operations according to various embodiments described below.

Figure 20:
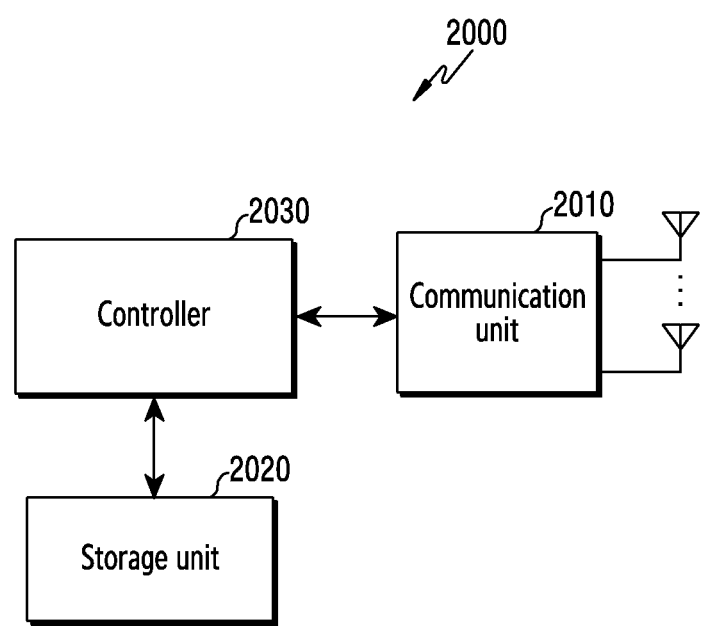
FIG. 20 is a block diagram of a UE in a wireless communication system according to an embodiment.

FIG. 20 illustrates an example of the configuration of a UE 2000 in a wireless communication system according to an embodiment of the disclosure. The UE 2000 may be understood as the configuration of the UE 135 of FIG. 1 or the UE 315 of FIG. 3. The term " . . . unit" or the ending of a word, such as " . . . or", " . . . er", or the like may indicate a unit of processing at least one function or operation, and this may be embodied by hardware, software, or a combination of hardware and software. Referring to FIG. 20, the UE 2000 includes a communication unit 2010, a storage unit 2020, and a controller 2030.

The communication unit 2010 performs functions for transmitting/receiving a signal through a wireless channel. For example, the communication unit 2010 performs a function of conversion between a baseband signal and a bit stream according to a physical layer standard of the system. For example, in data transmission, the communication unit 2010 generates complex symbols by encoding and modulating a transmission bitstream. In data reception, the communication unit 2010 restores a reception bit stream by demodulating and decoding a baseband signal. In addition, the communication unit 2010 up-converts a baseband signal into a RF band signal and transmits the same through an antenna, and down-converts an RF band signal received through an antenna into a baseband signal. For example, the communication unit 2010 may include a transmission filter, a reception filter, an amplifier, a mixer, an oscillator, a DAC, an ADC, and the like.

Further, the communication unit 2010 may include a plurality of transmission/reception paths. In addition, the communication unit 2010 may include an antenna unit. The communication unit 2010 may include at least one antenna array consisting of a plurality of antenna elements. On the hardware side, the communication unit 2010 may include a digital circuit and an analog circuit (for example, an RFIC). The digital circuit and the analog circuit may be implemented as one package. The communication unit 2010 may include a plurality of RF chains. The communication unit 2010 may perform beamforming. The communication unit 2010 may apply a beamforming weighted value to a signal in order to assign directivity according to settings of the controller 2030 to the signal to be transmitted and received.

The communication unit 2010 may transmit and receive a signal. The communication unit 2010 may receive a downlink signal. The downlink signal may include a synchronization signal (SS), a reference signal (RS) (for example, a CRS, a demodulation (DM)-RS), system information (for example, a master information block (MIB), an SIB, remaining system (RMSI), and other system information (OSI)), a configuration message, control information, or downlink data. The communication unit 2010 may transmit an uplink signal. The uplink signal may include a random access-related signal (for example, a RAP (or Message 1 (Msg1), Message 3 (Msg3)), or a reference signal (for example, an SRS or a DM-RS). The communication unit 2010 may include different communication modules to process signals in different frequency bands. In addition, the communication unit 2010 may include a plurality of communication modules for supporting a plurality of different radio access technologies. For example, the different radio access technologies may include Bluetooth low energy (BLE), wireless fidelity (Wi-Fi), Wi-Fi gigabyte (WiGig), and cellular network (for example, LTE, new radio (NR)). Further, different frequency bands may include a super high frequency (SHF) (for example, 2.5 GHz and 5 GHz) band and a millimeter (mm) wave (for example, 38 GHz and 60 GHz) band. The communication unit 2010 may use the same type of RAT in an unlicensed band for different frequency bands (for example, licensed assisted access (LAA)) and citizens broadband radio service (CBRS) (for example, 3.5 GHz).

The communication unit 2010 transmits and receives the signal as described above. Accordingly, all or some of the communication units 2010 may be referred to as a transmitter, a receiver, or a transceiver. In addition, the transmission and reception performed through a wireless channel, which is described in the following descriptions, may be understood to indicate that the above-described processing is performed by the communication unit 2010.

The storage unit 2020 may store data, such as a basic program for operating a terminal, an application, configuration information, and the like. The storage unit 2020 may be configured as volatile memory, non-volatile memory, or a combination of volatile memory and non-volatile memory. Further, the storage unit 2020 provides stored data in response to a request from the controller 2030.

The controller 2030 controls the overall operation of the UE 2000. The controller 2030 may include at least one processor. For example, the controller 330 may include a communication processor (CP) that performs a control for communication, and an application processor (AP) that controls a higher layer such as an application. For example, the controller 2030 transmits and receives a signal through the communication unit 2010. Further, the controller 2030 records data in the storage unit 2020 and reads the data. The controller 2030 may perform functions of a protocol stack (for example, illustrated in FIG. 2 or 4) required by the communication standard. To this end, the controller 2030 may include at least one processor or microprocessor, or may play the part of the processor. A portion of the communication unit 2010 and the controller 2030 may be referred to as a CP. The controller 2030 may include various modules for performing communication.

Each function and operation within the controller 2030 are a set of instructions or code stored in the storage unit 2020, and may correspond to an instruction/code at least temporarily residing in the controller 2030 or a storage space storing the instruction/code, a portion of the circuitry included in the controller 2030, or a module for performing the function of the controller 2030. According to various embodiments, the controller 2030 may control the UE 2000 to perform operations according to various embodiments described below.

The configuration illustrated in FIG. 20 is only an example of the UE 2000, and the UE 2000 is not limited thereto. That is, according to various embodiments, some elements may be added, deleted, or changed.

In the disclosure, although the terms "greater than or equal to" and "less than or equal to" are used to determine whether a particular condition is fulfilled, this is only an example but does not exclude the terms "larger than (or larger than or equal to)" or "smaller than (or equal to or smaller than)". For example, the condition "greater than or equal to" may be replaced with the condition "larger than", the condition "less than or equal to" may be replaced with the condition "smaller than", the condition "larger than" may be replaced with the condition "larger than or equal to", the condition "smaller than" may be replaced with the condition "equal to or smaller than", the condition "larger than or equal to and smaller than" may be replaced with "larger than and equal to or smaller than", and the condition "larger than and equal to or smaller than" may be replaced with the condition "larger than or equal to and smaller than".

Methods according to embodiments stated in claims and/or the disclosure may be implemented in hardware, software, or a combination of hardware and software.

When the methods are implemented by software, a non-transitory computer-readable storage medium for storing one or more programs (software modules) may be provided. The one or more programs stored in the non-transitory computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable ROM (EEPROM), a magnetic disc storage device, a compact disc ROM (CD-ROM), a digital versatile disc (DVD), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, a local area network (LAN), a wide area network (WAN), a storage area network (SAN), and a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but is defined by the appended claims and equivalents thereof.

What is claimed is:

1. A method performed by a terminal in a wireless communication system, the method comprising:
   identifying a first status for a secondary cell (SCell) of the terminal;
   identifying whether a first medium access control (MAC) control element (CE) or a second MAC CE is received from a base station, wherein the first MAC CE indicates that a status for the SCell is an activated state or a deactivated state, and the second MAC CE indicates that the status for the SCell is the activated state or a dormant state; and
   determining a second status for the SCell based on the first MAC CE, in case that the first MAC CE is received from the base station and the second MAC CE is not received from the base station,
   wherein, in case that the first status for the SCell is the dormant state and the first MAC CE indicates that the status for the SCell is the activated state, the second status for the SCell is determined to be maintained as the dormant state.

2. The method of claim 1, further comprising:
   in case that the second status for the SCell is determined as the dormant state, performing at least one of a reporting of a channel quality indicator (CQI), a radio resource management (RRM) measurement, or no monitoring for a physical downlink control channel (PDCCH) associated with the SCell.

3. The method of claim 1, further comprising:
   identifying two bits for the SCell based on the first MAC CE and the second MAC CE; and
   identifying the status for the SCell as one of four states based on the two bits,
   wherein the four states include:
      a reserved, the activated state, the dormant state, and a deactivated state.

4. The method of claim 1, further comprising:
   in case that a first timer expires and the status for the SCell is the activated state, performing a first transition of the status for the SCell by hibernating the SCell from the activated state to the dormant state; and
   when a second timer expires, performing a second transition of the status for the SCell by deactivating the SCell from the dormant state to a deactivated state.

5. The method of claim 4, further comprising:
receiving, from the base station, configuration information for the SCell by using a radio resource control (RRC) signaling, the configuration information including:
- a value of the first timer defined for the first transition from the activated state to the dormant state; and
- a value of the second timer defined for the second transition from the dormant state to the deactivated state.

6. The method of claim 2,
wherein the CQI is reported periodically.

7. The method of claim 1, further comprising:
receiving, from the base station, configuration information for the SCell by using a radio resource control (RRC) signaling, the configuration information including information for indicating a status for the SCell;
determining the status for the SCell based on the information;
wherein the determined status for the SCell is one of the activated state, the dormant state, and a deactivated state, and
wherein receiving the second MAC CE comprises:
identifying the second MAC CE based on a logical channel identifier (LCID) indicating a hibernation.

8. The method of claim 1, further comprising:
determining the second status for the SCell based on the first MAC CE and the second MAC CE, in case that the first MAC CE and the second MAC CE are received from the base station,
wherein the second status for the SCell is determined as the dormant state, in case that the first MAC CE indicates that the status for the SCell is the activated state, and the second MAC CE indicates that the status for the SCell is the dormant state.

9. The method of claim 1,
wherein, in case that the first status for the SCell is the dormant state and the first MAC CE indicates that the status for the SCell is the deactivated state, the second status for the SCell is determined as the deactivated state.

10. The method of claim 1,
wherein, in case that the first status for the SCell is the activated state or the deactivated state, the second status for the SCell is determined as the activated state or the deactivated state indicated by the first MAC CE.

11. A terminal in a wireless communication system, the terminal comprising:
a transceiver; and
a processor configured to:
identify a first status for a secondary cell (SCell) of the terminal;
identify whether a first medium access control (MAC) control element (CE) or a second MAC CE is received from a base station, wherein the first MAC CE indicates a status for the SCell is an activated state or a deactivated state, and the second MAC CE indicates that the status for the SCell is the activated state or a dormant state; and
determine a second status for the SCell based on the first MAC CE, in case that the first MAC CE is received from the base station and the second MAC CE is not received from the base station,
wherein, in case that the first status for the SCell is the dormant state and the first MAC CE indicates that the status for the SCell is the activated state, the second status for the SCell is determined to be maintained as the dormant state.

12. The terminal of claim 11, wherein the processor is further configured to:
in case that the second status for the SCell is determined as the dormant state, perform at least one of a reporting of a channel quality indicator (CQI), a radio resource management (RRM) measurement, or no monitoring for a physical downlink control channel (PDCCH) associated with the SCell.

13. The terminal of claim 11, wherein the processor is further configured to:
identify two bits for the SCell based on the first MAC CE and the second MAC CE; and
identify the status for the SCell as one of four states based on the two bits,
wherein the four states include:
a reserved, the activated state, the dormant state, and a deactivated state.

14. The terminal of claim 11, wherein the processor is further configured to:
in case that a first timer expires and the status for the SCell is the activated state, perform a first transition of the status for the SCell by hibernating the SCell from the activated state to the dormant state; and
when a second timer expires, perform a second transition of the state of the SCell by deactivating the SCell from the dormant state to the deactivated state.

15. The terminal of claim 14, wherein the processor is further configured to:
receive, from the base station, configuration information for the SCell by using a radio resource control (RRC) signaling, the configuration information including:
- a value of the first timer defined for the first transition from the activated state to the dormant state; and
- a value of the second timer defined for the second transition from the dormant state to the deactivated state.

16. The terminal of claim 12, wherein the CQI is reported periodically.

17. The terminal of claim 11, wherein the processor is further configured to:
receive, from the base station, configuration information for the SCell by using a radio resource control (RRC) signaling, the configuration information including information for indicating a status for the SCell;
determine the status for the SCell based on the information;
wherein the determined status for the SCell is one of the activated state, the dormant state, and a deactivated state, and
wherein receiving the second MAC CE comprises:
identifying the second MAC CE based on a logical channel identifier (LCID) indicating a hibernation.

18. The terminal of claim 11, wherein the processor is further configured to:
determine the second status for the SCell based on the first MAC CE and the second MAC CE, in case that the first MAC CE and the second MAC CE are received from the base station,
wherein the second status for the SCell is determined as the dormant state, in case that the first MAC CE indicates that the status for the SCell is the activated state, and the second MAC CE indicates that the status for the SCell is the dormant state.

19. The terminal of claim 11,
wherein, in case that the first status for the SCell is the dormant state and the first MAC CE indicates that the status for the SCell is the deactivated state, the second status for the SCell is determined as the deactivated state.

20. The terminal of claim 11,
wherein, in case that the first status for the SCell is the activated state or the deactivated state, the second status for the SCell is determined as the activated state or the deactivated state indicated by the first MAC CE.

21. A base station in a wireless communication system, the base station comprising:
a transceiver; and
a processor configured to:
transmit, to a terminal via the transceiver, a first medium access control (MAC) control element (CE) or a second MAC CE, wherein the first MAC CE indicates that a status for a secondary cell (SCell) is an activated state or a deactivated state, and the second MAC CE indicates that the status for the SCell is the activated state or a dormant state,
wherein the SCell is in a first status before the base station transmits the first MAC CE or the second MAC CE,
wherein a second status for the SCell is determined based on the first MAC CE, in case that the first MAC CE is transmitted to the terminal and the second MAC CE is not transmitted to the terminal,
wherein, in case that the first status for the SCell is the dormant state and the first MAC CE indicates that the status for the SCell is the activated state, the second status for the SCell is determined to be maintained as the dormant state,
wherein, in case that the status for the SCell before the determination is the activated state or the deactivated state and the first MAC CE transmitted to the terminal indicates the status for the SCell as the activated state and the second MAC CE is not transmitted to the terminal, the status for the SCell is determined as the activated state.

22. The base station of claim 21,
wherein, in case that the second status for the SCell is determined as the dormant state, at least one of a reporting of a channel quality indicator (CQI), a radio resource management (RRM) measurement, or no monitoring for a physical downlink control channel (PDCCH) associated with the SCell is performed.

23. The base station of claim 21,
wherein two bits for the SCell are identified based on the first MAC CE and the second MAC CE,
wherein the two bits indicate the status for the SCell as one of four states, and
wherein the four states include:
a reserved, the activated state, the dormant state, and a deactivated state.

24. The base station of claim 21, wherein the processor is further configured to:
transmit, to the terminal, configuration information for the SCell by using a radio resource control (RRC) signaling, the configuration information including:
a value of a first timer defined for a first transition from the activated state to the dormant state; and
a value of a second timer defined for a second transition from the dormant state to a deactivated state.

25. The base station of claim 22, wherein the CQI is reported periodically.

26. The base station of claim 21, wherein the processor is further configured to:
transmit, to the terminal, configuration information for the SCell by using a radio resource control (RRC) signaling, the configuration information including information for indicating a status for the SCell,
wherein the status for the SCell is one of the activated state, the dormant state, and a deactivated state, and
wherein the second MAC CE is identified based on a logical channel identifier (LCID) indicating a hibernation.

27. The base station of claim 21,
wherein the second status for the SCell is determined based on the first MAC CE and the second MAC CE, in case that the first MAC CE and the second MAC CE are transmitted to the terminal, and
wherein the status for the SCell is determined as the dormant state, in case that the first MAC CE indicates that the status for the SCell is the activated state, and the second MAC CE indicates that the sttus for the SCell is the dormant state.

28. The base station of claim 21,
wherein, in case that the first status for the SCell is the dormant state and the first MAC CE indicates that the status for the SCell is the deactivated state, the second status for the SCell is determined as the deactivated state.

29. The base station of claim 21,
wherein, in case that the first status for the SCell is the activated state or the deactivated state, the second status for the SCell is determined as the activated state or the deactivated state indicated by the first MAC CE.

30. A method performed by a base station in a wireless communication system, the method comprising:
transmitting, to a terminal, a first medium access control (MAC) control element (CE) or a second MAC CE, wherein the first MAC CE indicates a status for a secondary cell (SCell) as an activated state or a deactivated state, and the second MAC CE indicates the status for the SCell as the activated state or a dormant state,
wherein the SCell is in a first status before the base station transmits the first MAC CE or the second MAC CE,
wherein a second status for the SCell is determined based on the first MAC CE, in case that the first MAC CE is transmitted to the terminal and the second MAC CE is not transmitted to the terminal,
wherein, in case that the first status for the SCell is the dormant state and the first MAC CE indicates that the status for the SCell is the activated state, the second status for the SCell is determined to be maintained as the dormant state.

31. The method of claim 30,
wherein, in case that the second status for the SCell is determined as the dormant state, at least one of a reporting of a channel quality indicator (CQI), a radio resource management (RRM) measurement, or no monitoring for a physical downlink control channel (PDCCH) associated with the SCell is performed.

32. The method of claim 30,
wherein two bits for the SCell are identified based on the first MAC CE and the second MAC CE,
wherein the two bits indicate the status for the SCell as one of four states, and
wherein the four states include:
a reserved, the activated state, the dormant state, and a deactivated state.

33. The method of claim 30, further comprising:
transmitting, to the terminal, configuration information for the SCell by using a radio resource control (RRC) signaling, the configuration information including:
a value of a first timer defined for a first transition from the activated state to the dormant state; and
a value of a second timer defined for a second transition from the dormant state to a deactivated state.

34. The method of claim 31, wherein the CQI is reported periodically.

35. The method of claim 30, further comprising:
transmitting, to the terminal, configuration information for the SCell by using a radio resource control (RRC) signaling, the configuration information including information for indicating a status for the SCell,
wherein the status for the SCell is one of the activated state, the dormant state, and a deactivated state, and
wherein the second MAC CE is identified based on a logical channel identifier (LCD) indicating a hibernation.

36. The method of claim 30,
wherein the second status for the SCell is determined based on the first MAC CE and the second MAC CE, in case that the first MAC CE and the second MAC CE are transmitted to the terminal, and
wherein the status for the SCell is determined as the dormant state, in case that the first MAC CE indicates that the status for the SCell is the activated state, and the second MAC CE indicates that the status for the SCell is the dormant state.

37. The method of claim 30,
wherein, in case that the first status for the SCell is the dormant state and the first MAC CE indicates that the status for the SCell is the deactivated state, the second status for the SCell is determined as the deactivated state.

38. The method of claim 30,
wherein, in case that the first status for the SCell is the activated state or the deactivated state, the second status for the SCell is determined as the activated state or the deactivated state indicated by the first MAC CE.

* * * * *